(12) United States Patent
Tanabe

(10) Patent No.: US 10,946,289 B2
(45) Date of Patent: Mar. 16, 2021

(54) STORAGE MEDIUM, GAME SYSTEM, GAME APPARATUS AND GAME CONTROLLING METHOD

(71) Applicant: Nintendo Co., Ltd., Kyoto (JP)

(72) Inventor: Kensuke Tanabe, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 16/777,947

(22) Filed: Jan. 31, 2020

(65) Prior Publication Data

US 2020/0338457 A1 Oct. 29, 2020

(30) Foreign Application Priority Data

Apr. 26, 2019 (JP) .............................. JP2019-086574

(51) Int. Cl.
*A63F 13/833* (2014.01)
*A63F 13/5252* (2014.01)
*A63F 13/5255* (2014.01)
*A63F 13/24* (2014.01)
*A63F 13/825* (2014.01)

(52) U.S. Cl.
CPC ............ *A63F 13/833* (2014.09); *A63F 13/24* (2014.09); *A63F 13/5252* (2014.09); *A63F 13/5255* (2014.09); *A63F 13/825* (2014.09); *A63F 2300/6669* (2013.01); *A63F 2300/6676* (2013.01); *A63F 2300/8029* (2013.01)

(58) Field of Classification Search
CPC ...... A63F 13/56; A63F 13/822; A63F 13/825; A63F 13/828; A63F 13/833
See application file for complete search history.

(56) References Cited

U.S. PATENT DOCUMENTS

| 2010/0201949 A1* | 8/2010 | Barnett | G03B 25/00 352/101 |
| 2016/0125689 A1* | 5/2016 | Hoffman | G07F 17/3223 463/20 |
| 2017/0239575 A1 | 8/2017 | Tanabe et al. | |
| 2019/0043314 A1* | 2/2019 | Abrahamson | A63F 3/00157 |

FOREIGN PATENT DOCUMENTS

JP 2017-144187 8/2017

* cited by examiner

*Primary Examiner* — James S McClellan
(74) *Attorney, Agent, or Firm* — Nixon & Vanderhye PC

(57) ABSTRACT

A non-limiting example game system comprises a processor incorporated in a main body apparatus, and the processor displays, in a battle scene, a battle screen including a player character, an enemy character and a board face object on a display. The board face object having a circular board face that is formed with multiple partial objects that are sectioned by multiple concentric circles and multiple lines extended radially. A player makes the multiple partial objects move in a circumferential direction or a radial direction so as to change arrangement of multiple enemy characters placed on the multiple partial objects, thereby causing the player character to perform an attack.

20 Claims, 33 Drawing Sheets

BOARD FACE OBJECT 210

DESIGNATION OF INNERMOST RING

DESIGNATION OF OUTERMOST RING

DESIGNATION OF ONE-OUTER RING OF INNERMOST RING

DESIGNATION OF TWO-OUTER RING OF INNERMOST RING

PARTIAL OBJECTS ARRANGED
IN RADIAL DIRECTION
(BEFORE SLIDE)

MOVEMENT IN RADIAL
DIRECTION (SOUTH-
SOUTHWEST)

MOVEMENT IN RADIAL
DIRECTION (NORTH-
NORTHEAST)

STORAGE MEDIUM, GAME SYSTEM, GAME APPARATUS AND GAME CONTROLLING METHOD

CROSS REFERENCE OF RELATED APPLICATION

The disclosure of Japanese Patent Application No. 2019-086574 filed on Apr. 26, 2019 is incorporated herein by reference.

FIELD

This application describes a storage medium, a game system, a game apparatus and a game controlling method, in which an operation of object arrangement is incorporated into game play.

SUMMARY

It is a primary object of an embodiment(s) to provide a novel storage medium, game system, game apparatus and game controlling method.

It is another object of the embodiment(s) to provide a storage medium, game system, game apparatus and game controlling method, capable of incorporating an operation of arrangement of an object(s) in a virtual space into game play.

A first embodiment is a non-transitory computer-readable storage medium having stored therein a game program executable by a computer comprising one or more processors of an information processing apparatus, wherein the game program causes the one or more processors of the computer to execute: arranging in a virtual space a board face object having a circular board face that is formed with multiple parts that are sectioned by multiple lines extended in a radial direction from a center and multiple concentric circles; placing a game object on at least one of the parts; moving multiple parts that are designated based on an operation input and surrounded by common concentric circles together with the game object that is placed on the part; game processing that causes, based on an operation input, a player character object to perform a predetermined action based on arrangement of the game object on the board face object; and generating, based on a virtual camera, an image of the virtual space to be displayed on a display.

According to the first embodiment, it is possible to provide a novel game that an operation of arrangement of the object(s) in the virtual space is incorporated in game play.

A second embodiment is the storage medium according to the first embodiment, wherein the game program causes the one or more processors further to execute: moving first multiple parts and second multiple parts designated based on an operation input, the first multiple parts being surrounded by common lines extended in the radial direction and the second multiple parts being point symmetry with respect to the first multiple parts with a reference of the center, together with the game objects placed on the first multiple parts and the second multiple parts, in a manner that the first multiple parts and the second multiple parts are moved to an outer side of one of the first multiple parts and the second multiple parts, and an outermost part of one of the first multiple parts and the second multiple parts is moved to an outermost part the other of the first multiple parts and the second multiple part.

According to the second embodiment, it is possible to change the arrangement of the game object(s) by moving in a radial direction the multiple parts lined along a diameter.

A third embodiment is the storage medium according to the first embodiment, wherein the game program causes the one or more processors further to execute: moving to an outside direction or an inside direction multiple parts that are designated based on an operation input and surrounded by common lines extended in the radial direction, together with one or more game objects placed on the parts, and moving an outermost part to an innermost part, or an innermost part to an outermost part.

According to the third embodiment, it is possible to change the arrangement of the game object(s) by moving in a radial direction multiple parts lined along a radius.

A fourth embodiment is the storage medium according to the first embodiment, wherein a predetermined number is set as an upper limit to a number of movement times, and the movement is performed until an end is instructed based on an operation input, or the number of movement times reaches the upper limit.

According to the fourth embodiment, by setting the upper limit to the number of movement times, it is possible to set a degree of difficulty for changing the arrangement of the game object(s).

A fifth embodiment is the storage medium according to the first embodiment, wherein the board face object has a central portion in a range including the center of circle, the central portion is placed with the player character object, and the game object is an enemy character object, and the game program causes the one or more processors to execute game processing in which the player character object performs an attack to the enemy character object arranged in the part included in a range of a predetermined shape with respect to a direction designated based on an operation input from the central portion.

According to the fifth embodiment, it is possible to make the player think about the arrangement of the enemy character object for attacking the enemy character object from the central portion of the board face object. Therefore, it is possible for the player to enjoy a sense of accomplishment when attacking the enemy character object efficiently.

A sixth embodiment is the storage medium according to the first embodiment, wherein the board face object has a central portion within a range including the center of a circle, and the central portion is further placed with an enemy character object, and the game object includes a direction designation object that designates a movement direction on the board face object and an attack instruction that instructs an attack to the enemy character object, and the game program causes the one or more processors to execute game processing that makes the player character object perform movement from an outside of the board face object between the parts according to the direction designation objects arranged on the parts, and attack the enemy character object when the player character object reaches the attack instruction object.

According to the sixth embodiment, it is possible to make a player think arrangement of the direction designation object and the attack instruction object that are for attacking the enemy character object placed in the central portion of the board face object. Therefore, it is possible for the player to enjoy a sense of accomplishment when efficiently attacking the enemy character object.

A seventh embodiment is the storage medium according to the sixth embodiment, wherein the game object further includes an effect object showing a predetermined effect, and the game program causes the one or more processors to execute game processing in which the player character object obtains the predetermined effect that is added in attacking the enemy character object if the player character object passes during movement the part that is placed with the effect object.

According to the seventh embodiment, it is possible to make a player think an arrangement of the effect object so as to not only simply attack the enemy character object but also effectively perform the attack.

An eighth embodiment is a game system comprising a control circuit and an operation unit, wherein the control circuit is configured to execute: arranging in a virtual space a board face object having a circular board face that is formed with multiple parts that are sectioned by multiple lines extended in a radial direction from a center and multiple concentric circles; placing a game object on at least one of the parts; moving multiple parts that are designated based on an operation input and surrounded by common concentric circles together with the game object that is placed on the part; game processing that causes, based on an operation input, a player character object to perform a predetermined action based on arrangement of the game object on the board face object; and generating, based on a virtual camera, an image of the virtual space to be displayed on a display.

A ninth embodiment is a game apparatus comprising a control circuit and an operation unit, wherein the control circuit is configured to execute: arranging in a virtual space a board face object having a circular board face that is formed with multiple parts that are sectioned by multiple lines extended in a radial direction from a center and multiple concentric circles; placing a game object on at least one of the parts; moving multiple parts that are designated based on an operation input and surrounded by common concentric circles together with the game object that is placed on the pars; game processing that causes, based on an operation input, a player character object to perform a predetermined action based on arrangement of the game object on the board face object; and generating, based on a virtual camera, an image of the virtual space to be displayed on a display.

A tenth embodiment is a game controlling method comprising: arranging in a virtual space a board face object having a circular board face that is formed with multiple parts that are sectioned by multiple lines extended in a radial direction from a center and multiple concentric circles; placing a game object on at least one of the parts; moving multiple parts that are designated based on an operation input and surrounded by common concentric circles together with the game object that is placed on the part; game processing that causes, based on an operation input, a player character object to perform a predetermined action based on arrangement of the game object on the board face object; and generating, based on a virtual camera, an image of the virtual space to be displayed on a display.

According to each of the eighth to tenth embodiments, like the first embodiment, it is possible to provide a novel game that an operation of arrangement of the object(s) in the virtual space is incorporated in game play.

The above described objects and other objects, features, aspects and advantages of the embodiment(s) will become more apparent from the following detailed description when taken in conjunction with the accompanying drawings.

DETAILED DESCRIPTION OF NON-LIMITING EXAMPLE EMBODIMENTS

A non-limiting example game system according to an exemplary embodiment will be described in the following. The non-limiting example game system 1 according to this embodiment comprises a main body apparatus (an information processing apparatus that functions as a game apparatus main body in this embodiment) 2, a left controller 3 and a right controller 4. The left controller 3 and the right controller 4 are attachable to or detachable from the main body apparatus 2, respectively. That is, the game system 1 can be used as a unified apparatus formed by attaching each of the left controller 3 and the right controller 4 to the main body apparatus 2. Moreover, in the game system 1, the main body apparatus 2, the left controller 3 and the right controller 4 can also be used as separate bodies (see FIG. 2). In the following, the hardware structure of the game system 1 according to this embodiment will be described, and then, the control of the game system 1 of this embodiment will be described.

Figure 1:
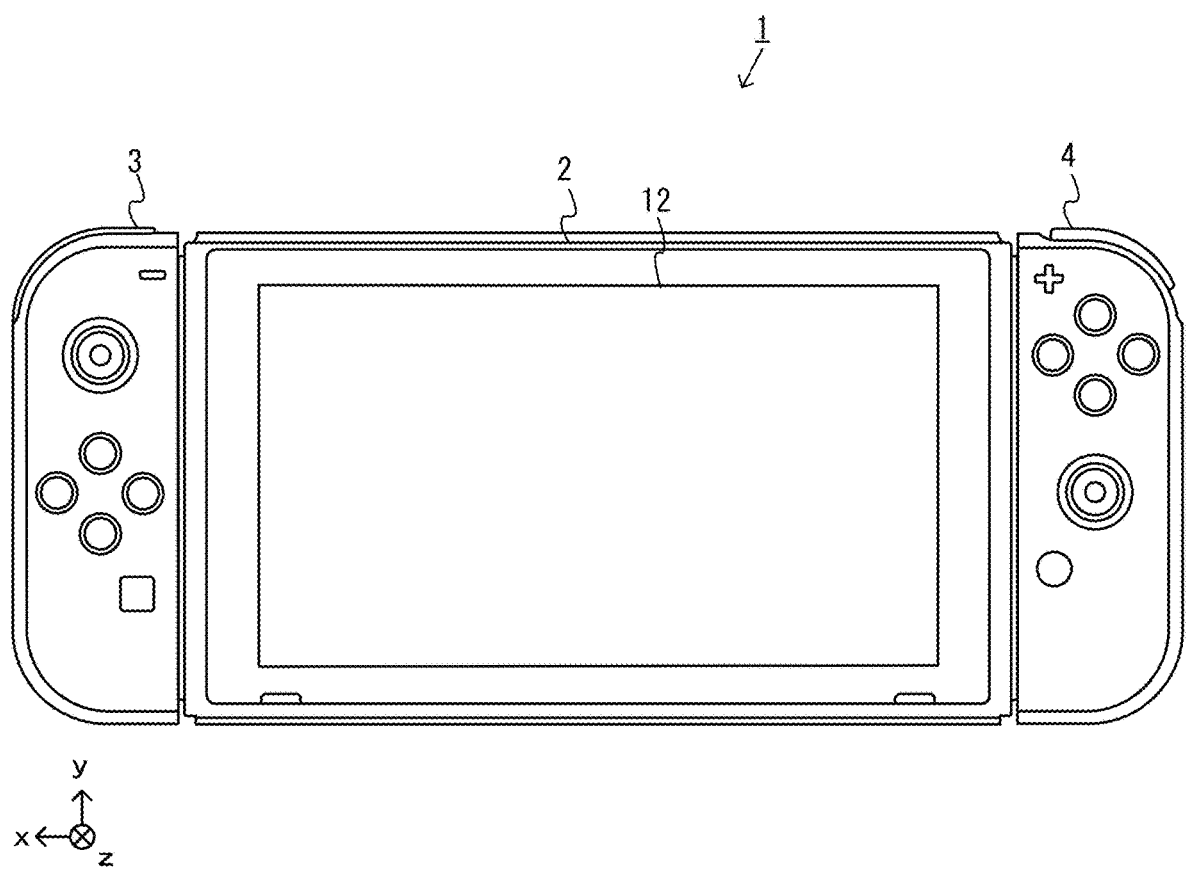
FIG. 1 is an illustration view showing a non-limiting example state wherein a left controller and a right controller are attached to a main body apparatus of this embodiment.

FIG. 1 is an illustration view showing an example of a state where the left controller 3 and the right controller 4 are attached to the main body apparatus 2. As shown in FIG. 1, the left controller 3 and the right controller 4 is respectively attached to the main body apparatus 2, thereby to be unified it. The main body apparatus 2 is an apparatus for performing various processing (game processing, for example) in the game system 1. The main body apparatus 2 comprises a display 12. Each of the left controller 3 and the right controller 4 is a device comprising an operation section with which a user provides inputs.

Figure 2:
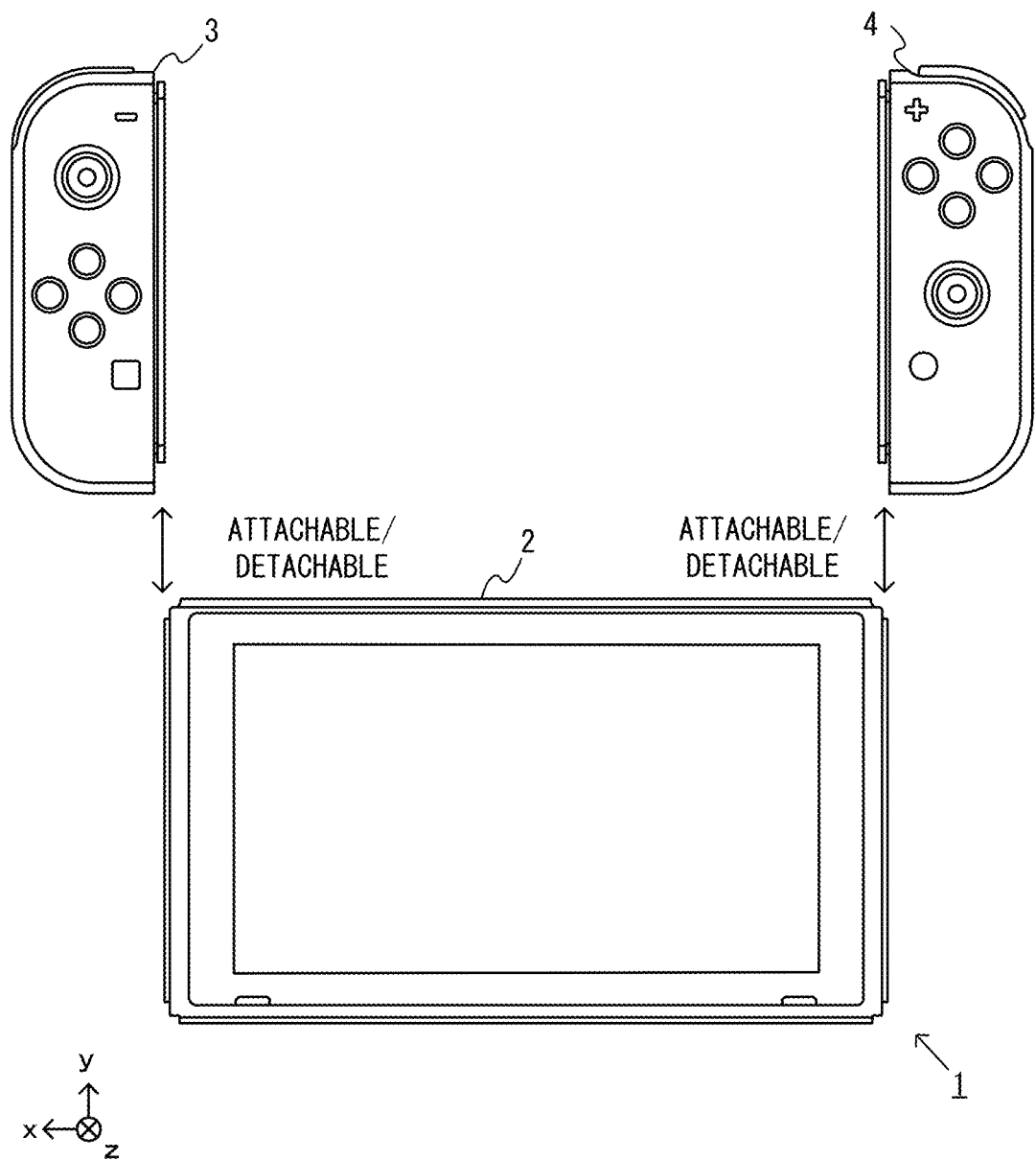
FIG. 2 is an illustration view showing a non-limiting example state where the left controller and the right controller are detached from the main body apparatus, respectively.

FIG. 2 is an illustration view showing an example of a state where the left controller 3 and the right controller 4 are detached from the main body apparatus 2, respectively. As shown in FIG. 1 and FIG. 2, each of the left controller 3 and the right controller 4 is attachable to and detachable from the main body apparatus 2. In addition, it should be noted that the left controller 3 and the right controller 4 may be referred to collectively as a "controller" in the following.

Figure 3:
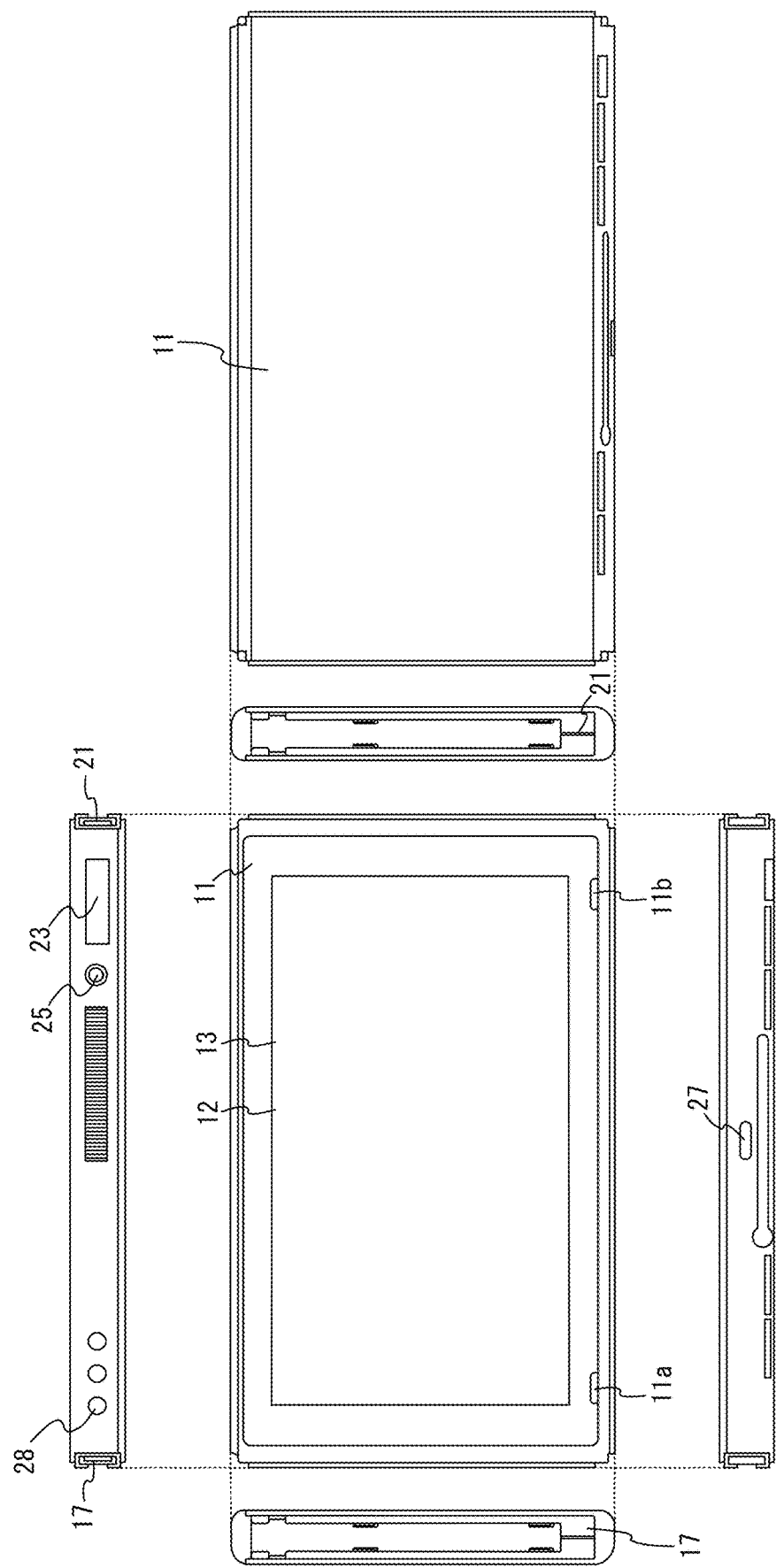
FIG. 3 is six orthogonal views showing a non-limiting example main body apparatus shown in FIG. 1 and FIG. 2.

FIG. 3 is six orthogonal views showing an example of the main body apparatus 2. As shown in FIG. 3, the main body apparatus 2 comprises a housing 11 having an approximately plate-shape. In this embodiment, a main surface (in other words, a surface on a front side, that is, a surface on which the display 12 is provided) of the housing 11 has a generally rectangular shape.

In addition, a shape and a size of the housing 11 are optional. As an example, the housing 11 may be of a portable size. Moreover, the main body apparatus 2 alone or the unified apparatus obtained by attaching the left controller 3 and the right controller 4 to the main body apparatus 2 may be a mobile apparatus. The main body apparatus 2 or the unified apparatus may be a handheld apparatus. The main body apparatus 2 or the unified apparatus may be a handheld apparatus or a portable apparatus.

As shown in FIG. 3, the main body apparatus 2 comprises the display 12 that is provided on the main surface of the housing 11. The display 12 displays an image generated by the main body apparatus 2. In this embodiment, the display 12 is a liquid crystal display device (LCD). However, the display 12 may be an arbitrary type display. Moreover, the main body apparatus 2 comprises a touch panel 13 on a screen of the display 12. In this embodiment, the touch panel 13 is of a type that allows a multi-touch input (e.g., a capacitive type). However, the touch panel 13 may be of any type, and for example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are emitted through the speaker holes 11a and 11b.

Moreover, the main body apparatus 2 comprises a left terminal 17 that is a terminal for the main body apparatus 2 to perform wired communication with the left controller 3, and a right terminal 21 that is a terminal for the main body apparatus 2 performs wired communication with the right controller 4.

As shown in FIG. 3, the main body apparatus 2 comprises a slot 23. The slot 23 is provided on an upper side surface of the housing 11. The slot 23 has a shape to which a predetermined type of storage medium can be attached. The predetermined type of storage medium is, for example, a dedicated storage medium (e.g., a dedicated memory card) for the game system 1 or an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Moreover, the main body apparatus 2 comprises a power button 28.

The main body apparatus 2 comprises a lower terminal 27. The lower terminal 27 is a terminal through which the main body apparatus 2 performs communication with a cradle. In this embodiment, the lower terminal 27 is a USB connector (more specifically, a female connector). When the unified apparatus or the main body apparatus 2 alone is put on the cradle, the game system 1 can display on a stationary monitor an image generated by and output from the main body apparatus 2. Moreover, in this embodiment, the cradle has the function of charging the unified apparatus or the main body apparatus 2 alone that is put on the cradle. Moreover, the cradle has a function of a hub device (specifically, a USB hub).

Figure 4:
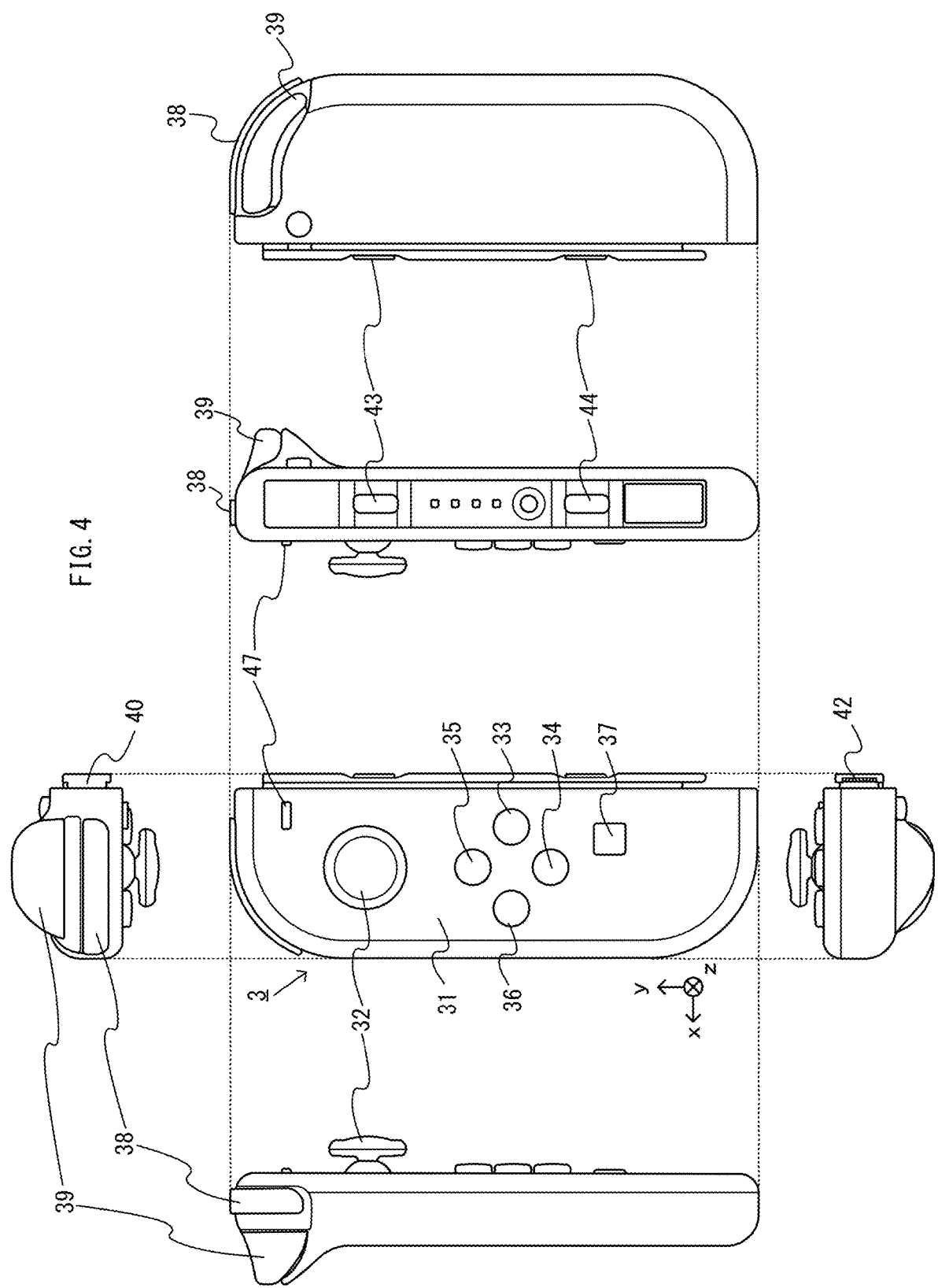
FIG. 4 is sixth orthogonal views showing a non-limiting example left controller shown in FIG. 1 and FIG. 2.

FIG. 4 is six orthogonal views showing an example of the left controller 3. As shown in FIG. 4, the left controller 3 comprises a housing 31. In this embodiment, the housing 31 has a vertically long shape, that is, is shaped to be long in an up-down direction (i.e., a y-axis direction shown in FIG. 1 and FIG. 4). In a state where the left controller 3 is detached from the main body apparatus 2, the left controller 3 can also be held in a direction that the left controller 3 is vertically long. The housing 31 has a shape and a size that when held in a direction that the housing 31 is vertically long, the housing 31 can be held with one hand, especially the left hand. Moreover, the left controller 3 can also be held in a direction that the left controller 3 is horizontally long. When held in the direction that the left controller 3 is horizontally long, the left controller 3 may be held with both hands.

The left controller 3 comprises an analog stick 32. As shown in FIG. 4, the analog stick 32 is provided on a main surface of the housing 31. The analog stick 32 can be used as a direction input section capable of inputting a direction. The user tilts the analog stick 32 and thereby can input a direction corresponding to a tilted direction (and input a magnitude corresponding to a tilted angle). In addition, the left controller 3 may comprise a cross key or a slide stick capable of performing a slide input, or the like as the direction input section, instead of the analog stick. Moreover, in this embodiment, it is possible to provide an input by pressing the analog stick 32.

The left controller 3 comprises various operation buttons. The left controller 3 comprises four (4) operation buttons 33-36 (specifically, a right direction button 33, a down direction button 34, an up direction button 35 and a left direction button 36) on the main surface of the housing 31. Furthermore, the left controller 3 comprises a record button 37 and a "−" (minus) button 47. The left controller 3 comprises an L-button 38 and a ZL-button 39 in an upper left portion of a side surface of the housing 31. Moreover, the left controller 3 comprises an SL-button 43 and an SR-button 44 on a surface at a side to be attached to the main body apparatus 2 out of side surfaces of the housing 31. These operation buttons are used to input instructions according to various programs (e.g., an OS program and an application program) executed by the main body apparatus 2.

Moreover, the left controller 3 comprises a terminal 42 for the left controller 3 to perform wired communication with the main body apparatus 2.

Figure 5:
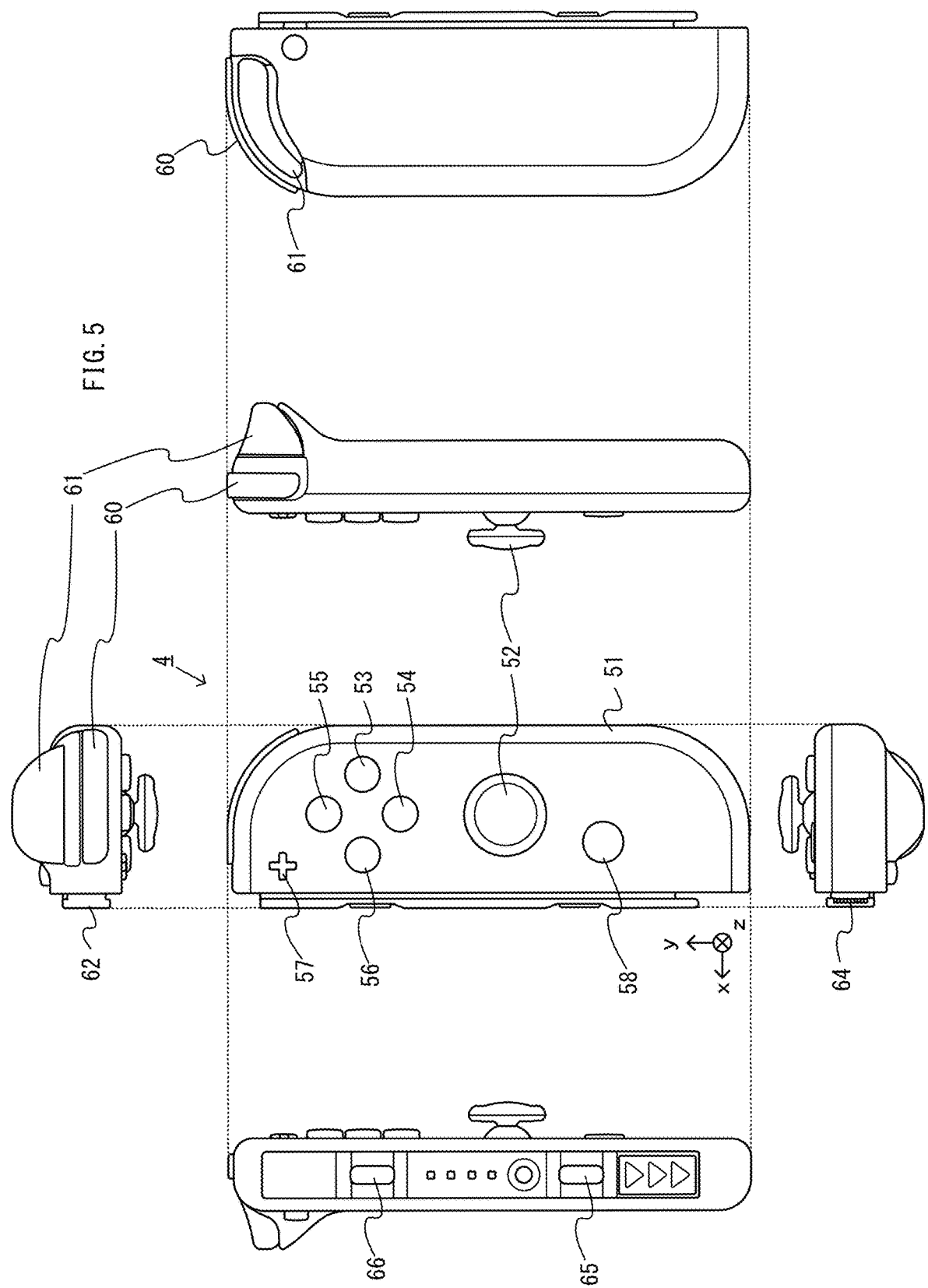
FIG. 5 is sixth orthogonal views showing a non-limiting example right controller shown in FIG. 1 and FIG. 2.

FIG. 5 is six orthogonal views showing an example of the right controller 4. As shown in FIG. 5, the right controller 4 comprises a housing 51. In this embodiment, the housing 51 has a vertically long shape, that is, a shape long in the up-down direction. In a state where the right controller 4 is detached from the main body apparatus 2, the right controller 4 can also be held in a direction that the right controller 4 is vertically long. The housing 51 has a shape and a size that when held in a direction that the housing 51 is vertically long, the housing 51 can be held with one hand, especially the right hand. Moreover, the right controller 4 can also be held in a direction that the right controller 4 is horizontally long. When held in the direction that the right controller 4 is horizontally long, the right controller 4 may be held with both hands.

Similar to the left controller 3, the right controller 4 comprises an analog stick 52 as a direction input section. In this embodiment, the analog stick 52 has the same configuration as that of the analog stick 32 of the left controller 3. Moreover, the right controller 4 may comprise a cross key or a slide stick capable of performing a slide input, or the like as the direction input section, instead of the analog stick. Moreover, similar to the left controller 3, the right controller 4 comprises four (4) operation buttons 53-56 (specifically, an A-button 53, a B-button 54, an X-button 55 and a Y-button 56) on the main surface of the housing 51. Furthermore, the right controller 4 comprises a "+" (plus) button 57 and a home button 58. Moreover, the right controller 4 comprises an R-button 60 and a ZR-button 61 in an upper right portion of a side surface of the housing 51. Moreover, similar to the left controller 3, the right controller 4 comprises an SL-button 65 and an SR-button 66.

Moreover, the right controller 4 comprises a terminal 64 for the right controller 4 to perform wired communication with the main body apparatus 2.

Figure 6:
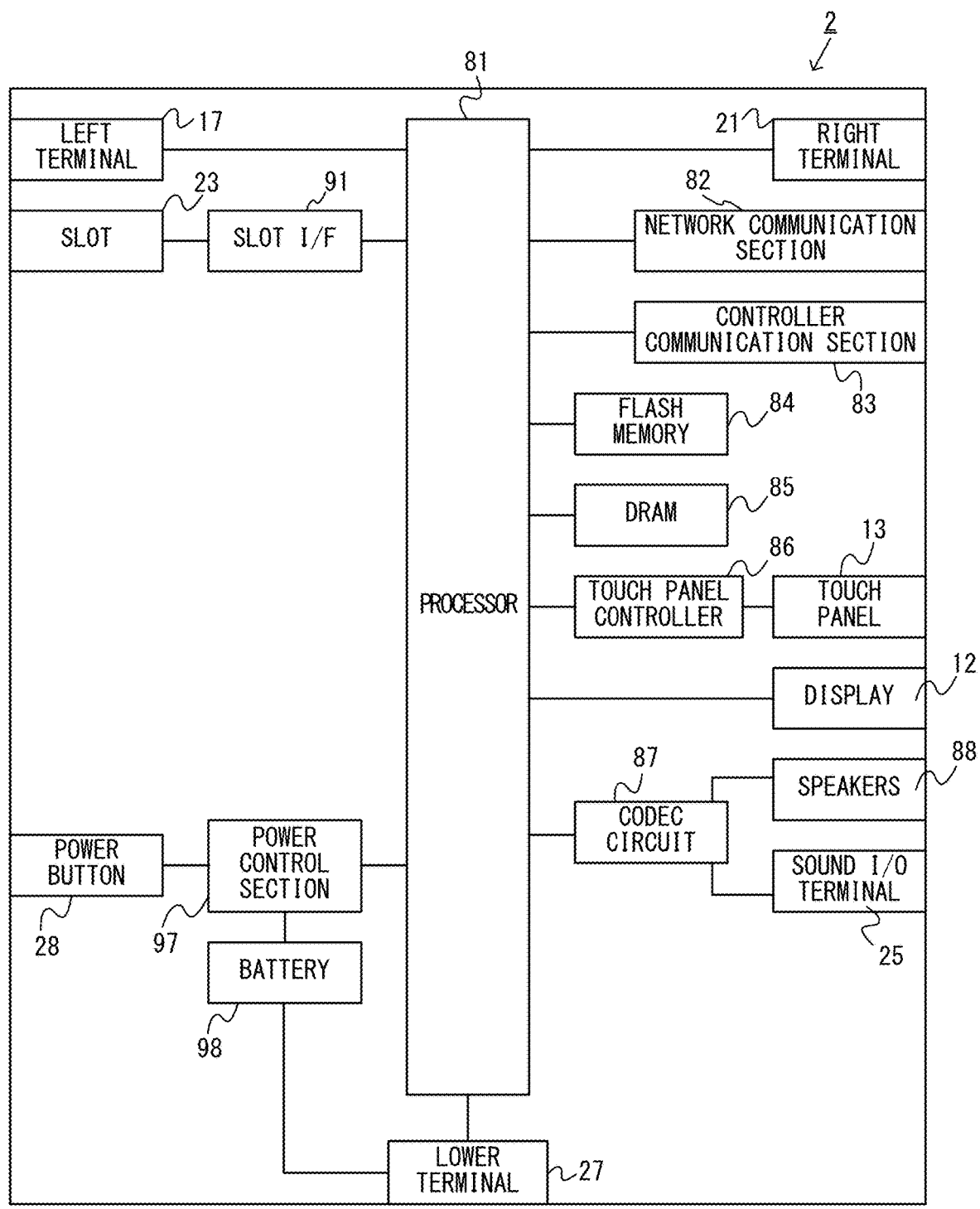
FIG. 6 is a block diagram showing a non-limiting example internal configuration of the main body apparatus shown in FIG. 1 and FIG. 2.

FIG. 6 is a block diagram showing an example of an internal configuration of the main body apparatus 2. The main body apparatus 2 comprises components 81-91, 97 and 98 shown in FIG. 6 in addition to components shown in FIG. 3. Some of the components 81-91, 97 and 98 may be mounted as electronic components on an electronic circuit board to be accommodated in the housing 11.

The main body apparatus 2 comprises a processor 81. The processor 81 is an information processing section that performs various types of information processing to be performed by the main body apparatus 2, and may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 comprises a flash memory 84 and a DRAM (Dynamic Random Access Memory) 85 as examples of internal storage media incorporated in the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 comprises a slot interface (hereinafter, abbreviated as "I/F") 91. The slot I/F 91 is connected to the processor 81. The slot I/F 91 is connected to the slot 23, and reads and writes, in accordance with instructions from the processor 81, data from and to the predetermined type of storage medium (e.g., a dedicated memory card) attached to the slot 23.

The processor 81 appropriately reads and writes data from and to the flash memory 84, the DRAM 85 and each of the above storage media, thereby performing the above-described information processing.

The main body apparatus 2 comprises a network communication section 82. The network communication section 82 is connected to the processor 81. The network communication section 82 performs communication (specifically, wireless communication) with external apparatus via a network. In this embodiment, as a first communication manner, the network communication section 82 is connected to a wireless LAN to perform communication with external apparatus by a system in conformity with the Wi-Fi standard. Moreover, as a second communication manner, the network communication section 82 performs wireless communication with a further main body apparatus 2 of the same type by a predetermined communication system (e.g., communication based on a unique protocol or infrared light communication). In addition, the wireless communication in the above-described second communication manner achieves a function of enabling so-called "local communication", in which the main body apparatus 2 can perform wireless communication with further main body apparatus 2 placed in a closed local network area, and a plurality of main body apparatus 2 perform communication directly with each other to transmit and receive data. The main body apparatus 2 comprises a controller communication section 83. The controller communication section 83 is connected to the processor 81. The controller communication section 83 performs wireless communication with the left controller 3 and/or the right controller 4. Although communication system between the main body apparatus 2 and the left controller 3 and the right controller 4 is optional, in this embodiment, the controller communication section 83 performs communication with the left controller 3 and with the right controller 4 in conformity with Bluetooth (registered trademark) standard.

The processor 81 is connected to the left terminal 17, the right terminal 21 and the lower terminal 27. When performing wired communication with the left controller 3, the processor 81 transmits data to the left controller 3 via the left terminal 17 and receives (or acquires) operation data from the left controller 3 via the left terminal 17. Moreover, when performing wired communication with the right controller 4, the processor 81 transmits data to the right controller 4 via the right terminal 21 and receives (or acquires) operation data from the right controller 4 via the right terminal 21. Moreover, when performing communication with the cradle, the processor 81 transmits data to the cradle via the lower terminal 27. Thus, in this embodiment, the main body apparatus 2 can perform both wired communication and wireless communication with each of the left controller 3 and the right controller 4. Moreover, when the unified apparatus formed by attaching the left controller 3 and the right controller 4 to the main body apparatus 2 or the main body apparatus 2 alone is attached to the cradle, the main body apparatus 2 can output data (e.g., display image data and sound data) to the stationary monitor or the like via the cradle.

Here, the main body apparatus 2 can perform communication with a plurality of left controllers 3 simultaneously (in other words, in parallel). Moreover, the main body apparatus 2 can perform communication with a plurality of right controllers 4 simultaneously (in other words, in parallel). Therefore, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 comprises a touch panel controller 86 that is a circuit for controlling the touch panel 13. The touch panel controller 86 is connected between the touch panel 13 and the processor 81. Based on a signal from the touch panel 13, the touch panel controller 86 generates, for example, data indicating a position where a touch input is performed, and outputs the data to the processor 81.

Moreover, the display 12 is connected to the processor 81. The processor 81 displays a generated image (e.g., an image generated by performing the above information processing) and/or an externally acquired image on the display 12.

The main body apparatus 2 comprises a codec circuit 87 and speakers (specifically, a left speaker and a right speaker) 88. The codec circuit 87 is connected to the speakers 88 and a sound input/output (I/O) terminal 25 and also connected to the processor 81. The codec circuit 87 is a circuit for controlling an input/output of sound data to and from the speakers 88 and the sound input/output terminal 25.

The main body apparatus 2 comprises a power control section 97 and a battery 98. The power control section 97 is connected to the battery 98 and the processor 81. Moreover, although not shown in FIG. 6, the power control section 97 is connected to respective components of the main body apparatus 2 (specifically, components that receive power supplied from the battery 98, the left terminal 17 and the right terminal 21). Based on a command from the processor 81, the power control section 97 controls power supply from the battery 98 to the above-described components.

Moreover, the battery 98 is connected to the lower terminal 27. When an external charging device (e.g., a cradle) is connected to the lower terminal 27, and power is supplied to the main body apparatus 2 via the lower terminal 27, the battery 98 is charged with the supplied power.

Figure 7:
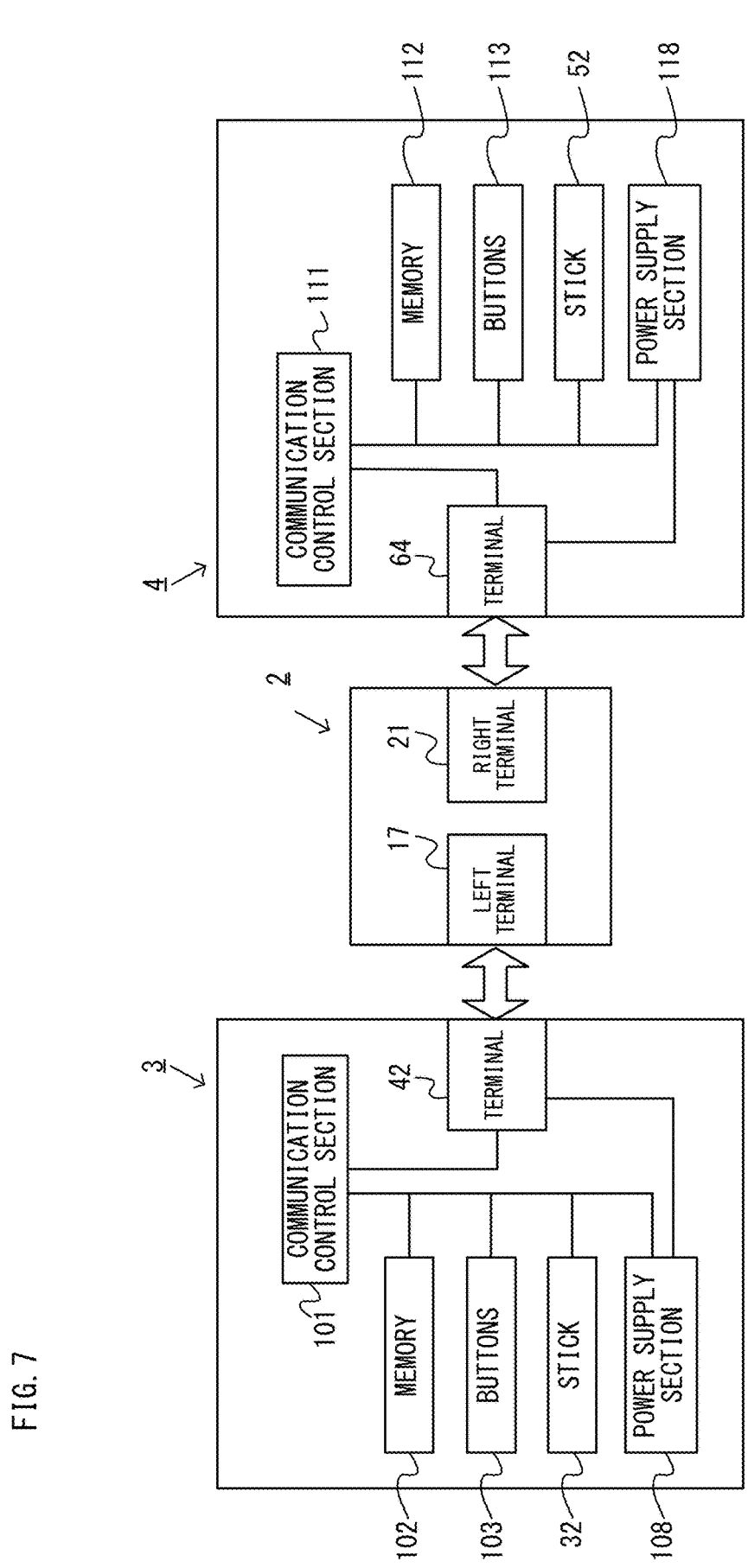
FIG. 7 is a block diagram showing non-limiting example internal configurations of the main body apparatus, the left controller and the right controller shown in FIG. 1 and FIG. 2.

FIG. 7 is a block diagram showing examples of internal configurations of the main body apparatus 2, the left controller 3 and the right controller 4. In addition, details of the internal configuration of the main body apparatus 2 are shown in FIG. 6 and thus are omitted in FIG. 7.

The left controller 3 comprises a communication control section 101 that performs communication with the main body apparatus 2. As shown in FIG. 7, the communication control section 101 is connected to components including the terminal 42. In this embodiment, the communication control section 101 can perform communication with the main body apparatus 2 through both wired communication via the terminal 42 and wireless communication not via the terminal 42. The communication control section 101 controls a method of performing communication by the left controller 3 with the main body apparatus 2. That is, when the left controller 3 is attached to the main body apparatus 2, the communication control section 101 performs communication with the main body apparatus 2 via the terminal 42. Moreover, when the left controller 3 is detached from the main body apparatus 2, the communication control section 101 performs wireless communication with the main body apparatus 2 (specifically, the controller communication section 83). The wireless communication between the communication control section 101 and the controller communication section 83 is performed in accordance with Bluetooth (registered trademark) standard, for example. Moreover, the left controller 3 comprises a memory 102 such as a flash memory. The communication control section 101 is constituted by a microcomputer (also referred to as a microprocessor), for example, and executes firmware stored in the memory 102, thereby performing various processing.

The left controller 3 comprises buttons 103 (specifically, the buttons 33-39, 43, 44 and 47). Further, the left controller 3 comprises the analog stick (in FIG. 7, indicated as "stick") 32. The respective buttons 103 and the analog stick 32 outputs information regarding an operation performed to itself to the communication control section 101 repeatedly at appropriate timings.

The communication control section 101 acquires information regarding an input(s) (specifically, information regarding an operation or the detection results of the sensors) from respective input sections (specifically, the buttons 103, the analog stick 32 and the sensors 104 and 105). The communication control section 101 transmits operation data including the acquired information (or information obtained by performing predetermined processing on the acquired information) to the main body apparatus 2. In addition, the operation data is transmitted repeatedly, once every predetermined time period. In addition, the interval that the information regarding an input(s) is transmitted from each of the input sections to the main body apparatus 2 may or may not be the same.

The above-described operation data is transmitted to the main body apparatus 2, whereby the main body apparatus 2 can obtain an input(s) provided to the left controller 3. That is, the main body apparatus 2 can determine operations on the buttons 103 and the analog stick 32 based on the operation data.

The left controller 3 comprises a power supply section 108. In this embodiment, the power supply section 108 has a battery and a power control circuit. Although not shown, the power control circuit is connected to the battery and also connected to components of the left controller 3 (specifically, components that receive power supplied from the battery).

As shown in FIG. 7, the right controller 4 comprises a communication control section 111 that performs communication with the main body apparatus 2. Moreover, the right controller 4 comprises a memory 112 connected to the communication control section 111. The communication control section 111 is connected to components including the terminal 64. The communication control section 111 and the memory 112 have functions similar to those of the communication control section 101 and the memory 102, respectively, of the left controller 3. Therefore, the communication control section 111 can perform communication with the main body apparatus 2 through both wired communication via the terminal 64 and wireless communication not via the terminal 64 (specifically, communication in conformity with the Bluetooth (registered trademark) standard), and a method of communication to be performed with the main body apparatus 2 is controlled by the right controller 4.

The right controller 4 comprises input sections similar to the input sections of the left controller 3. Specifically, the right controller 4 comprises buttons 113 and the analog stick 52. These input sections have functions similar to those of the input sections of the left controller 3 and operate similarly to the input sections of the left controller 3.

The right controller 4 comprises a power supply section 118. The power supply section 118 has a function similar to the power supply section 108 of the left controller 3, and operates similarly to the power supply section 108.

Figure 8:
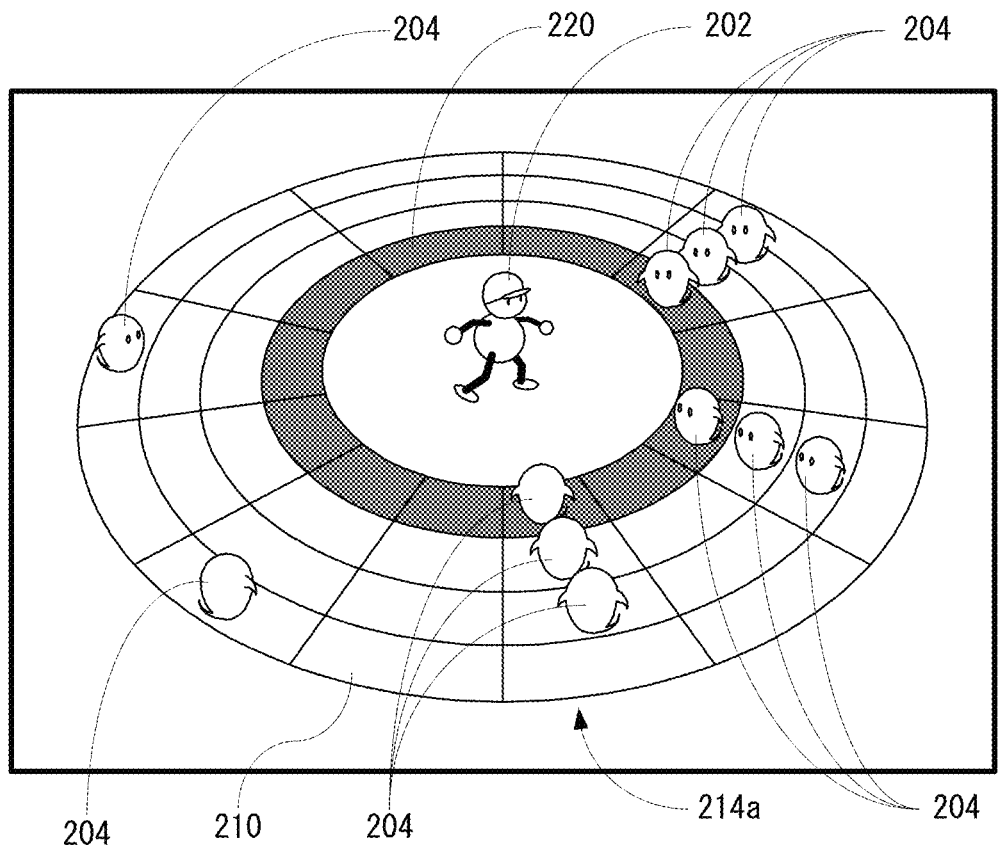
FIG. 8 is an illustration view showing a non-limiting first example normal battle screen.

Next, with reference to FIG. 8-FIG. 18, an outline of game processing of a virtual game application executable in the game system 1 according to this embodiment will be described. FIG. 8 is an illustration view showing a non-limiting first example game image displayed on a display (for example, the display 12) when an application of the virtual game of this embodiment is executed.

The main body apparatus 2 functions also as an image processing apparatus, and generates and outputs (displays) display image data corresponding to various screens such as a game image. The processor 81 arranges various kinds of objects and characters in a three-dimensional virtual space, thereby generating a certain sight or scene. An image imaged this scene by a virtual camera (an image viewed from a viewpoint) is displayed on the display 12 as a game image.

The game image shown in FIG. 8 is a battle screen 200 displayed as an example, when encountering a normal enemy character 204 (hereinafter, referred to as "normal character") different from a boss enemy character 204 (hereinafter, referred to as "boss character") described later. In the following, in order to distinguish from a battle screen 250 displayed at the time of battle with the boss character 204, a battle screen 200 displayed at the time of battle with the normal character 204 is referred to as "normal battle screen 200". Moreover, in this specification, when there is no necessity of distinguishing the normal character 204 and the boss character 204 from each other, simply called the "enemy character 204".

As shown in FIG. 8, the normal battle screen 200 includes a player character 202, multiple normal characters 204 and a board face object 210. In an example shown in FIG. 8, eleven (11) normal characters 204 are displayed. However, the number of the normal characters 204 is appropriately changed according to a degree of difficulty of a game, etc.

Here, the player character 202 is a character object that execution of an arbitrary action or motion thereof is controlled based on an operation by a player. The action or motion of the player character 202 corresponds to moving, acquiring an item, attacking the enemy character 204, defending an attack from the enemy character 204, etc. in a virtual certain place, that is, in a virtual space.

Moreover, the enemy character 204 is a non-player character that an action or motion thereof is controlled by a computer (processor 81 of FIG. 6) rather than an operation by the player. The action or motion of the enemy character 204 corresponds to moving, attacking the player character 202, defending an attack from the player character 202, etc. In this embodiment, although only the enemy character 204 is shown as a character object, in fact, character objects other than an enemy are also displayed.

The board face object 210 is a part of background objects. The background object means mainly a terrain object arranged in the virtual space. Moreover, the terrain means, in general, the ground (including roads, squares, etc.), floors, trees, grass, flowers, buildings, stairs, caves, cliffs, walls, etc. However, in this embodiment, only the board face object 210 is shown.

Figure 9A:
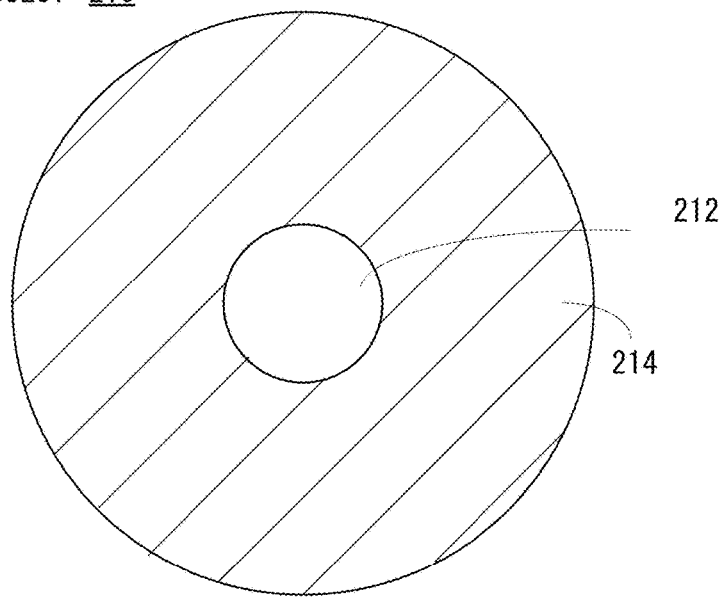
FIG. 9A is an illustration view showing a non-limiting example board face object displayed in a battle screen.
Figure 9B:
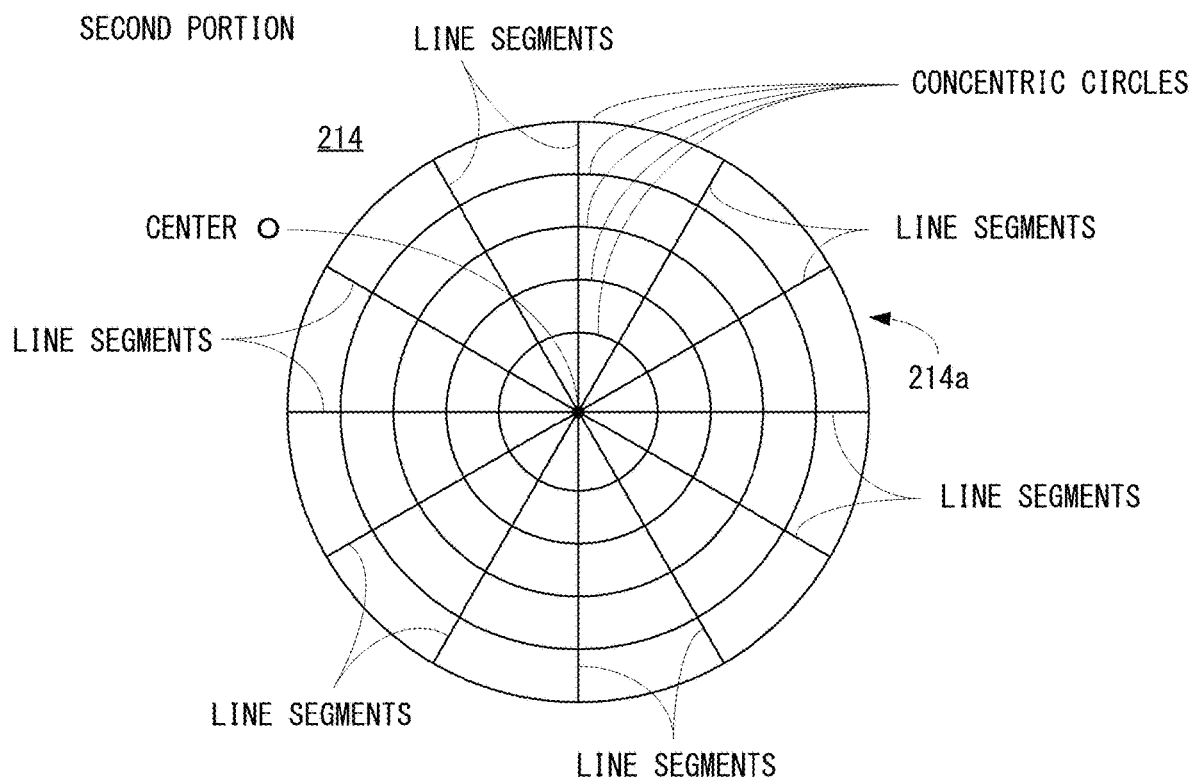
FIG. 9B is an illustration view showing a non-limiting second portion of the board face object shown in FIG. 9A.

FIG. 9A is an illustration view showing a non-limiting example configuration of the board face object 210, and FIG. 9B is an illustration view for showing a non-limiting second portion constituting the board face object 210.

As shown in FIG. 9A, the board face object 210 has a circular board face, and comprises a first portion 212 that is a circle shape at the center (hereinafter, may be referred to as "central object") and a second portion 214 of a doughnut shape except the first portion 212. The second portion 214 includes multiple partial objects 214a. Specifically, as FIG. 9B shows its shape, the second portion 214 is divided into multiple portions (in this embodiment, referred to as "partial object 214a") sectioned by multiple (in this embodiment, five (5)) concentric circles and multiple (in this embodiment, twelve (12)) lines (or line segments) extended radially from the center O shared by these multiple concentric circles. However, each of the multiple partial objects 214a is a minimum unit size that does not include multiple parts being sectioned. However, as shown in FIG. 9A, since there is the central object, in this embodiment, it is assumed that there is no partial object 214a in a portion in contact with the center O.

In this embodiment, in a scene where the player character 202 and the enemy character 204 battle (hereinafter, referred to as "battle scene"), an attack turn is repeated alternately between the player character 202 and the enemy character 204.

Moreover, in this embodiment, the player character 202 can perform two types of attacks. However, the player character 202 may be able to perform three or more types of attacks.

A first one of the attacks is an attack that the player character 202 jumps on the board face object 210 to step on the enemy character 204 (hereinafter, simply referred to as "jump attack"). In the normal battle screen 200, the player character 202 jumps and moves from the center of the board face object 210 toward an outer periphery to sequentially step on multiple normal characters 204 located in a first predetermined range (in this embodiment, on four (4) partial objects 204a lined from an innermost periphery to an outermost periphery) in front of the player character 202. Therefore, in this embodiment, it is possible to defeat at once four (4) normal characters 204 lined in the radial direction by the jump attack.

A second one of the attacks is an attack that the player character 202 hits the enemy character 204 with a hammer on the board face object 210 (hereinafter, simply referred to as "hammer attack"). In the normal battle screen 200, the player character 202 hits multiple normal characters 204 located in a second predetermined range (in this embodiment, on the two by two (2×2) partial objects 214a) in front of the player character 202. Therefore, in this embodiment, it is possible to defeat at once four (4) normal character 204 lined two columns by the hammer attack.

In this embodiment, according to an operation of the player, it is possible to move (or slide) multiple partial objects 214a arranged in a ring shape in a circumferential direction, and to move (or slide) multiple partial objects 214a lined in a straight line (or column) in a radial direction. When the multiple partial objects 214a are moved in the circumferential direction or the radial direction, a game object that is arranged or placed on at least one partial object 214a (hereinafter, referred to as "placed object") is also moved together with the partial object 214a. In the normal battle screen 200, the normal character 204 is the placed object.

Therefore, it is possible for the player to cause the player character to defeat the normal character(s) 204 by performing the jump attack or the hammer attack while changing the arrangement of the normal character(s) 204 by moving multiple partial objects 214a in the circumferential direction or/and the radial direction. For example, if the player character 202 defeats (or makes disappear) all the normal characters 204 existing in the battle scene, the player character 202 or the player wins the battle or gets a game clear.

However, in this embodiment, in order for the player character 202 to win the enemy character 204 in the battle scene, it is necessary to defeat the enemy character 204 (here, all the normal characters 204) before the hit point value of the player character 202 becomes zero (0), and therefore, it is necessary to attack as many normal characters 204 as possible with a single attack. Moreover, the number of times that multiple partial objects 214a can be moved (that is, an upper limit of the number of movement times) is also determined. Therefore, the number of times that the placed object such as the normal character 204 can be moved is also determined. Therefore, it is necessary to lessen the number of times that the multiple partial objects 214a are moved as much as possible in order to perform the jump attack or the hammer attack.

Here, it is described how to move multiple partial objects 214a in the circumferential direction. As shown in FIG. 9B, four (4) rings having different sizes are adjacently formed by five (5) concentric circles. Moreover, each ring includes multiple partial objects 214a (in this embodiment, twelve (12) cells) arranged along with the circumferential direction. In a case where the multiple partial objects 214a are to be moved in the circumferential direction (hereinafter, referred to as "circumferential direction mode"), first, it is selected which multiple partial objects 214a included in which ring are to be rendered as an operation target.

FIG. 10A-FIG. 10D are illustration views showing a non-limiting example method of selecting a ring. In the example shown in FIG. 10A-FIG. 10D, a state where the board face object 210 in the virtual space is viewed from right above is shown, and in order to simplify, only the board face object 210 is shown while omitting the player character 202 and the normal character 204 on the board face object 210. These are the same also for FIG. 11A-FIG. 11C, FIG. 14A-FIG. 14F and FIG. 15A-FIG. 15C, described later.

Figure 10A:
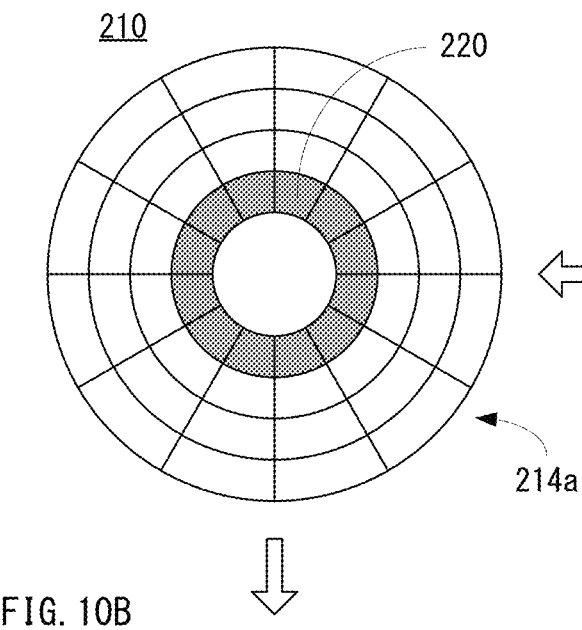
FIG. 10A is an illustration view showing a non-limiting example state where an innermost ring in the second portion is designated.
Figure 10D:
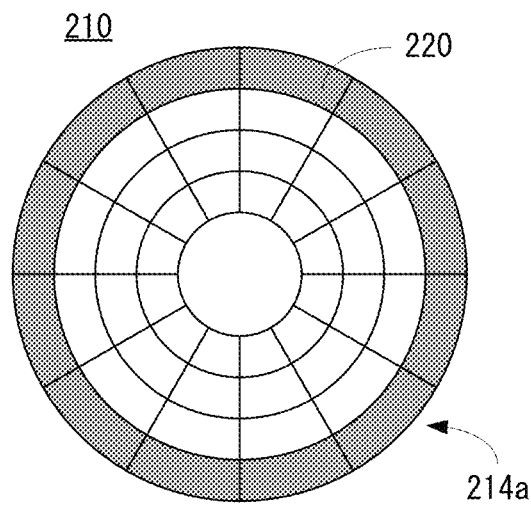
FIG. 10D is an illustration view showing a non-limiting example state where an outermost ring in the second portion.
Figure 10B:
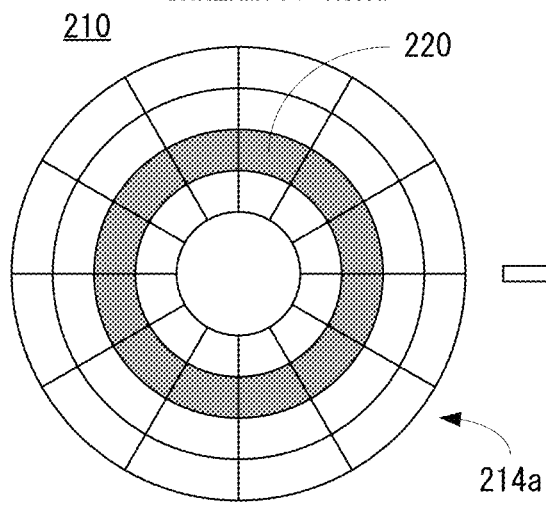
FIG. 10B is an illustration view showing a non-limiting example state where one-outer ring of the innermost ring in the second portion.

At the beginning of displaying the normal battle screen 200, it is a state where an innermost ring is designated by a ring-like designation image 220 as shown in FIG. 10A, and in this state, if the player tilts the analog stick 32 in either direction, the state is changed to a state where the designation image 220 designates a one-outer ring of the innermost ring as shown in FIG. 10B.

Figure 10C:
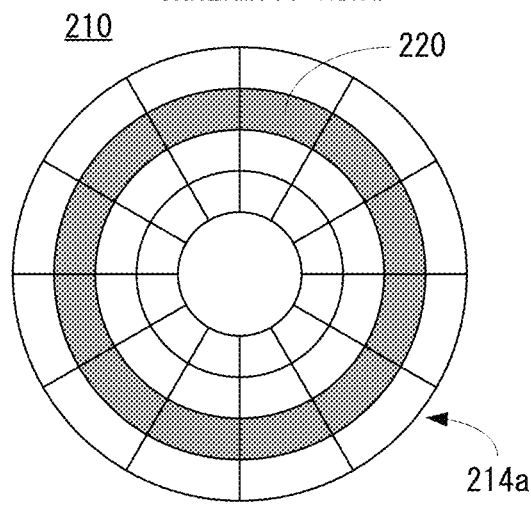
FIG. 10C is an illustration view showing a non-limiting example state where two-outer ring of the innermost ring in the second portion.

In the state shown in FIG. 10B, if the player tilts the analog stick 32 in either direction, the state is changed to a state where the designation image 220 designates a two-outer ring of the innermost ring as shown in FIG. 10C. Furthermore, in the state shown in FIG. 10C, if the player tilts the analog stick 32 in either direction, the state is changed to a state where the designation image 220 designates an outermost ring as shown in FIG. 10D.

In the state shown in FIG. 10D, if the player tilts the analog stick 32 in either direction, the state is changed to a state where the designation image 220 designates the innermost ring as shown in FIG. 10A.

Thus, the designation image 220 is moved toward the outermost ring from the innermost ring according to an operation of the player, so that a designated ring is changed, and next to the outermost ring, the innermost ring is designated again. Thus, the ring that is an operation target is selected. However, the designation image 220 is changed to the same size as the size of the ring to be designated.

In addition, although the designation image 220 is moved toward the outermost ring from the innermost ring in this embodiment, the designation image 220 may be moved toward the innermost ring from the outermost ring. In such a case, next to the innermost ring, the outermost ring is designated again.

Moreover, in another embodiment, instead of displaying the designation image 220, color or/and brightness of the multiple partial objects 214a constituting a designated ring may be different from those of the multiple partial objects 214a constituting other rings.

When a ring including the partial object 214a on which the normal character 204 to be moved is placed is designated by the designation image 220, the player can determinate the multiple partial objects 214a included in this ring as an operation target by depressing the A-button 53. At this time, the designation image 220 is fixedly displayed at a position that the ring is designated when the A-button 53 is depressed.

When the operation target is determined, multiple partial objects 214a included in the ring that is determined as the operation target can be moved (slid) in the circumferential direction according to an operation of the player. If the player rotates rightward the analog stick 32 in a state of being tilted, the multiple partial objects 214a included in the ring of the operation target are rotationally moved rightward (i.e., clockwise). On the other hand, if the player rotates leftward the analog stick 32 in a state of being tilted, the multiple partial objects 214a included in the ring of the operation target are rotationally moved leftward (i.e., counterclockwise).

Figure 11A:
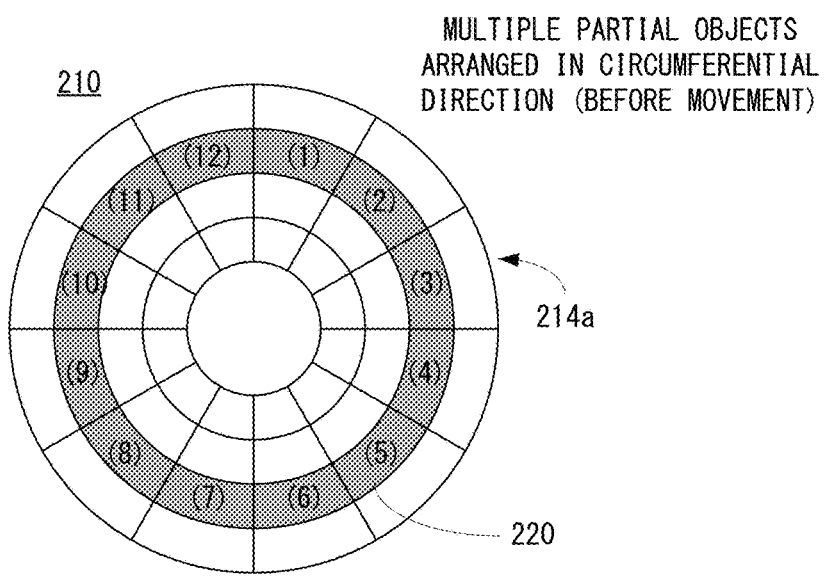
FIG. 11A is an illustration view showing a non-limiting example state where a ring of an operation target is selected.
Figure 11B:
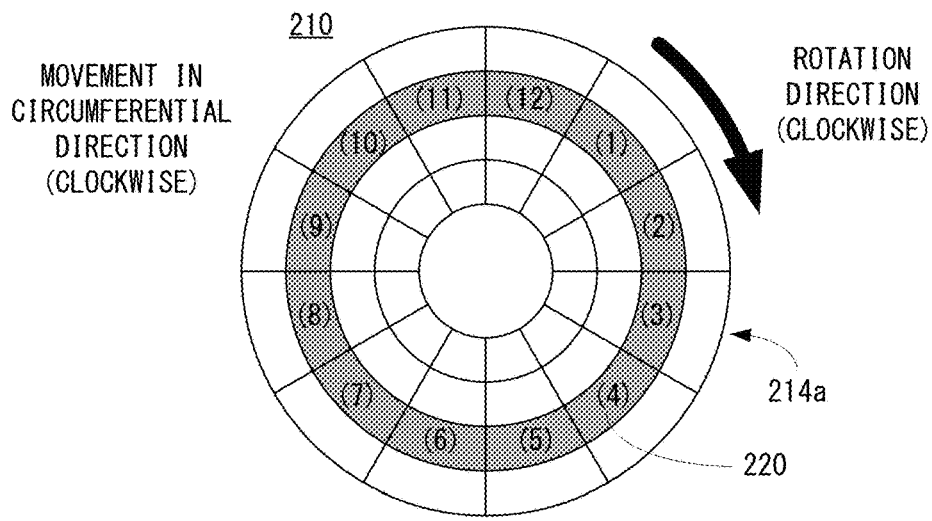
FIG. 11B is an illustration view showing a non-limiting example state where multiple partial objects constituting the ring of the operation target are moved clockwise from the state shown in FIG. 11A by one (1) cell.
Figure 11C:
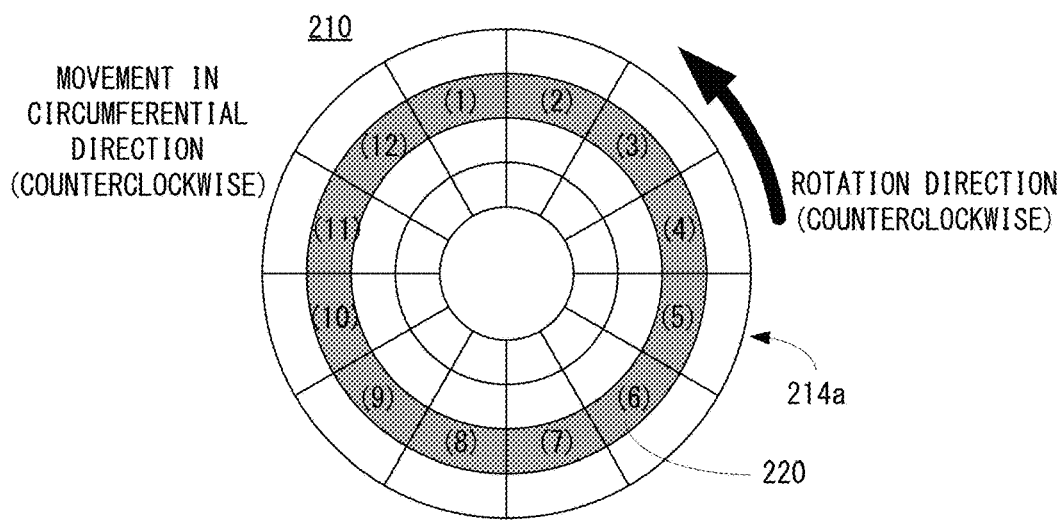
FIG. 11C is an illustration view showing a non-limiting example state where the multiple partial objects constituting the ring of the operation target are moved counterclockwise from the state shown in FIG. 11A by one (1) cell.

FIG. 11A is an illustration view showing a non-limiting example state before a ring of an operation target is determined and multiple partial objects 214a included in this ring are moved. FIG. 11B is an illustration view showing a non-limiting example state where the ring of the operation target is rotationally moved in the circumferential direction from the state shown in FIG. 11A. FIG. 11C is an illustration view showing another non-limiting example state where the ring of the operation target is rotationally moved in the circumferential direction from the state shown in FIG. 11A.

In the examples shown in FIG. 11A-FIG. 11C, for simplifying, only the board face object 210 is shown while omitting the player character 202 and the normal character 204 on the board face object 210. Moreover, in FIG. 11A-FIG. 11C, for convenience of description, respective partial objects 214a are made to be distinguishable by applying an Arabic numeral in parentheses to each partial object 214a included in the ring of the operation target.

FIG. 11A is an illustration view showing a non-limiting example state before a ring of the operation target is determined and multiple partial objects 214a included in this ring are moved. In the example shown in FIG. 11A, the multiple partial objects 214a indicated by (1)-(12) are arranged clockwise.

FIG. 11B is an illustration view showing a non-limiting example state where the multiple partial objects 214a constituting the ring of the operation target are rotationally moved (slid) clockwise from the state shown in FIG. 11A by one (1) cell. That is, the multiple partial objects 214a indicated by (1)-(12) are rotated clockwise by thirty (30) degrees with a center of the center O (see FIG. 9B) to positions shown in FIG. 11B from positions shown in FIG. 11A. Although illustration is omitted, if the player continues an operation that rotates rightward the analog stick 32 in a state of being tilted, the multiple partial objects 214a that constitute the ring of the operation target are further rotationally moved clockwise by one (1) cell.

Moreover, FIG. 11C is an illustration view showing a non-limiting example state where the multiple partial objects 214a constituting the ring of the operation target are rotationally slid counterclockwise from the state shown in FIG. 11A by one (1) cell. That is, the multiple partial objects 214a indicated by (1)-(12) are rotated counterclockwise by thirty (30) degrees with a center of the center O (see FIG. 9B) to positions shown in FIG. 11C from the positions shown in FIG. 11A.

Although illustration is omitted, if the player continues an operation that rotates leftward the analog stick 32 in a state of being tilted, the multiple partial objects 214a that constitute the ring of the operation target are further rotationally moved counterclockwise by one (1) cell.

Thus, by making the multiple partial objects 214a constituting the ring of the operation target slide clockwise or counterclockwise in the circumferential direction, as described above, the placed object is also slid in the circumferential direction together with the partial objects 214a.

In addition, if the B-button 54 is depressed, it is possible to undo the rotational movement (that is, movement in the circumferential direction), and also to cancel the ring of the operation target. When the ring of the operation target is canceled, an operation that selects and determines a ring of an operation target can be performed again by moving the designation image 220.

Figure 12A:
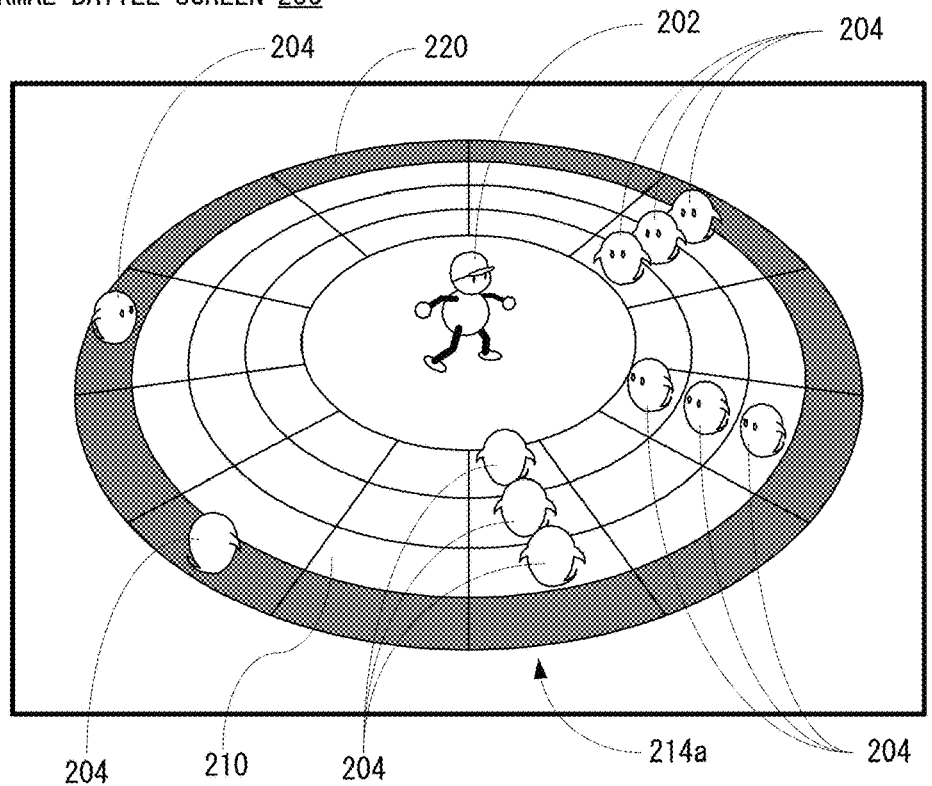
FIG. 12A is an illustration view showing a non-limiting second example normal battle screen.
Figure 12B:
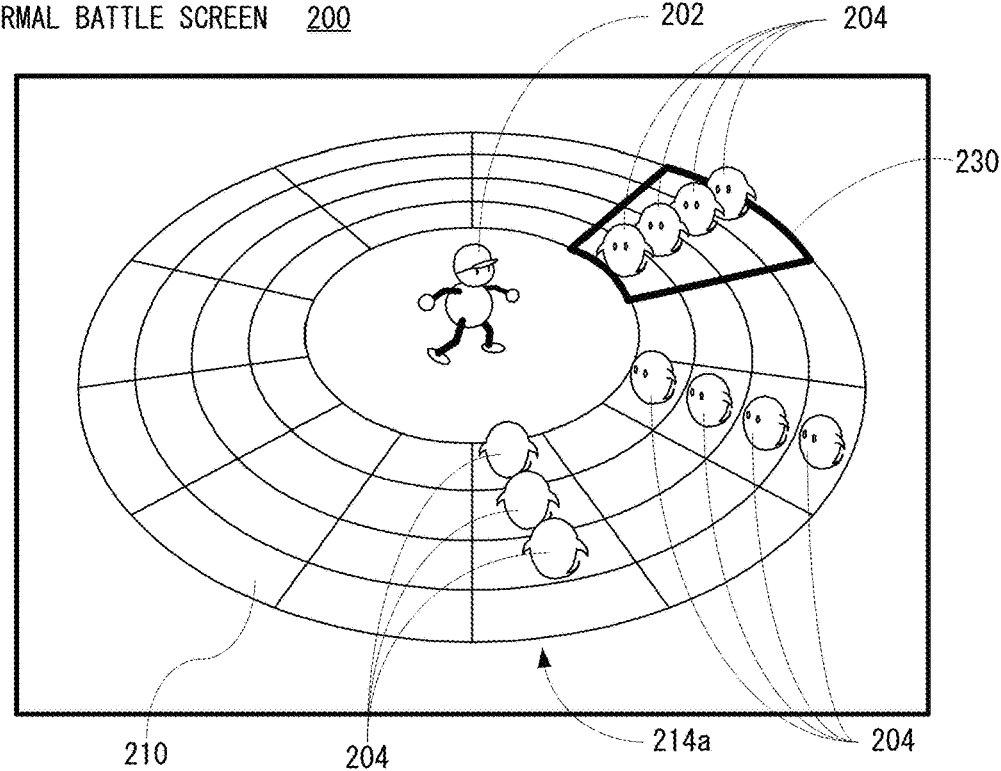
FIG. 12B is an illustration view showing a non-limiting third example normal battle screen.

FIG. 12A is an illustration view showing another non-limiting example normal battle screen, and FIG. 12B is an illustration view showing a further non-limiting example normal battle screen. In FIG. 12A, an outermost ring is determined as a ring of an operation target. If the multiple partial objects 214a constituting the ring of the outermost ring that is an operation target are moved clockwise by four (4) cells or counterclockwise by six (6) cells, positions of multiple normal characters 204 arranged on the multiple partial objects 214a constituting the ring of the operation target are also moved (see FIG. 12B).

The normal battle screen 200 shown in FIG. 12B shows a state where the jump attack is selected and a jump attack range is selected. The normal battle screen 200 shown in FIG. 12B shows a designation image 230 that indicates the jump attack range. The jump attack is an attack that the player character 202 moves from the center of the board face object 210 toward the outer periphery while jumping, and steps on one or more normal characters 204 existing in the moving direction. Therefore, as described above, the jump attack range is a first predetermined range of the partial objects 214a in four (4) cells lined in the radial direction. Therefore, the designation image 230 is indicated by a frame line having a size and a shape surrounding all the partial objects 214a in the four (4) cells lined in the radial direction on the board face object 210. The designation image 230, that is, an attack range is moved leftward or rightward by rotating the analog stick 32 leftward or rightward in a state where the analog stick 32 is being tilted by the player. That is, the jump attack range is selected.

If the player selects and determines the jump attack range, that is, if the jump attack is instructed, the player character 202 performs the jump attack to one or more normal characters 204 existing in the determined range. The hit point value of each of the one or more normal characters 204 attacked by the jump attack by the player character 202 is reduce by a numeral value according to the attack, and the normal character 204 whose hit point value becomes zero (0) is defeated by the player character 202, thereby disappearing from the virtual space.

When the attack turn of the player character 202 is ended, the attack turn of the normal character 204 is started. If the player character 202 defeats all the normal characters 204 until his/her hit point value becomes zero (0), the player character 202 wins the battle with the normal character 204 or gets a game clear. However, if the hit point value of the player character 202 becomes zero (0) or less due to the attack of the normal character 204 before the player character 202 defeats all the normal characters 204, the player character 202 loses the battle with the normal character 204 or the game is over. These are the same also for a case where the hammer attack is performed in the normal battle screen 200 described later.

Figure 13A:
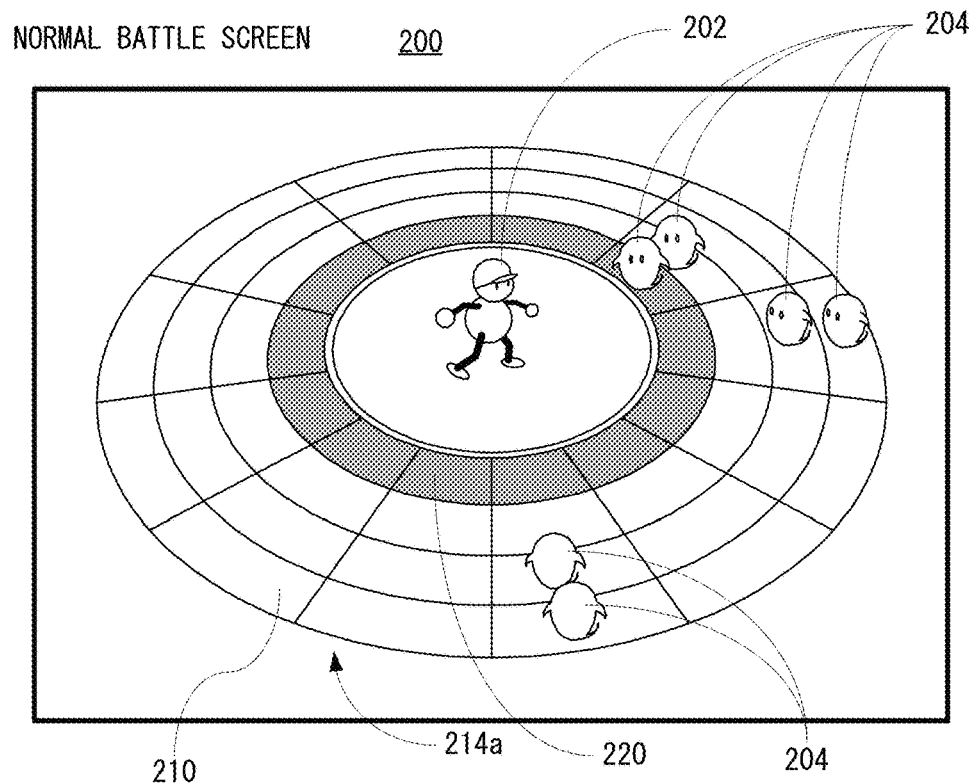
FIG. 13A is an illustration view showing a non-limiting fourth example normal battle screen.
Figure 13B:
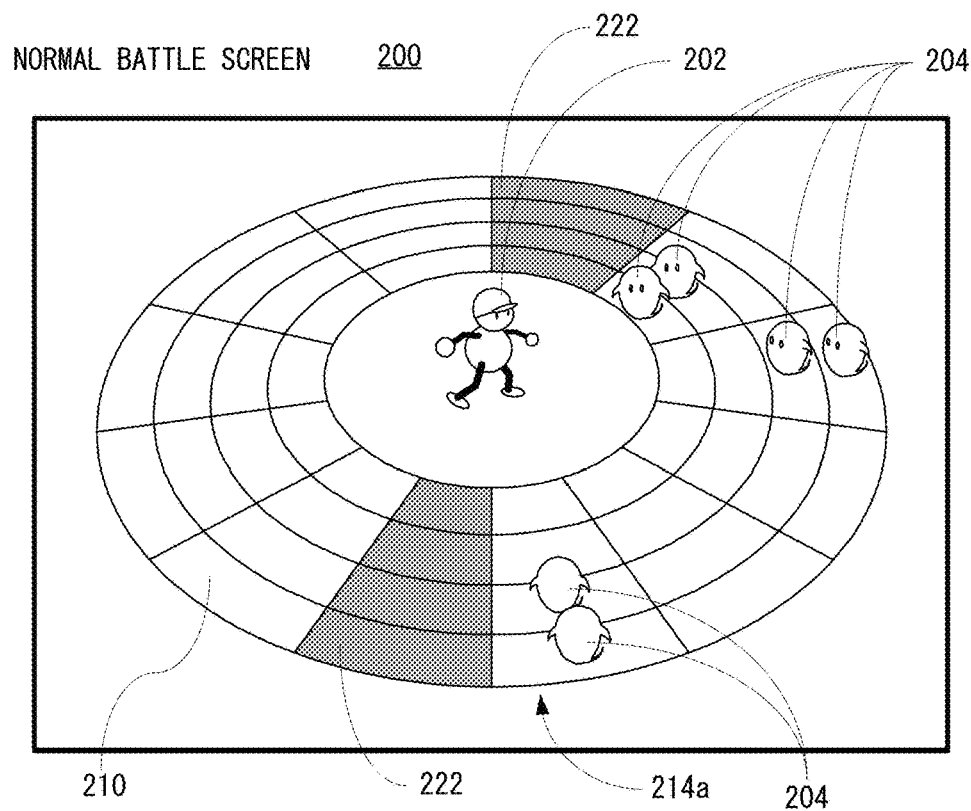
FIG. 13B is an illustration view showing a non-limiting fifth example normal battle screen.

FIG. 13A is an illustration view showing a non-limiting another example normal battle screen 200, and FIG. 13B is an illustration view showing a non-limiting further example normal battle screen 200.

In the normal battle screen 200 shown in FIG. 13A, the normal characters 204 the number and arrangement of which are different from those in the normal battle screen 200 shown in FIG. 8 are arranged on the board face object 210. In the normal battle screen 200 shown in FIG. 13A, if the L-button 38 or the R-button 60 is operated, a method of moving the multiple partial objects 214a is changed. In the normal battle screen 200 shown in FIG. 13B, a mode that moves the multiple partial objects 214a lined on the diameter (hereinafter, referred to as "radial direction mode") is selected. However, if the L-button 38 or the R-button 60 is operated in the radial direction mode, the mode is shifted to the circumferential mode.

Here, a method of moving the multiple partial objects 214a in the radial direction. As shown in FIG. 9B, six (6) columns that extending directions (angle) differ from each other are formed by dividing the board face object 210 by twelve (12) line segments radially extended from the center O. Moreover, each column includes multiple (in this embodiment, eight (8) cells) partial objects 214a lined in the radial direction. That is, each column includes four (4) partial objects (first multiple partial objects) 214a and four (4) partial objects (second multiple partial objects) 214a that are point-symmetry with the four (4) partial objects (first multiple partial objects) 214a with respect to the center O, surrounded by common line segments. When moving the multiple partial objects 214a in the radial direction, first, it is selected and determined which multiple partial objects 214a included in which diameter (or column) are to be made as an operation target.

In this embodiment, in order to explain the twelve (12) different radial directions in a distinguishable manner, the directions will be described using azimuth direction on the map. That is, in FIG. 14A-FIG. 14F (also FIG. 15A-FIG. 15C), an upper direction of the drawings is north (N), a lower direction of the drawings is south (S), a left direction of the drawings is west (W) and a right direction of the drawings is east (E).

Figure 14A:
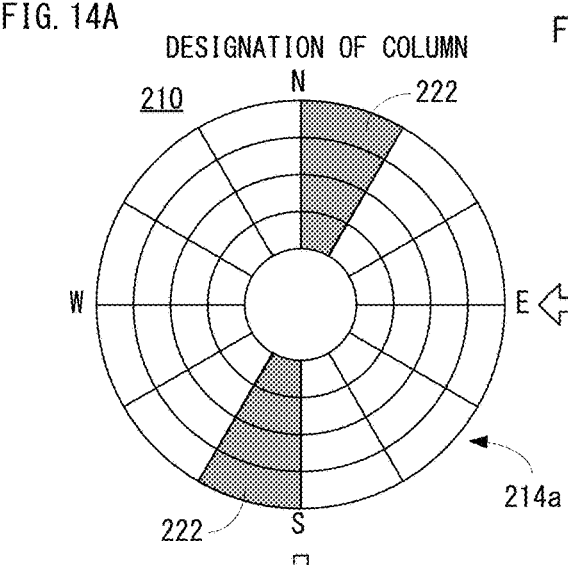
FIG. 14A is an illustration view showing a non-limiting example state where a column extended in a direction of north-northeast and south-southwest out of the second portion is designated.
Figure 14F:
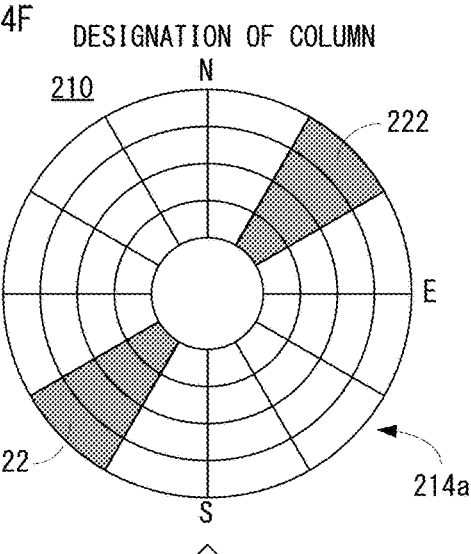
FIG. 14F is an illustration view showing a non-limiting example state where a column extended in a direction of south west and north east out of the second portion is designated.
Figure 14B:
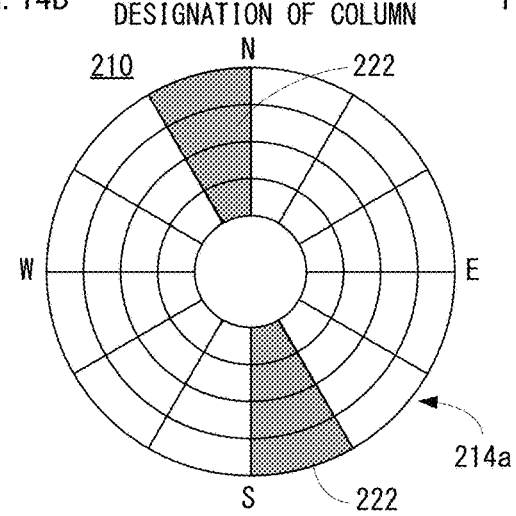
FIG. 14B is an illustration view showing a non-limiting example state where a column extended in a direction of north-northwest and south-southwest out of the second portion is designated.

FIG. 14A-FIG. 14F are illustration views showing a method of selecting a column. At the beginning of a shift to the radial direction mode from the circumferential direction mode, as shown in FIG. 14A, the column extended toward north-northeast and south-southwest is in a state of being designated by a linear designation image 222. For convenience of description, the column extending linearly in a direction of north-northeast and south-southwest shown in FIG. 14A is referred to as a "reference column". In this state, if the player rotates the analog stick 32 in the leftward direction (counterclockwise) in a state of being tilted, the column linearly extending in a direction of north-northwest and south-southeast is designated as shown in FIG. 14B. At this time, the designation image 222 is moved to a position rotated thirty degrees (30°) leftward from the reference column.

Figure 14E:
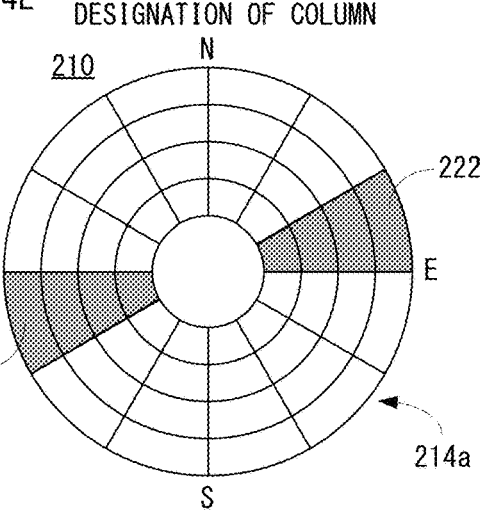
FIG. 14E is an illustration view showing a non-limiting example state where a column extended in a direction of west-southwest and east-northeast out of the second portion is designated.
Figure 14C:
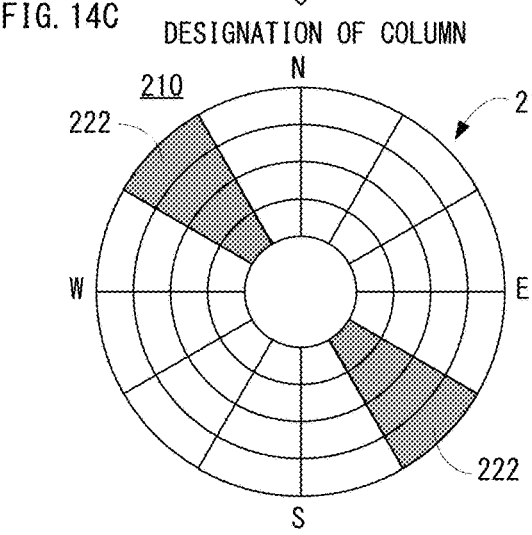
FIG. 14C is an illustration view showing a non-limiting example state where a column extended in a direction of north west and south east out of the second portion is designated.

In the state shown in FIG. 14B, if the player rotates the analog stick 32 in the leftward direction in a state of being tilted, the column linearly extending in a direction of northwest and southeast is designated as shown in FIG. 14C. At this time, the designation image 222 is moved to a position rotated ninety degrees (90°) leftward from the reference column.

Figure 14D:
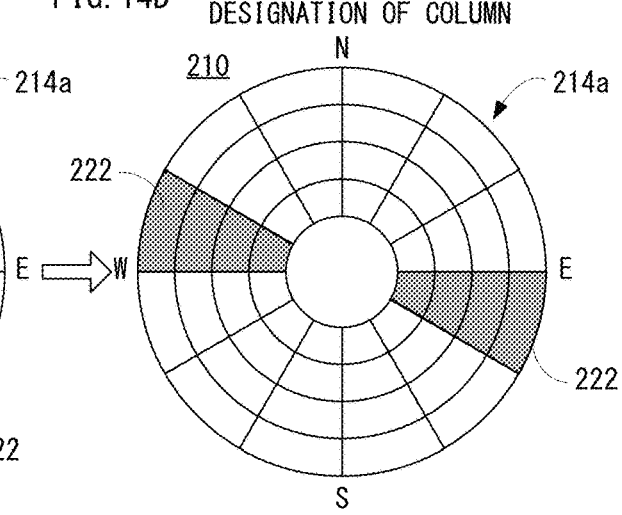
FIG. 14D is an illustration view showing a non-limiting example state where a column extended in a direction of west-northwest and east-southeast out of the second portion is designated.

In a state shown in FIG. 14C, if the player rotates the analog stick 32 in the leftward direction in a state of being tilted, the column linearly extending in a direction of west-northwest and east-southeast is designated as shown in FIG. 14D. At this time, the designation image 222 is moved to a position rotated one-hundred and twenty degrees (120°) leftward from the reference column.

In the state shown in FIG. 14D, if the player rotates the analog stick 32 in the leftward direction in a state of being tilted, the column linearly extending in a direction of west-southwest and east-northeast is designated as shown in FIG. 14E. At this time, the designation image 222 is moved to a position rotated one-hundred and fifty degrees (150°) leftward from the reference column.

In the state shown in FIG. 14E, if the player rotates the analog stick 32 in the leftward direction in a state of being tilted, the column linearly extending in a direction of northwest and southeast is designated as shown in FIG. 14F. At this time, the designation image 222 is moved to a position rotated one-hundred and eighty degrees (180°) leftward from the reference column.

Then, in the state shown in FIG. 14F, if the player rotates the analog stick 32 in the leftward direction in a state of being tilted, the column linearly extending in a direction of north-northeast and south-southeast is designated as shown in FIG. 14A. At this time, the designation image 222 returns to the position of the reference column.

In addition, although a case where the analog stick 32 is rotated leftward is described in this embodiment, may be rotated rightward. In such a case, a designated column (that is, a column selected by the player) is changed in an order of FIG. 14A, FIG. 14F, FIG. 14E, FIG. 14D, FIG. 14C, FIG. 14B and FIG. 14A, and accordingly, the position of the designation image 222 is moved.

Moreover, in another embodiment, instead of displaying the designation image 220, colors or/and brightness of multiple partial objects 214a constituting the column that is being designated may be different from those of the multiple partial objects 214a constituting other columns.

When the column including the partial object 214a on which the normal character(s) 204 to be moved is placed is designated by the designation image 222, the player can determine the multiple partial objects 214a included in this column as an operation target by depressing the A-button 53. At this time, the designation image 222 is fixedly displayed at a position of the column that is designated at the time the A-button 53 is depressed.

When the operation target is determined, the multiple partial objects 214a included in the column that is the determined as the operation target are moved (or slid) in the radial direction according to an operation of the player. When the player tilts the analog stick 32, the multiple partial objects 214a included in the column of the operation target are moved in the tilted direction.

Figure 15A:
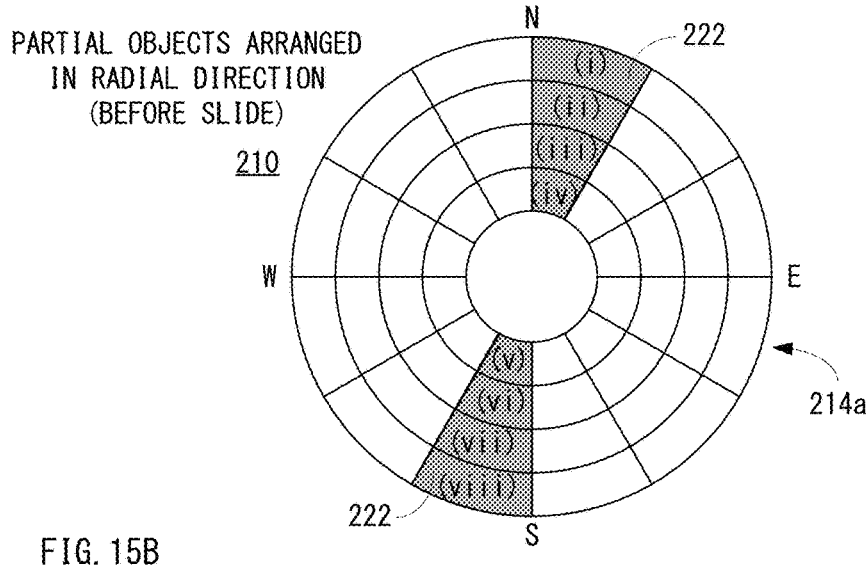
FIG. 15A is an illustration view showing a non-limiting example state where a column of an operation target is selected.
Figure 15B:
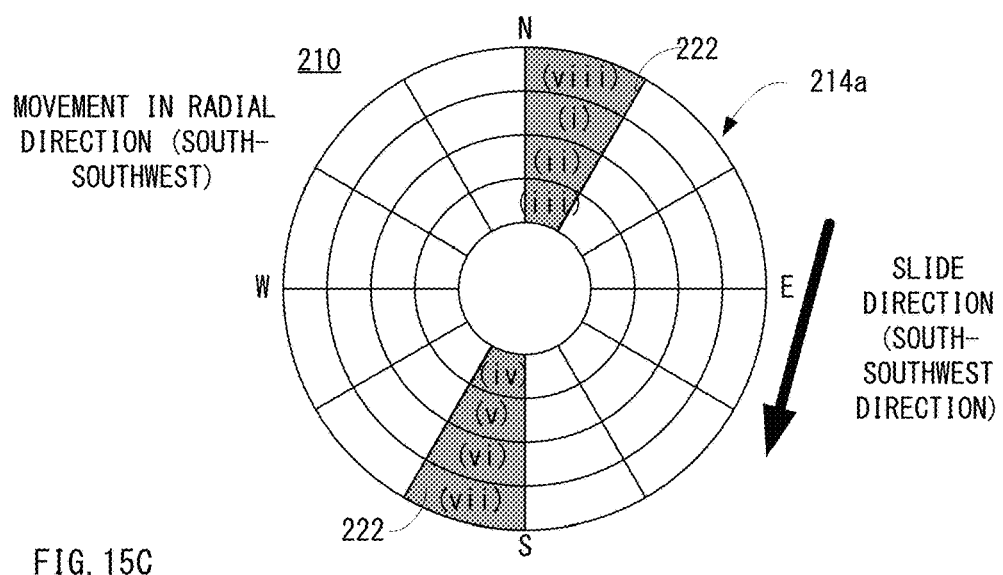
FIG. 15B is an illustration view showing a non-limiting example state where the multiple partial objects constituting the column of the operation target are slid or moved in a direction of south-southwest from the state shown in FIG. 15A by one (1) cell.
Figure 15C:
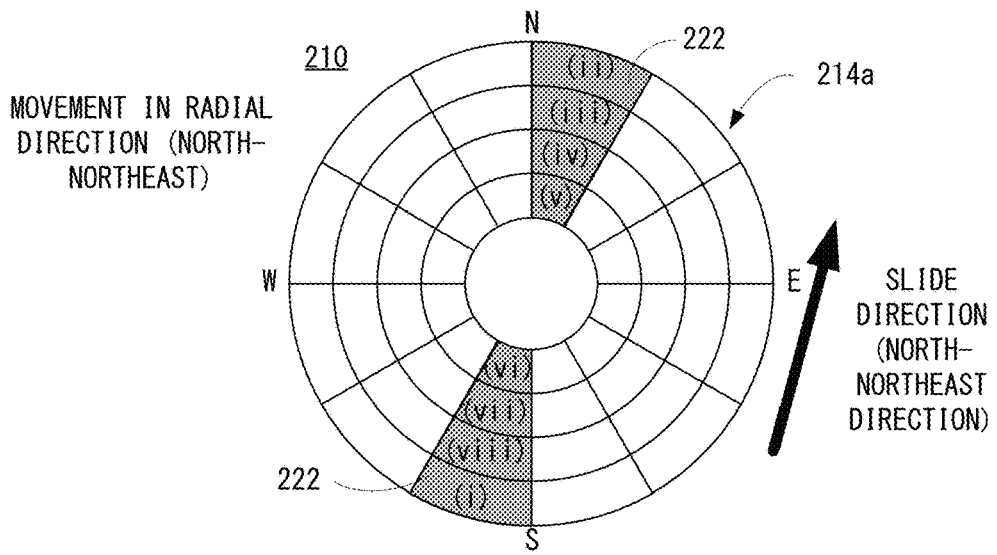
FIG. 15C is an illustration view showing a non-limiting example state where the multiple partial objects constituting the column of the operation target is slid or moved in a direction of north-northeast from the state shown in FIG. 15A by one (1) cell.

FIG. 15A is an illustration view showing a non-limiting example state where a column of an operation target is determined and before the multiple partial objects 214a included in this column are moved. FIG. 15B is an illustration view showing a non-limiting example state where the multiple partial objects 214a included in the column of the operation target are moved in the radial direction from the state shown in FIG. 15A. FIG. 15C is an illustration view showing a non-limiting another example state where the multiple partial objects 214a included in the column of the operation target are moved in the radial direction from the state shown in FIG. 15A.

However, in FIG. 15A-FIG. 15C, for convenience of description, each partial object 214a included in the ring of the operation target is applied with a Roman numeral enclosed in parentheses, so that respective partial objects 214a are made distinguishable.

FIG. 15A is an illustration view showing a non-limiting example state where a column of an operation target is determined and before the multiple partial objects 214a are moved. In the example shown in FIG. 15A, the multiple partial objects 214a indicated by (i)-(viii) are lined from north-northeast toward south-southwest.

FIG. 15B is an illustration view showing a non-limiting example state where the multiple partial objects 214a constituting the column of the operation target are moved (slid) toward south-southwest from the state shown in FIG. 15A by one (1) cell. That is, the multiple partial objects 214a indicated by (i)-(iii) are moved toward an inner periphery side in a direction of south-southwest by one (1) cell, and the multiple partial objects 214a indicated by (v)-(vii) are moved toward an outer periphery side in a direction of south-southwest by one (1) cell. Moreover, the partial object 214a indicated by (iv) is moved in a direction of south-southwest so as to be moved to the innermost periphery cell in an opposite side across the central object 212. Furthermore, the partial object 214a indicated by (viii) is moved in a direction of south-southwest so as to be moved to a cell on the outermost periphery in an opposite side across the central object 212.

In addition, in this embodiment, when moving the partial object 214a in the radial direction, a size and a shape of each the partial object 214a are appropriately changed according to a size and a shape of each of the cells after movement.

Moreover, FIG. 15C is an illustration view showing a non-limiting example state where the multiple partial objects 214a constituting the column of the operation target are slid toward north-northeast from the state shown in FIG. 15A by one (1) cell. That is, the multiple partial objects 214a indicated by (ii)-(iv) are moved toward an outer periphery side in a direction of north-northeast by one (1) cell, and the multiple partial objects 214a indicated by (vi)-(viii) are moved toward an inner periphery side in a direction of north-northeast by one (1) cell. Moreover, the partial object 214a indicated by (i) is moved in a direction of north-northeast so as to be moved to a cell on the outermost periphery in an opposite side across the central object 212. Furthermore, the partial object 214a indicated by (v) is moved in a direction of north-northeast so as to be moved to a cell on the innermost periphery in an opposite side across the central object 212.

Although illustration is omitted, if the player tilts the analog stick 32 up or down, the multiple partial objects 214a constituting the column of the operation target are further moved to south-southwest or north-northeast by one (1) cell. Here, since movement directions are two directions, a simple up/down or left/right input is sufficient for a direction input of the analog stick 32, but the analog stick 32 may be tilted obliquely according to an actual direction.

Thus, by making the multiple partial objects 214a constituting the column of the operation target slide in the radial direction, as described above, the placed object is also slid in the radial direction together with the partial object 214a.

In addition, if the B-button 54 is depressed, it is possible to undo the movement in the radial direction, and also to cancel the column of the operation target. When the column of the operation target is canceled, an operation for selecting and determining a column of the operation target is performed again by moving the designation image 220.

Figure 16A:
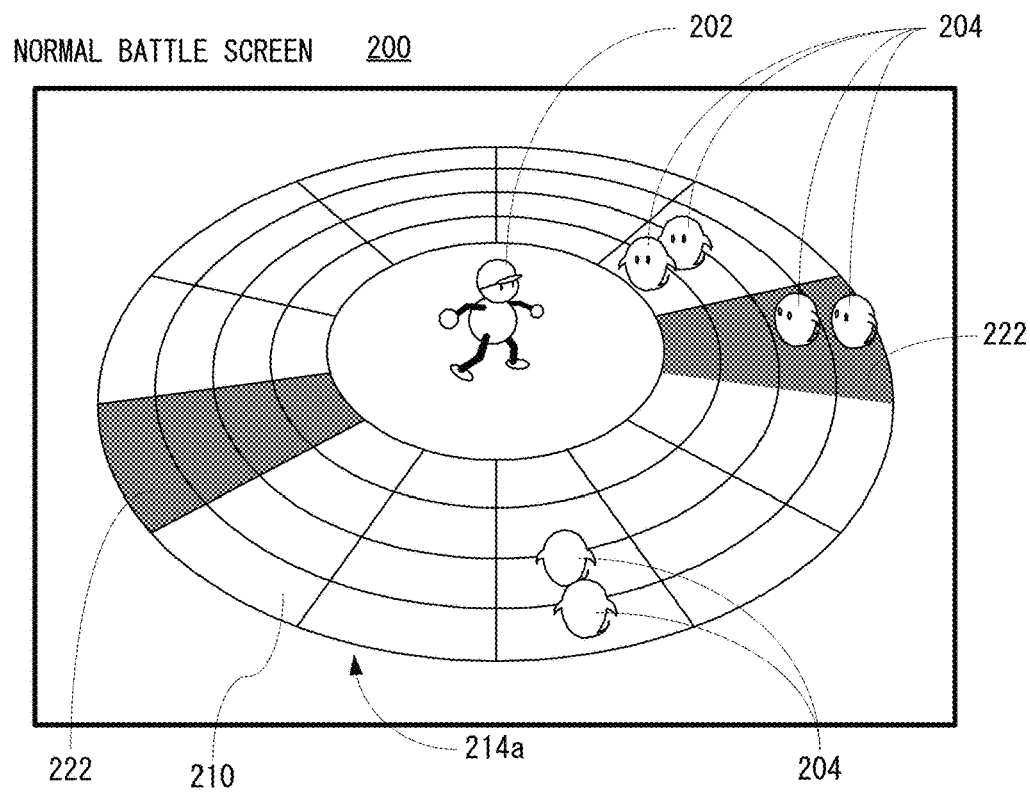
FIG. 16A is an illustration view showing a non-limiting sixth example normal battle screen.
Figure 16B:
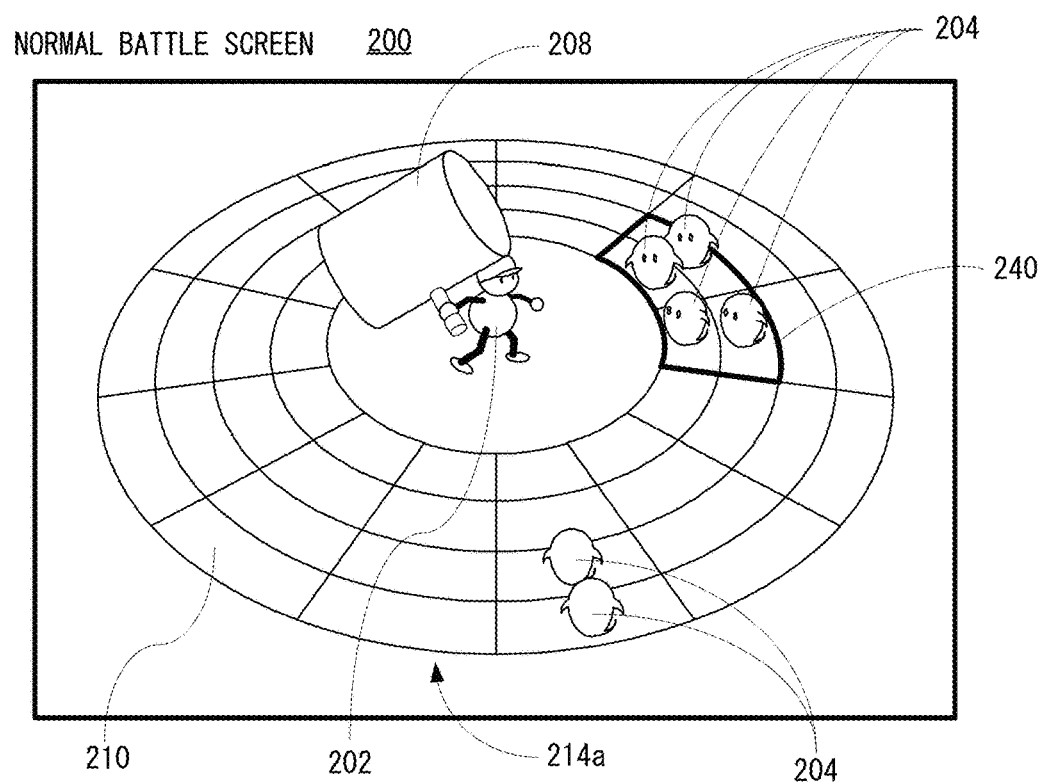
FIG. 16B is an illustration view showing a non-limiting seventh example normal battle screen.

FIG. 16A is an illustration view showing a non-limiting another example normal battle screen 200, and FIG. 16B is an illustration view showing a non-limiting further example normal battle screen 200. In FIG. 16A, a column extended in a direction of east-northeast and west-southeast is determined as a column of the operation target. In this state, if the multiple partial objects 214a constituting the column of the operation target are moved to west-southeast by two (2) cells or moved to east-northeast by six (6) cells, positions of multiple normal characters 204 arranged on the multiple partial objects 214a constituting the column of the operation target are also moved (see FIG. 16B).

In the normal battle screen 200 shown in FIG. 16B, a state where the hammer attack is selected and a hammer attack range is selected is shown. The designation image 230 indicating the hammer attack range is shown in the normal battle screen 200 shown in FIG. 16B. As described above, the hammer attack range is a second predetermined range that is determined by two (2) cells of the innermost periphery near the central object 212 on which the player character 202 is located and two (2) adjacent cells in one-outer periphery. Therefore, the designation image 240 is shown by a frame line having a size and a shape surrounding the partial objects 214a of four (4) cells including the two (2) cells of the innermost periphery and the two adjacent cells in one-outer periphery among the board face objects 210. The designation image 240 is moved leftward or rightward when the player rotates the analog stick 32 leftward or rightward in a state of being tilted. That is, the hammer attack range is selected.

If the player selects and determines the hammer attack range, that is, the hammer attack is instructed, the player character 202 performs the hammer attack on one or more the normal characters 204 existing in the determined range. The hit point value of each of the one or more normal characters 204 having been hit with the hammer attack by the player character 202 is reduced by a numeral value according to the attack, and the normal character 204 whose hit point value becomes zero (0) is defeated by the player character 202 and thus caused to disappear from the virtual space.

Figure 17A:
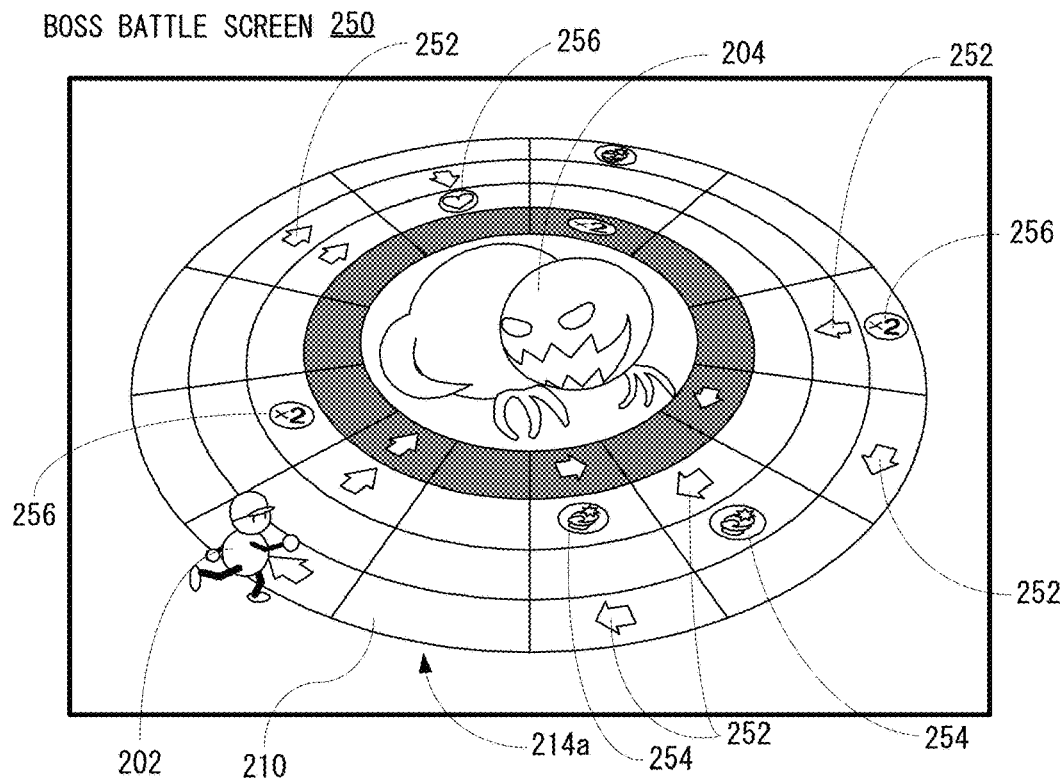
FIG. 17A is an illustration view showing a non-limiting first example boss battle screen.
Figure 17B:
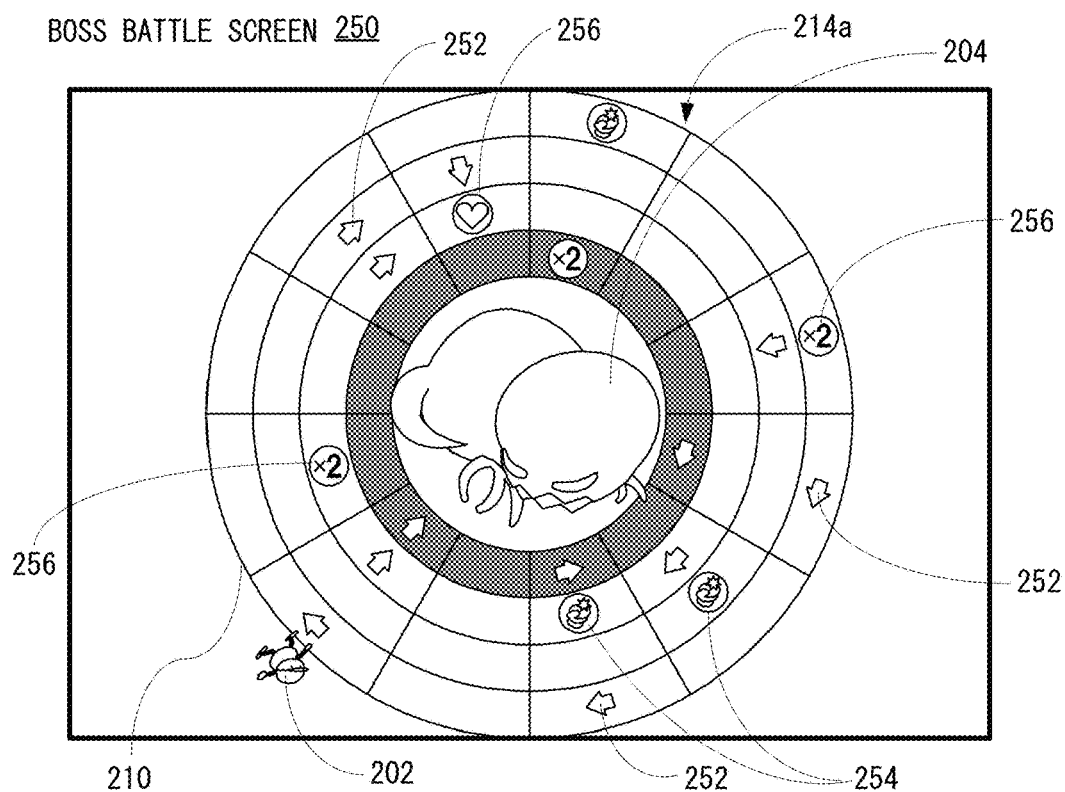
FIG. 17B is an illustration view showing a non-limiting second example boss battle screen.

FIG. 17A is an illustration view showing a non-limiting example battle screen 250 with a boss character 204, and FIG. 17B is an illustration view showing a non-limiting example battle screen 250 with the boss character 204 viewed from the above.

Hereinafter, the battle screen 250 with the boss character 204 is referred to as a "boss battle screen 250".

As shown in FIG. 17A and FIG. 17B, in the boss battle screen 250, the boss character 204 is placed in the central object 212 of the board face object 210, and the player character 202 is placed outside the board face object 210. In the battle with the boss character 204, the player character 202 is moved over the multiple partial objects 214a according to (or along) a direction designation object 252, thereby attacking from the position of the partial object 214a on which an attack instruction object 254 is placed.

The direction designation object 252 is a non-player character object for determining a movement direction of the player character 202. Therefore, if a direction that the player character 202 is being moved and a direction designated by the direction designation object 252 are different from each other, when the player character 202 reaches the partial object 214a on which the direction designation object 252 is placed, the movement direction of the player character 202 is changed to the direction indicated by the direction designation object 252. Moreover, movement of the player character 202 is started when the player character 202 rides on the direction designation object 252 on an outer periphery (on a ring of the outermost periphery) of the board face object 210. In this embodiment, an arrow mark pattern is displayed on the direction designation object 252.

The attack instruction object 254 is a non-player character object for causing the player character 202 to attack the boss character 204. In this embodiment, if the player character 202 reaches the partial object 214a on which the attack instruction object 254 is placed, the player character 202 performs an attack that is selected in advance or upon arrival, for example, the jump attack or the hammer attack. Use of an item may be selectable other than the attack. In this embodiment, a pattern of a punch is displayed on the attack instruction object 254.

As described above, since the player character 202 is moved toward the central object 212 while jumping when performing the jump attack, the player character 202 can attack the boss character 204 even if not having reached the ring of the innermost periphery. However, when a distance from the boss character 204 is large, the hit point value of the boss character 204 reduced by one attack is made small.

Moreover, since the hammer attack can be performed within only a range of two by two (2×2) near the player character 202, that is, the second predetermined range, it is impossible to attack the boss character 204 when the player character 202 has not reached the ring of the innermost periphery or one-outer periphery.

Moreover, in the boss battle screen 250, an effect object 256 is placed on the partial object 214a. In this embodiment, the effect object 256 is a non-player character object by which the number of times that the player character 202 can attack the boss character 204 in one attack turn is doubled (twice) and a non-player character object by which the hit point value of the player character 202 is restored by a predetermined value (or all). The former effect object 256 displays a character of "x2" as a pattern, and the latter effect object 256 displays a heart pattern.

However, the effect object 256 does not need to be limited to these. In another embodiment, an object that increases the damage to the boss character 204, an object that additionally places an effect object 256 on the board face object 210, an object that skips an attack turn of the enemy character 204, etc. may be arranged instead of the effect object 256 of the embodiment, or in addition to the effect object 256 of the embodiment.

Different from the normal battle screen 200, the placed object is the direction designation object 252, the attack instruction object 254 and the effect object 256 in the boss battle screen 250.

In the battle with the boss character 204, the player character 202 moves over the multiple partial objects 214a to attack the boss character 204. Moreover, if the hit point value of the boss character 204 is made zero (0) or less by attacking the boss character 204 by the player character 202, it is possible to defeat the boss character 204. However, if the hit point value of the player character 202 is made zero (0) or less because the boss character 204 attacks the player character 202, the player character 202 is defeated.

Since the number of times that the multiple partial objects 214a can be moved is determined in advance for each attack turn in also the battle with the boss character 204, it is necessary to change the arrangement of the placed object(s) so as to effectively attack the boss character 204.

However, similar to the normal battle screen 200, in also the boss battle screen 250, the player selects the circumferential direction mode or the radial direction mode, and moves the multiple partial objects 214a included in the ring or column that is determined as an operation target in the circumferential direction or the radial direction, thereby to move one or more placed objects according to this movement.

Figure 18:
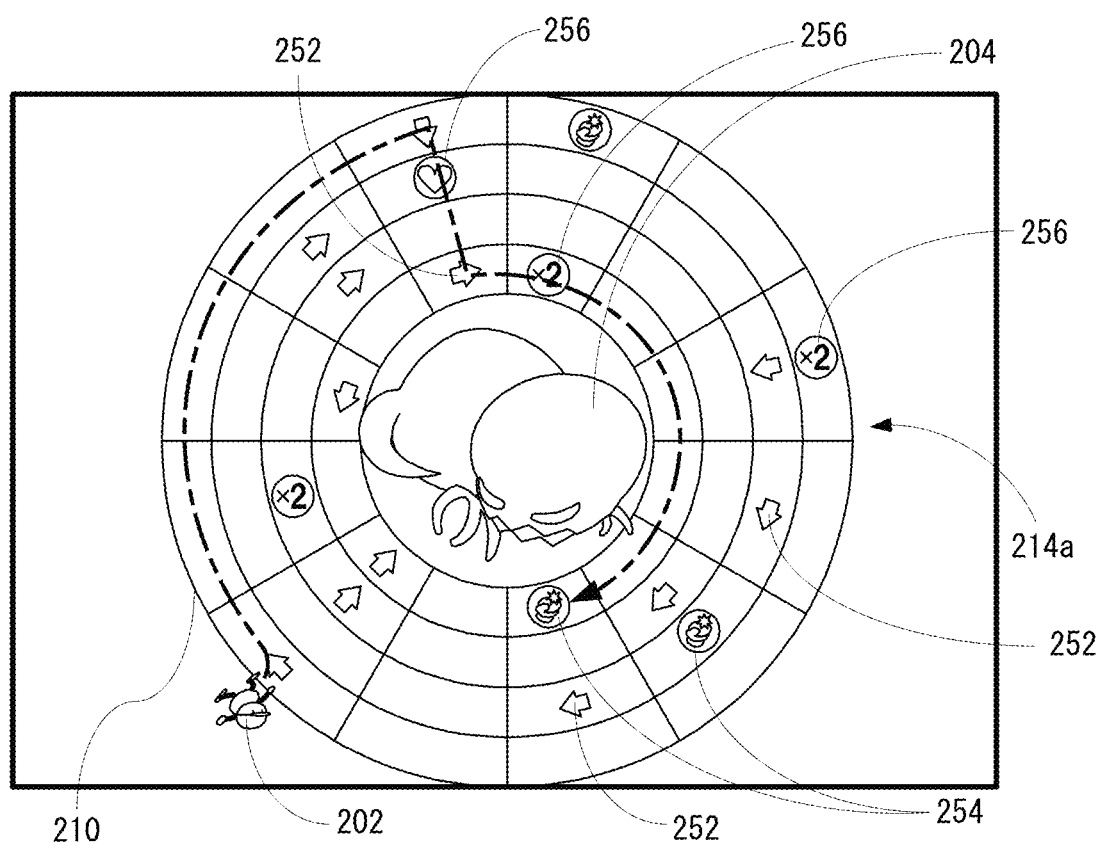
FIG. 18 is an illustration view showing a non-limiting third example boss battle screen.

FIG. 18 is an illustration view showing a non-limiting example boss battle screen 250 in which a path that the player character 202 is moved is indicated. In FIG. 18, the path that the player character 202 is moved is indicated by one-dotted line, and a direction of movement is indicated by an arrow mark.

In addition, the boss battle screen 250 shown in FIG. 18 shows a state where the multiple partial objects 214a constituting the column extended in a direction of west-northwest and east-southeast are moved in a direction of west-northwest by one (1) cell or a direction of east-southeast by seven (7) cells compared with the boss battle screen 250 shown in FIG. 17A and FIG. 17B. Moreover, the multiple partial objects 214a constituting the column extended in a direction of north-northwest and south-southeast are moved in a direction of north-northwest by one (1) cell or a direction of south-southeast by seven (7) cells.

After an operation of the board face is ended, the player character 202 is placed (moved) onto the board face object 210, that is, the player character 202 is made to start moving, and thereafter, moved according to the direction designation object 252. Moreover, in this embodiment, when the number of times that the multiple partial objects 214*a* can be moved has been reached, even if the player does not tilt the analog stick 32, the player character 202 is made to start moving.

In the example shown in FIG. 18, the player character 202 is moved clockwise on the ring of the outermost periphery according to the direction designation object 252 when being moved onto the ring of the outermost periphery of the board face object 210.

Next, the player character 202 on the outermost periphery is moved onto the ring of the innermost periphery according to the direction designation object 252 placed in a direction of north-northwest. The player character 202 passes over the effect object 256 placed on a two-outer ring of the innermost periphery when being moved to the innermost periphery. When the effect of this effect object 256 is exercised, a part or all of the hit point value of the player character 202 is restored.

If reaching the ring of the innermost periphery, the player character 202 is moved clockwise on the ring of the innermost periphery according to the direction designation object 252. The player character 202 on the ring of the innermost periphery attacks the boss character 204 if reaching the partial object 214*a* on which the attack instruction object 254 placed in a direction of south-southeast is placed.

However, a type of attack is the attack selected in advance or upon arrival, for example, the jump attack, the hammer attack or another action such as use of an item. Moreover, the player character 202 passes over the effect object 256 when being moved on the ring of the innermost periphery. When the effect of the effect object 256 is exercised, the number of attack times of the player character 202 is increased to two times. Therefore, the player character 202 performs the jump attack or the hammer attack two times in this attack turn. Thus, when the player character 202 passes over the effect object 256, the player character 202 obtains a predetermined effect to be added in attacking the boss character 204.

Figure 19:
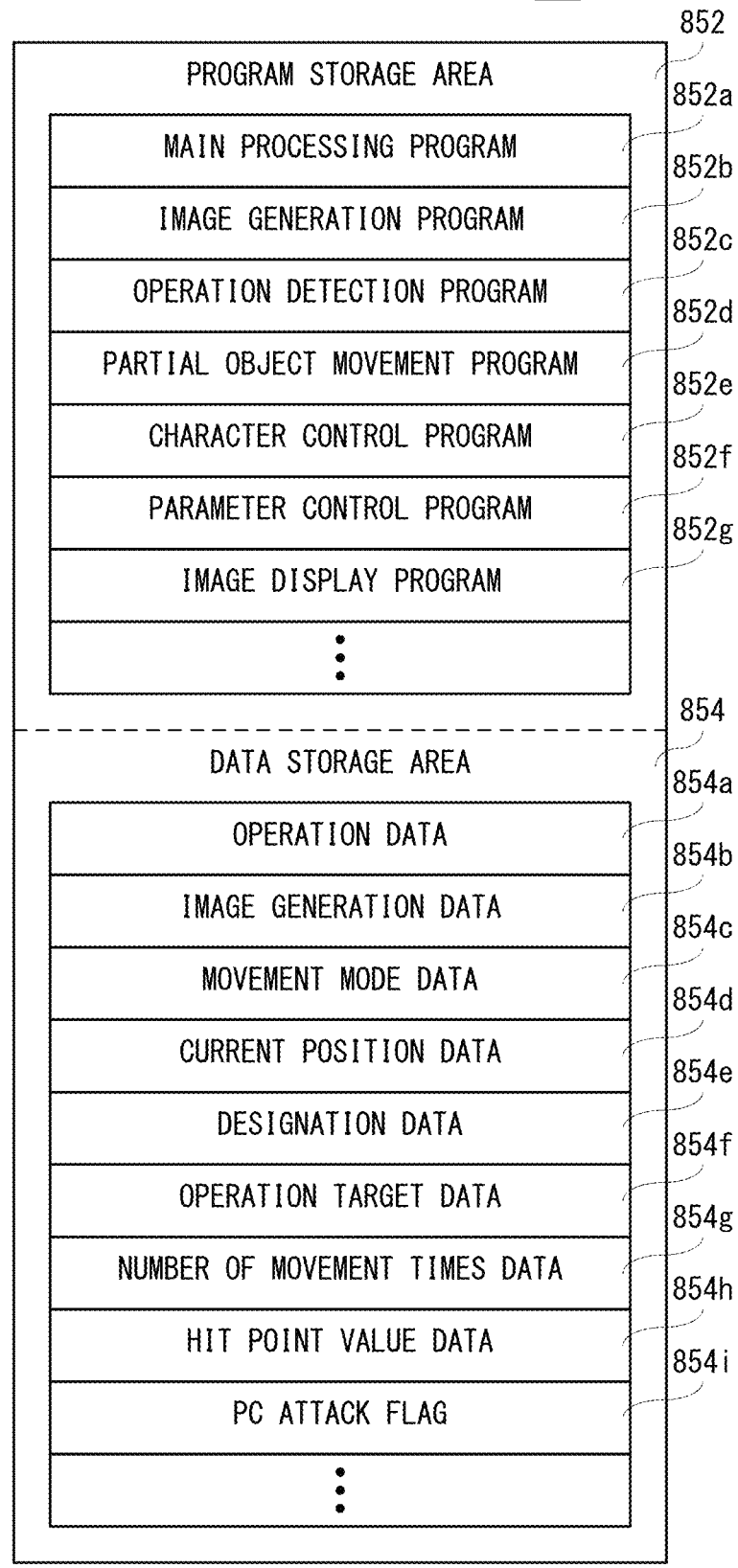
FIG. 19 is an illustration view showing a non-limiting example memory map of a DRAM of the main body apparatus shown in FIG. 6.

FIG. 19 is an illustration view showing a non-limiting example memory map 850 of the DRAM 85 shown in FIG. 6. As shown in FIG. 19, the DRAM 85 includes a program storage area 852 and a data storage area 854. The program storage area 852 is stored with a program of a game application (i.e., game program). As shown in FIG. 19, the game program includes a main processing program 852*a*, an image generation program 852*b*, an operation detection program 852*c*, a partial object movement program 852*d*, a character control program 852*e*, a parameter control program 852*f*, an image display program 852*g*, etc. However, a function of displaying images such as a game image is a function that the main body apparatus 2 is provided with. Therefore, the image display program 852*g* is not included in the game program.

Although detailed description is omitted, at a proper timing after a power of the main body apparatus 2 is turned on, a part or all of each of the programs 852*a*-852*g* is read from the flash memory 84 or/and a storage medium attached to the slot 23 so as to be stored in the DRAM 85. However, a part or all of each of the programs 852*a*-852*g* may be acquired from other computers capable of performing communication with the main body apparatus 2.

The main processing program 852*a* is a program for executing overall game processing of a virtual game of this embodiment. The image generation program 852*b* is a program for generating, using image generation data 854*b*, display image data corresponding to various kinds of images such as a game image.

The operation detection program 852*c* is a program for acquiring the operation data 854*a* from the left controller 3 or/and the right controller 4. The partial object movement program 852*d* is a program for switching between the circumferential mode and the radial direction mode based on an operation by the player, and controlling movement of the multiple partial objects 214*a* in the circumferential direction and the radial direction. Moreover, the partial object movement program 852*d* is also a program for causing the placed object that is placed on the partial object 214*a* to move according to the movement of the partial object 214*a*.

The character control program 852*e* is a program for controlling an action or motion of the player character 202 based on an operation of the player, and controlling an action or motion of the non-player character object including the enemy character 204 regardless of an operation of the player. The parameter control program 852*f* is a program for increasing or decreasing (i.e., controlling) a numerical value of a parameter between the maximum value (in this embodiment, one-hundred (100)) and the minimum (in this embodiment, zero (0)).

The image display program 852*g* is a program for outputting to a display the display image data generated according to the image generation program 852*b*. Therefore, the images (i.e., the battle screens 200 and 250, etc.) corresponding to the display image data are displayed on the display such as the display 12.

In addition, the program storage area 852 is further stored with a sound output program for outputting a sound such as a BGM, a communication program for performing communication with other apparatuses, a backup program for storing data in a nonvolatile storage medium such as the flash memory 84, etc.

Moreover, the data storage area 854 is stored with operation data 854*a*, image generation data 854*b*, movement mode data 854*c*, current position data 854*d*, designation data 854*e*, operation target data 854*f*, number of movement times data 854*d* and hit point value data 854*h*. Moreover, the data storage area 854 is provided with a PC (Player Character) attack flag 854*i*.

The operation data 854*a* is operation data received from the left controller 3 or/and the right controller 4. In this embodiment, when the main body apparatus 2 receives the operation data from both the left controller 3 and the right controller 4, the main body apparatus 2 stores the operation data 854*a* classified into the left controller 3 and the right controller 4, respectively.

The image generation data 854*b* is data required for generating the display image data, such as polygon data and texture data. The movement mode data 854*c* is data for determining the circumferential direction mode or the radial direction mode in a battle scene with the enemy character 204, and specifically, data of identification information of a current mode.

The current position data 854*d* is data of position coordinates of the characters or the objects capable of moving in the virtual space in the current frame, such as the player character 202, the enemy character 204, the partial object 214*a*, the direction designation object 252, the attack instruction object 254 and the effect object 256.

The designation data 854*e* is data for identifying the multiple partial objects 214*a* that are designated (or selected) before determining the multiple partial objects 214*a* of the operation target. The operation target data 854*f* is data for identifying the multiple partial objects 214a that are determined as an operation target.

The number of movement times data 854g is numerical data of the number of times that the multiple partial objects 214a can be moved in an attack turn of the player character 202.

The hit point value data 854h is numerical data that indicates the hit point value (i.e., parameter) of the player character 202, and as describe above, is increased or decreased according to the parameter control program 852f. That is, the hit point value indicated by the hit point value data 854h represents a residual quantity of the hit point value in the current frame. However, the hit point value is set to the maximum value (in this embodiment, one-hundred (100)) at the time of beginning of the virtual game.

The PC attack flag 854i is a flag for determining whether it is the attack turn of the player character 202 or the attack turn of the enemy character 204 during the battle with the enemy character 204. The PC attack flag 854i is turned on in the attack turn of the player character 202, and the PC attack flag 854i is turned off in the attack turn of the enemy character 204.

Although illustration is omitted, the data storage area 854 is stored with other data, and provided with other flags and timers (counters).

Figure 20:
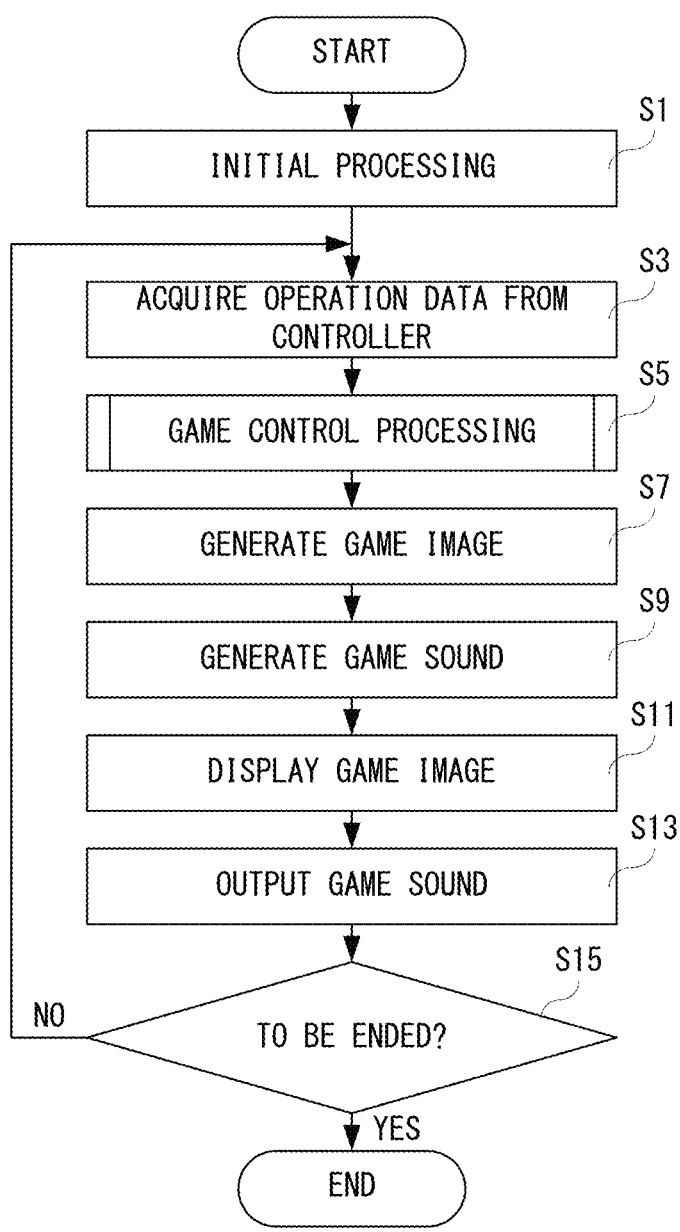
FIG. 20 is a flowchart showing non-limiting example overall game processing by a processor(s) of the main body apparatus shown in FIG. 6.

FIG. 20 is a flowchart showing non-limiting example processing of the game program (overall game processing) by the processor 81 (or computer) of the main body apparatus 2. FIG. 21-FIG. 28 are flow charts showing non-limiting example game control processing by the processor 81 (or computer) of the main body apparatus 2. Furthermore, FIG. 29-FIG. 33 are flow charts showing non-limiting example object control processing by the processor 81 (or computer) of the main body apparatus 2. Although the overall game processing, the game control processing and the object control processing will be described using FIG. 20-FIG. 33 in the following, duplicate description for a step(s) executing the same processing will be omitted.

However, processing of respective steps of the flowcharts shown in FIG. 20-FIG. 33 are mere examples, and if the same or similar result is obtainable, an order of the respective steps may be exchanged. Moreover, in this embodiment, it will be described that the processor 81 basically executes the processing of respective steps of the flowcharts shown in FIG. 20-FIG. 33; however, some steps may be executed by a processor(s) or/and a dedicated circuit(s) other than the processor 81.

When a power of the main body apparatus 2 is turned on, prior to execution of the overall game processing, the processor 81 executes a boot program stored in a boot ROM not shown, whereby respective units including the DRAM 85, etc. are initialized. The main body apparatus 2 starts the overall game processing when the execution of the game program of this embodiment is instructed by the user.

As shown in FIG. 20, when the overall game processing is started, the processor 81 executes initial setting in a step S1. Here, the processor 81 locates the player character 202, the non-player character object(s) including the enemy character 204 and the background object(s) at their initial positions. However, when starting the game from the continuation of the previous time, the player character 202, the non-player character object(s) and the background object(s) are located at positions at the time of save. At this time, the coordinates data of the initial positions or positions at the time of save of the player character 202 and the non-player character object(s) are stored as the current position data 854d in the data storage area 854. Moreover, the processor 81 sets the identification information of the mode indicated by the movement mode data 854c to the identification information of the circumferential direction mode, and sets the hit point value of the player character 202 corresponding to the hit point value data 854h to the maximum value.

In a subsequent step S3, the operation data transmitted from the left controller 3 or/and the right controller 4 is acquired, and in a step S5, the game control processing (see FIG. 21-FIG. 28) described later is executed.

In a next step S7, a game image is generated. Here, the processor 81 generates the game image data corresponding to game images (battle screens 200 and 250, etc.) based on a result of the game control processing in the step S5. Moreover, a game sound is generated in a step S9. Here, the processor 81 generates the sound data corresponding to a game sound according to the result of the game control processing of step S5.

Subsequently, the game image is displayed in a step S11. Here, the processor 81 outputs the game image data generated in the step S7 to the display 12. Moreover, the game sound is output in a step S13. Here, the processor 81 outputs the game sound data generated in the step S9 to the speaker 88 through the codec circuit 87.

Then, in a step S15, it is determined whether the game is to be ended. Determination in the step S15 is executed according to whether the player has issued an instruction to end the game.

If "NO" is determined in the step S15, that is, if the game is not to be ended, the process returns to the step S3. On the other hand, if "YES" is determined in the step S15, that is, if the game is to be ended, overall game processing is ended.

Figure 21:
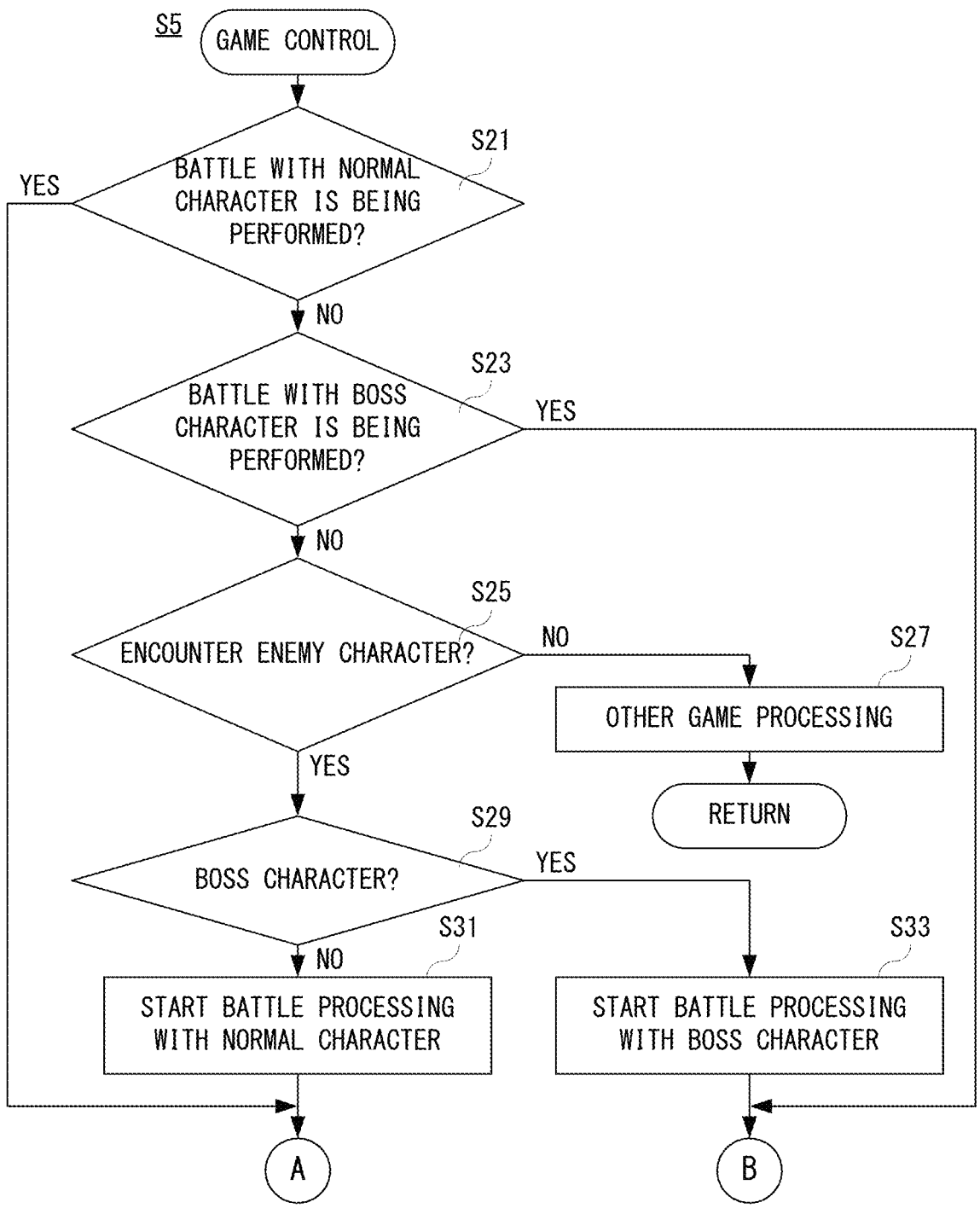
FIG. 21 is a flow chart showing a first part of a non-limiting example game control processing by the processor(s) of the main body apparatus shown in FIG. 6.

As shown in FIG. 21, if the game control processing indicated in the step S5 is started, the processor 81 determines, in a step S21, whether the battle with the normal character 204 is being currently performed.

Figure 22:
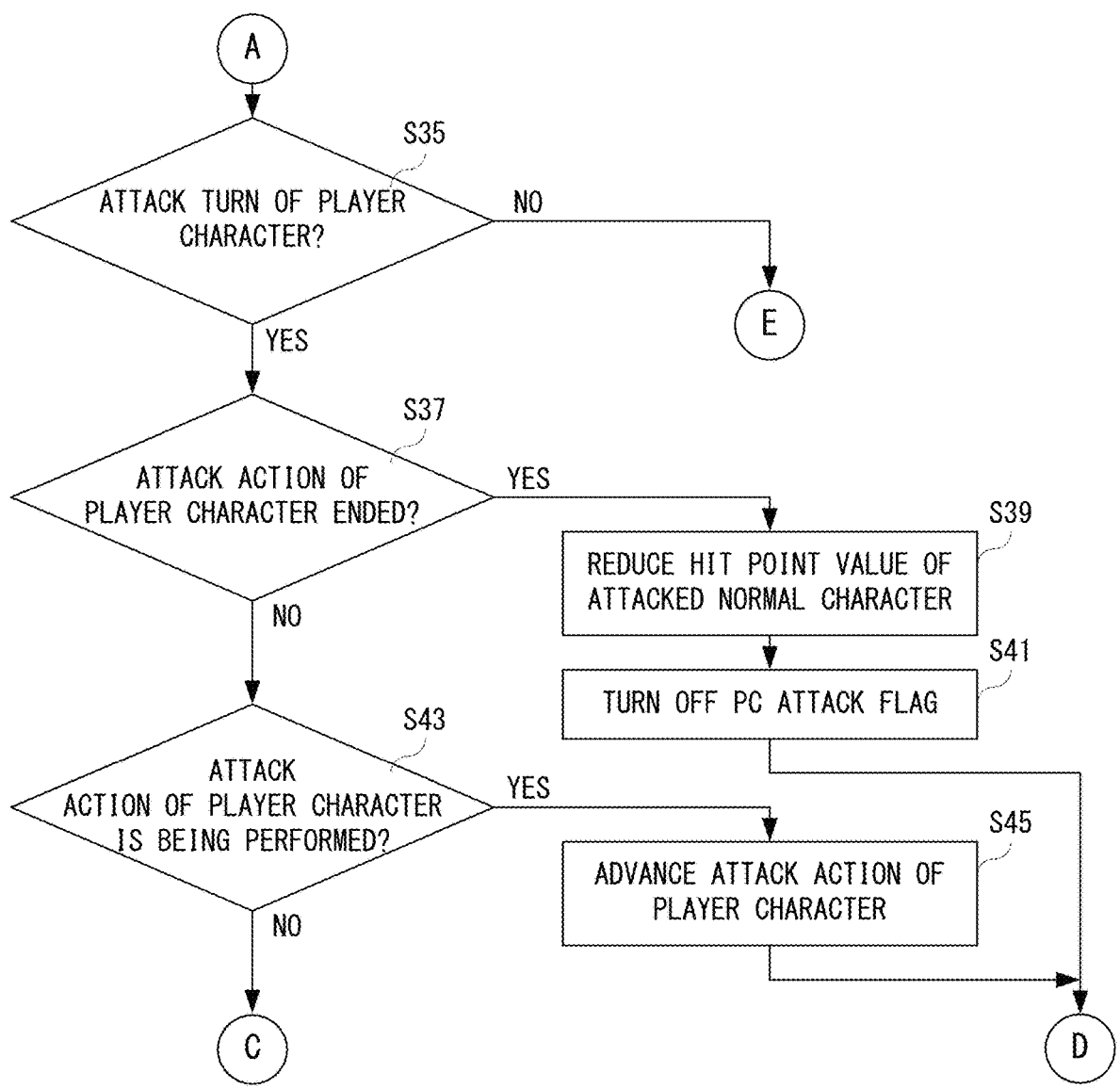
FIG. 22 is a flowchart showing a second part of the non-limiting example game control processing by the processor(s) of the main body apparatus shown in FIG. 6, following FIG. 21.

If "YES" is determined in the step S21, that is, if the battle with the normal character 204 is being currently performed, the process proceeds to a step S35 shown in FIG. 22. On the other hand, if "NO" is determined in the step S21, that is, if the battle with the normal character 204 is not being currently performed, it is determined, in a step S23, whether the battle with the boss character 204 is being currently performed.

Figure 25:
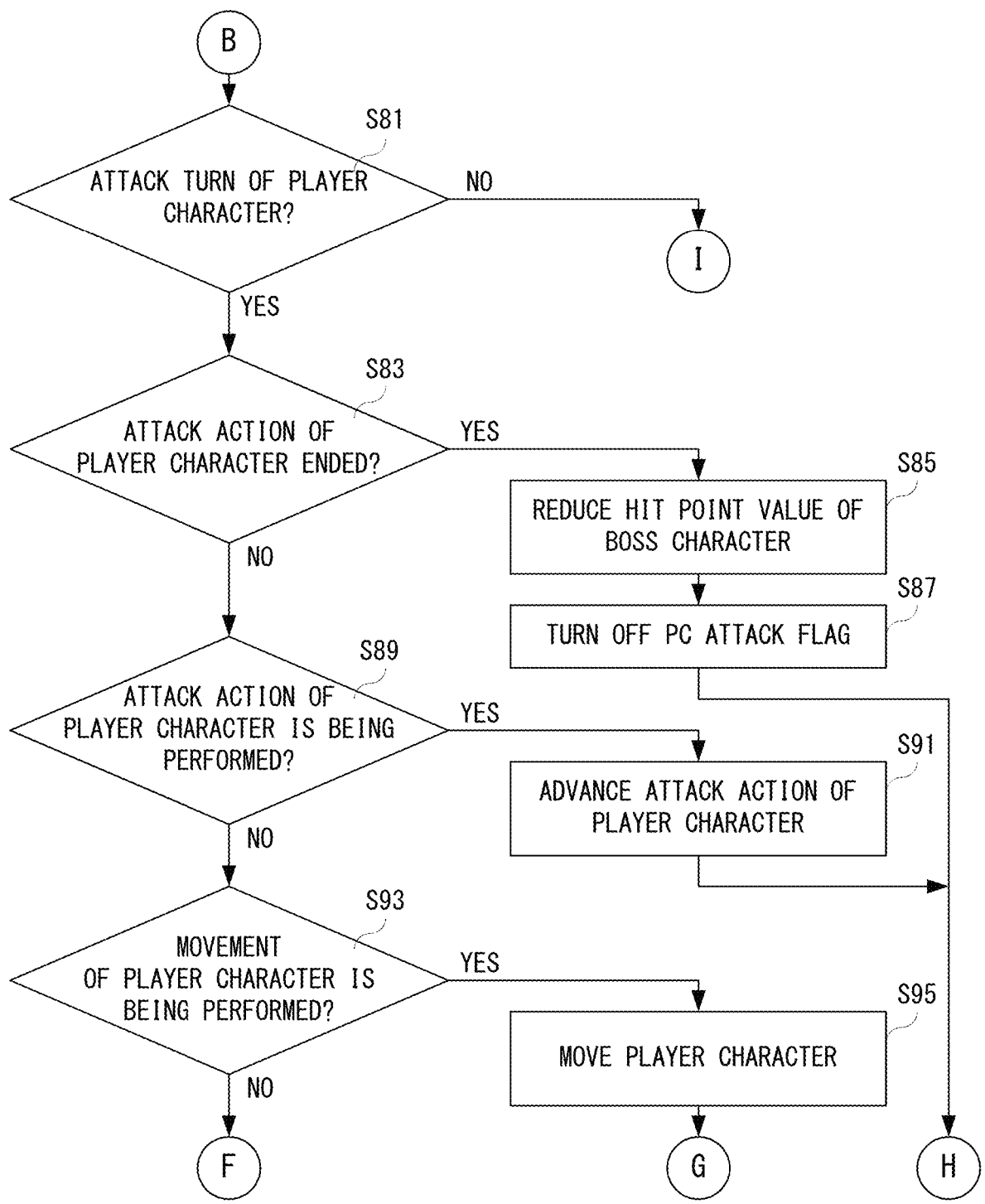
FIG. 25 is a flowchart showing a fifth part of the non-limiting example game control processing by the processor(s) of the main body apparatus shown in FIG. 6, following FIG. 21.

If "YES" is determined in the step S23, that is, if it the battle with the boss character 204 is being currently performed, the process proceeds to a step S81 shown in FIG. 25. On the other hand, if "NO" is determined in the step S23, that is, if the battle with the boss character 204 is not being currently performed, it is determined, in a step S25, whether the player character 202 encounters the enemy character 204.

If "NO" is determined in the step S25, that is, if the player character 202 does not encounter the enemy character 204, other game processing is executed in a step S27, and then, the game control processing is ended, and the process returns to the overall game processing shown in FIG. 20. In the step S27, the processor 81 causes the player character 202 to perform an action or motion other than an action or motion related to the battle according to an operation of the player, and causes the non-player character object(s) including the enemy character 204 to perform an action or motion other than an action or motion related to the battle regardless of an operation of the player. Moreover, the processor 81 executes processing of losing the battle or game over processing when the hit point value of the player character 202 becomes zero (0) or less, and the processor 81 executes processing of winning the battle or game clear processing when making all of multiple normal characters 204 disappear or when the hit point value of the boss character 204 becomes zero (0) or less. These are examples of other game processing, and should not be limited.

On the other hand, if "YES" is determined in the step S25, that is, if the player character 202 encounters the enemy character 204, it is determined, in a step S29, whether the enemy character 204 that the player character 202 encountered is the boss character 204.

If "NO" is determined in the step S29, that is, if the enemy character 204 that the player character 202 encountered is not the boss character 204, battle processing with the normal character 204 is started in a step S31, and the process proceeds to a step S35. At this time, the processor 81 resets the number of movement times indicated by the number of movement times data 854g. When starting the battle processing with the normal character 204, as shown in FIG. 8, the player character 202 is placed in the central object 212 constituting the board face object 210. Moreover, each of the multiple normal characters 204 is placed on the partial objects 214a constituting the board face object 210 according to a predetermined rule. As an example, each of the multiple normal characters 204 is placed on each of the partial objects 214a according to arrangement that is determined in advance. However, the partial objects 214a on each of which each of the multiple normal characters 204 is placed may be determined in advance according to an advancing situation of the game, a type of encountered enemy character 204 or a level of the player character 202 (or player).

On the other hand, if "YES" is determined in the step S29, that is, if the encountered enemy character 204 is the boss character 204, battle processing with the boss character 204 is started in a step S33, and then, the process proceeds to a step S83. At this time, the processor 81 resets the number of movement times indicated by the number of movement times data 854g. When starting the battle processing with the boss character 204, as shown in FIG. 17A, the player character 202 is placed at a predetermined position of an outside of the board face object 210, and the boss character 204 is placed on the central object 212. Moreover, each of the multiple direction designation objects 252, each of the multiple attack instruction objects 254 and each of the multiple effect objects 256 are placed on the partial objects 214a according to a predetermined rule. However, the partial objects 214a on which each of the multiple direction designation objects 252, each of the multiple attack instruction objects 254 and each of the multiple effect objects 256 are placed may be determined according to the boss character 204.

In the step S35 shown in FIG. 22, it is determined whether it is an attack turn of the player character 202. Here, the processor 81 determines whether the PC attack flag 854i is turned on. At a timing of starting the battle processing with the normal character 204, the PC attack flag 854i is turned on. However, the PC attack flag 854i may be turned off at the timing of starting the battle processing with the normal character 204 so as to start from an attack turn of the normal character 204. These are the same when the battle processing with the boss character 204 is started.

Figure 24:
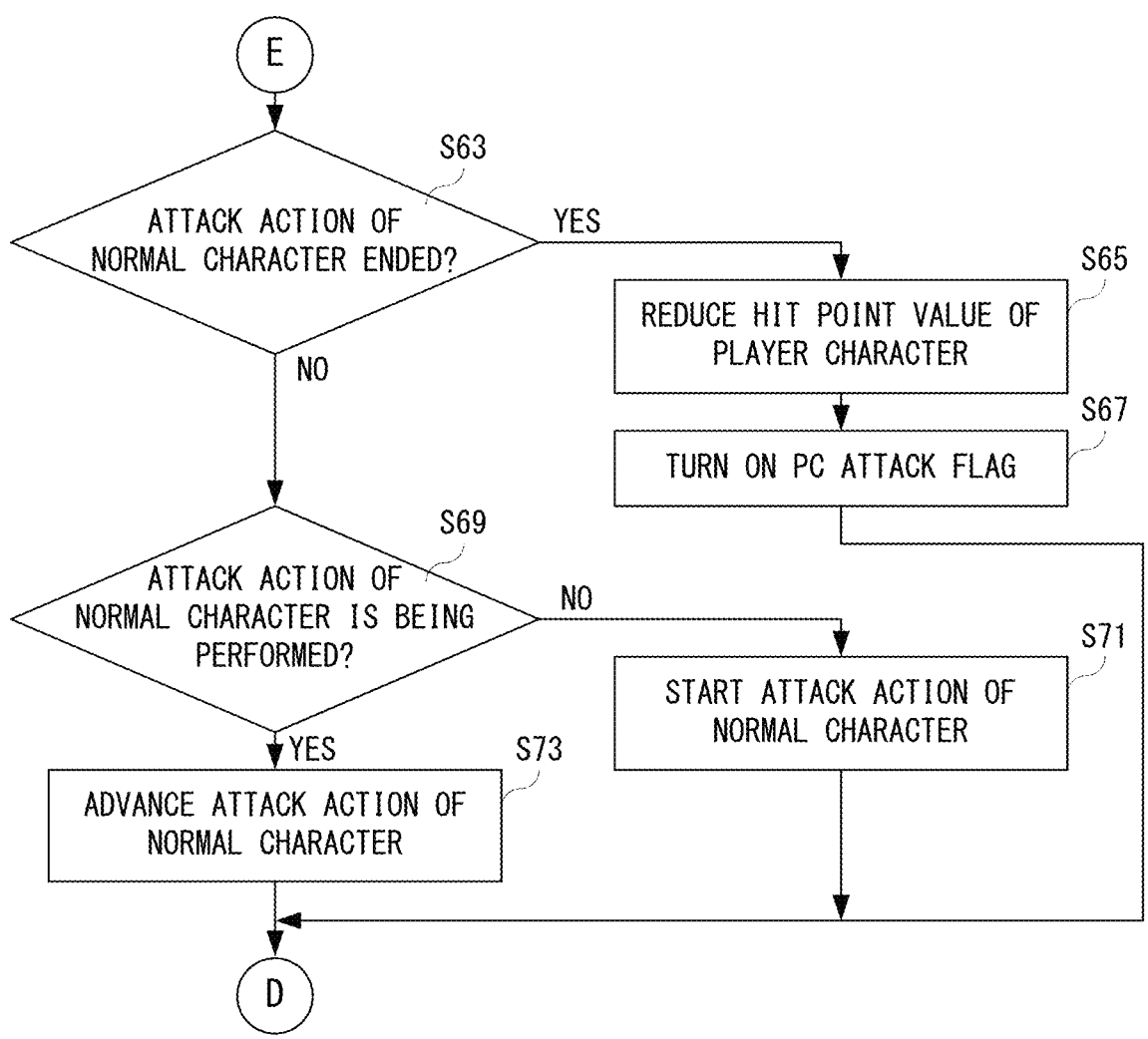
FIG. 24 is a flowchart showing a fourth part of the non-limiting example game control processing by the processor(s) of the main body apparatus shown in FIG. 6, following FIG. 22.

If "NO" is determined in the step S35, that is, if it is the attack turn of the normal enemy character 204, the process proceeds to a step S61 shown in FIG. 24. On the other hand, if "YES" is determined in the step S35, that is, if it is the attack turn of the player character 202, it is determined, in a step S37, whether an attack action of the player character 202 is ended. If "YES" is determined in the step S37, that is, if the attack action of player character 202 is ended, the hit point value of the normal character 204 is reduced by the attack of the player character 202 in a step S39, and in a step S41, the PC attack flag 854i is turned off, and then, the process returns to the overall game processing. However, when the hit point value of the normal character 204 becomes zero (0) or less by being subtracted by a numerical value according to the attack of the processing in the step S39, the processor 81 makes the normal character 204 disappear.

Moreover, if "NO" is determined in the step S37, that is, if the attack action of player character 202 is not ended, it is determined, in a step S43, whether the attack action of the player character 202 is being currently performed. If "YES" is determined in the step S43, that is, if the attack action of the player character 202 is being currently performed, the attack action of the player character 202 is advanced in a step S45, and the process returns to the overall game processing. In the step S45, the processor 81 advances an animation of the attack action of the player character 202 by one (1) frame. This is the same also about steps S73, S91 and S141 described later.

Figure 23:
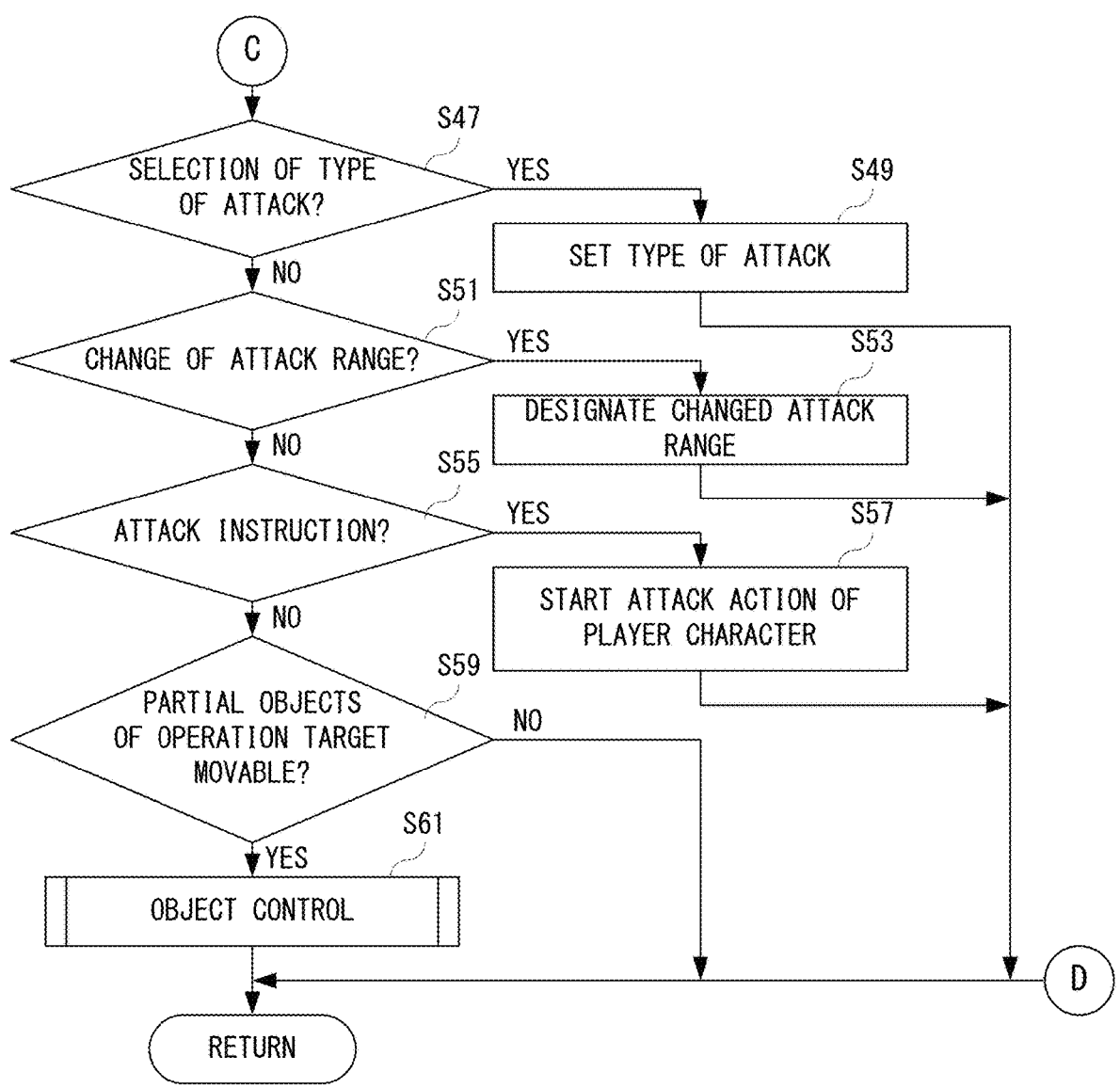
FIG. 23 is a flowchart showing a third part of the non-limiting example game control processing by the processor(s) of the main body apparatus shown in FIG. 6, following FIG. 22.

Moreover, if "NO" is determined in the step S43, that is, if the attack action of the player character 202 is not being currently performed, it is determined, in a step S47 shown in FIG. 23, whether it is selection of a type of attack. Here, the processor 81 determines whether the operation data detected in the step S3 indicates the selection of a type of attack (in this embodiment, the jump attack or the hammer attack).

If "YES" is determined in the step S47, that is, if it is selection of a type of attack, the selected type is set as the type of attack in a step S49, and the process returns to the overall game processing. On the other hand, if "NO" is determined in the step S47, that is, if it is not selection of a type of attack, it is determined, in a step S51, whether it is a change of an attack range.

If "YES" is determined in the step S51, that is, if it is a change of the attack range, the changed attack range is designated in a step S53, and then, the process returns to the overall game processing. In the step S53, the processor 81 changes a position of the designation image 230 or the designation image 240. On the other hand, if "NO" is determined in the step S51, that is, it is not a change of the attack range, it is determined, in a step S55, whether it is an attack instruction. Here, the processor 81 determines whether the A-button 53 is depressed in a state where the designation image 230 or the designation image 240 is displayed and the attack range is instructed.

If "YES" is determined in the step S55, that is, if it is an attack instruction, an attack action of the player character 202 is started in a step S57, and the process returns to the overall game processing. On the other hand, if "NO" is determined in the step S55, that is, if it is not an attack instruction, it is determined, in a step S59, whether the multiple partial objects 214a of an operation target are movable. Here, the processor 81 determines whether the number of movement times indicated by the number of movement times data 854g is zero (0). If the number of the movement times is one (1) or more, the processor 81 determines that the multiple partial objects 214a of the operation target are movable, and if the number of movement times is zero (0), determines that the multiple partial objects 214a of the operation target are not movable.

If "NO" is determined in the step S59, that is, if the multiple partial objects 214a of the operation target are not movable, the process returns to the overall game processing. On the other hand, if "YES" is determined in the step S59, that is, if the multiple partial objects 214a of the operation target are movable, the process returns to the overall game processing after executing in the step S61 the object control processing (see FIG. 29-FIG. 33) described later.

As described above, if "NO" is determined in the step S35, as shown in FIG. 24, it is determined, in a step S63, whether an attack action of the normal character 204 is ended as shown in FIG. 24. If "YES" is determined in the step S63, that is, if the attack action of the normal character 204 is ended, the hit point value of the player character 202 is reduced in a step S65. Here, a numerical value according to the attack of the normal character 204 is subtracted from the hit point value of the player character 202. At this time, the hit point value data 854h is updated. In a next step S67, the PC attack flag 854i is turned on, and the process returns to the overall game processing. The processor 81 resets the number of movement times indicated by the number of movement times data 854g when executing the processing of the step S67.

On the other hand, if "NO" is determined in the step S63, that is, if the attack action of the normal character 204 is not ended, it is determined, in a step S69, whether the attack of the normal character 204 is being currently performed. If "NO" is determined in the step S69, that is, if the attack action of the normal character 204 is not being currently performed, an attack action of the normal character 204 is started in a step S71, and the process returns to the overall game processing. On the other hand, if "YES" is determined in the step S69, that is, if the attack action of the normal character 204 is being currently performed, the attack action of the normal character 204 is advanced in a step S73, and the process returns to the overall game processing.

Figure 26:
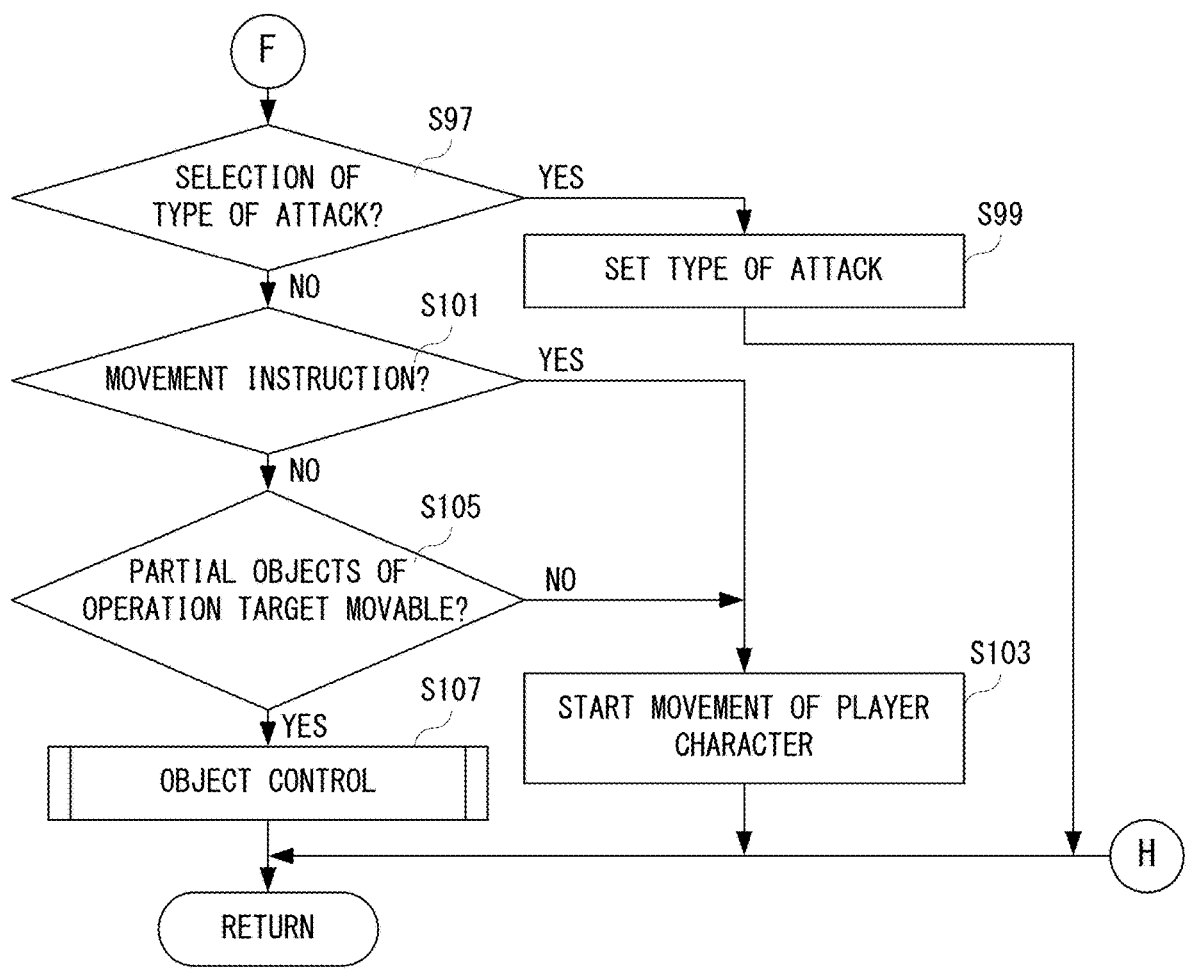
FIG. 26 is a flowchart showing a sixth part of the non-limiting example game control processing by the processor(s) of the main body apparatus shown in FIG. 6, following FIG. 25.

As described above, if "YES" is determined in the step S23 or if the step S33 is executed, as shown in FIG. 25, it is determined, in the step S81, whether it is the attack turn of the player character 202. If "NO" is determined in the step S81, the process proceeds to a step S121 shown in FIG. 28. On the other hand, if "YES" is determined in the step S81, it is determined, in a step S83, whether an attack action of the player character 202 is ended. If "YES" is determined in the step S83, the hit point value of the boss character 204 is subtracted by a numerical value according to the attack in a step S85, and the PC attack flag 854i is turned off in a step S87, and as shown in FIG. 26, the process returns to the overall game processing.

Although omitted in FIG. 19, the hit point value of the boss character 204 is set at the time of starting the battle processing. That is, data corresponding to the hit point value of the boss character 204 (referred to as "boss hit point value data") is stored in the data storage area 854. Therefore, in the step S85, this boss hit point value data is updated.

Moreover, if "NO" is determined in the step S83, it is determined, in a step S89, whether the attack of the player character 202 is being currently performed. If "YES" is determined in the step S89, the attack action of the player character 202 is advanced in a step S91, and the process returns to the overall game processing. On the other hand, if "NO" is determined in the step S89, it is determined, in a step S93, whether movement of the player character 202 is being currently performed.

Figure 27:
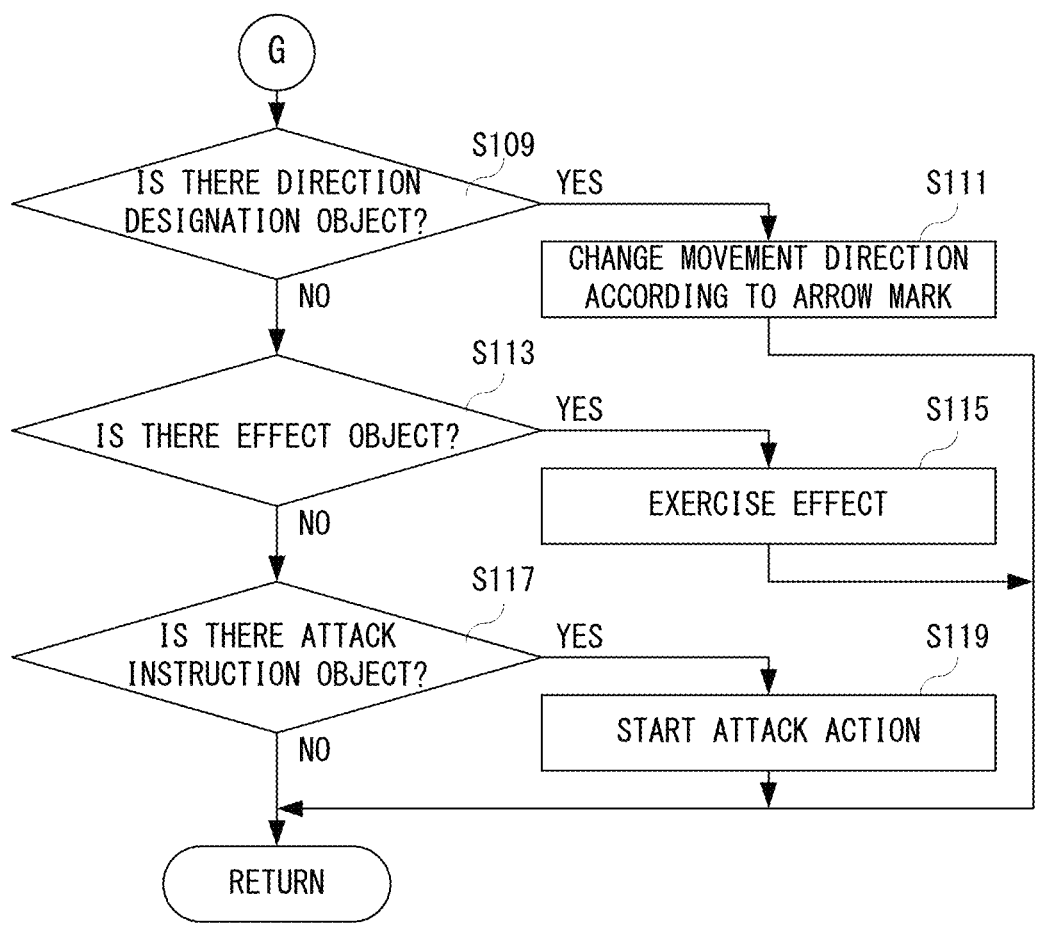
FIG. 27 is a flowchart showing a seventh part of the non-limiting example game control processing by the processor(s) of the main body apparatus shown in FIG. 6, following FIG. 25.

If "YES" is determined in the step S93, that is, if the movement of the player character 202 is being currently performed, the player character 202 is made to move in a step S95, and the process proceeds to a step S109 shown in FIG. 27. In the step S95, the processor 81 makes the player character 202 move in a current moving direction by one frame, and stores a position after movement as the current position. That is, the processor 81 updates the current position data 854d.

On the other hand, if "NO" is determined in the step S93, that is, if the movement of the player character 202 is being currently performed, it is determined, in a step S97 shown in FIG. 26, whether it is selection of a type of attack. If "YES" is determined in the step S97, the selected type is set as the type of attack in a step S99, and the process returns to the overall game processing.

Moreover, if "NO" is determined in the step S97, it is determined, in a step S101, whether it is a movement instruction. Here, the processor 81 determines whether the operation data acquired in the step S3 indicates a movement start. If "YES" is determined in the step S101, that is, if it is a movement instruction, movement of the player character 202 is started in a step S103, and the process returns to the overall game processing. On the other hand, if "NO" is determined in the step S101, that is, if it is not a movement instruction, it is determined, in a step S105, whether the multiple partial objects 214a of the operation target are movable.

If "NO" is determined in the step S105, the process proceeds to the step S103. On the other hand, if "YES" is determined in the step S105, the object control processing (see FIG. 27) described later is executed in a step S107, and the process returns to the overall game processing.

As described above, if the player character 202 is moved in the step S95, as shown in FIG. 27, it is determined, in the step S109, whether there is the direction designation object 252. Here, the processor 81 determines whether the direction designation object 252 is placed on the partial object 214a that the player character 202 reached. The same applies to a case of determination whether there is the attack instruction object 254 and the effect object 256 described later.

If "YES" is determined in the step S109, that is, if there is the direction designation object 252, a movement direction of the player character 202 is changed according to a direction indicated by the direction designation object 252 in a step S111, and the process returns to the overall game processing. However, the movement direction is not changed when the current movement direction of the player character 202 and the direction indicated by the direction designation object 252 are the same.

On the other hand, if "NO" is determined in the step S109, that is, if there is not the direction designation object 252, it is determined, in a step S113, whether there is the effect object 256. If "YES" is determined in the step S113, that is, if there is the effect object 256, an effect is exercised in a step S115, and the process returns to the overall game processing. In the step S115, the number of attack times is increased to two (2) times, or the hit point value of the player character 202 is restored in part or all.

Moreover, if "NO" is determined in the step S113, that is, if there is not the effect object 256, it is determined, in a step S117, whether there is the attack instruction object 254. If "YES" is determined in the step S117, that is, if there is the attack instruction object 254, an attack action is started in a step S119, and the process returns to the overall game processing. On the other hand, if "NO" is determined in the step S117, that is, if there is not the attack instruction object 254, the process returns to the overall game processing.

Figure 28:
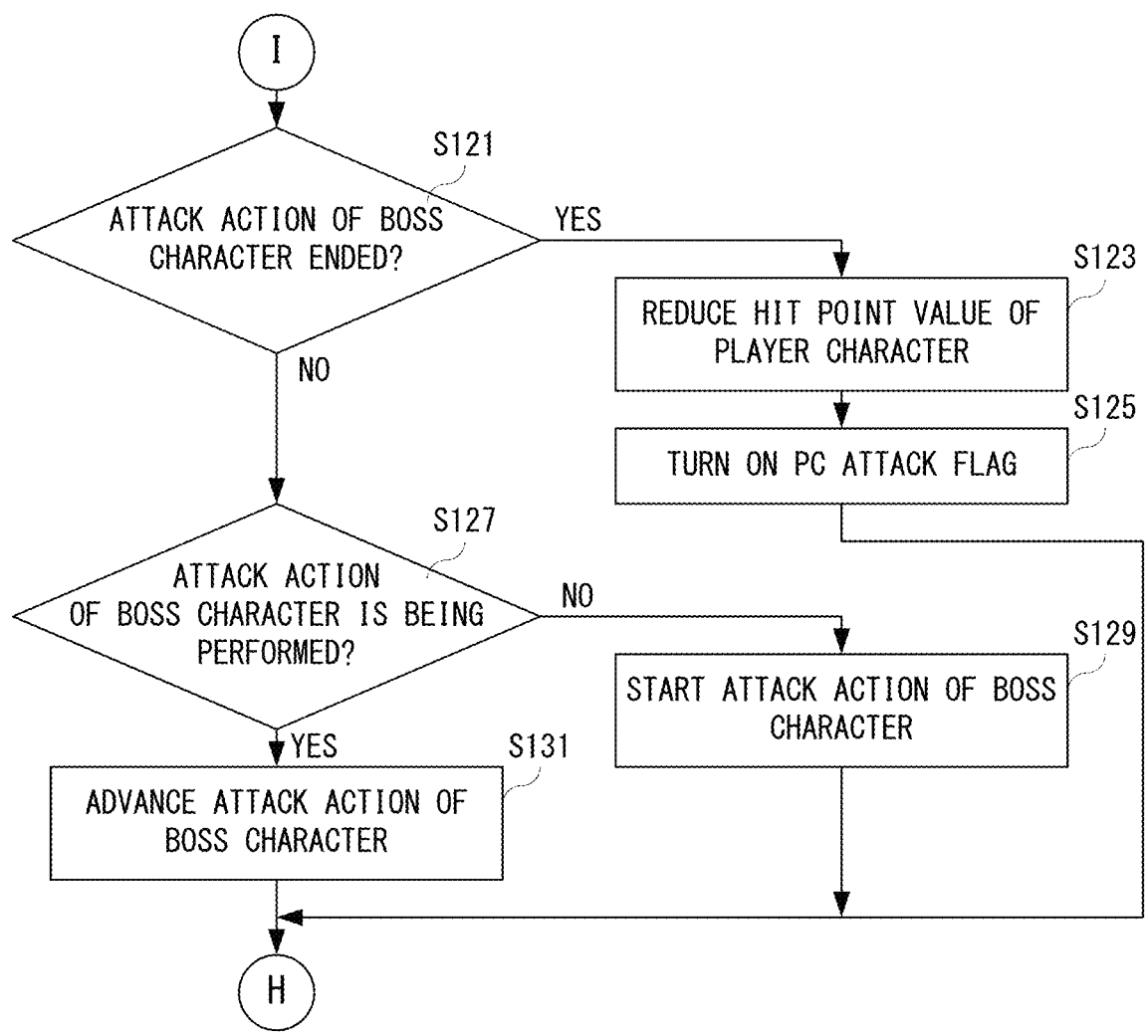
FIG. 28 is a flowchart showing an eighth part of the non-limiting example game control processing by the processor(s) of the main body apparatus shown in FIG. 6, following FIG. 25.

As described above, if "NO" is determined in the step S81, as shown in FIG. 28, it is determined, in the step S121, whether the attack action of the boss character 204 is ended. If "YES" is determined in the step S121, that is, if the attack action of the boss character 204 is ended, the hit point value of the player character 202 is reduced in a step S123. Here, a numerical value according to the attack of the boss character 204 is subtracted from the hit point value, and the hit point value data 854*h* is updated. In a next step S125, the PC attack flag 854*i* is turned on, and the process returns to the overall game processing. The processor 81 resets the number of movement times indicated by the number of movement times data 854*g* when the processing of the step S125 is executed.

On the other hand, if "NO" is determined in the step S121, that is, if the attack action of the boss character 204 is not ended, it is determined, in a step S127, whether the attack of the boss character 204 is being currently performed. If "YES" is determined in the step S127, that is, if the attack action of the boss character 204 is being currently performed, the attack action of the boss character 204 is advanced in a step S129, and the process returns to the overall game processing. On the other hand, if "NO" is determined in the step S127, that is, if the attack action of the boss character 204 is not being currently performed, the attack action of the boss character 204 is started in a step S131, and the process returns to the overall game processing.

Figure 29:
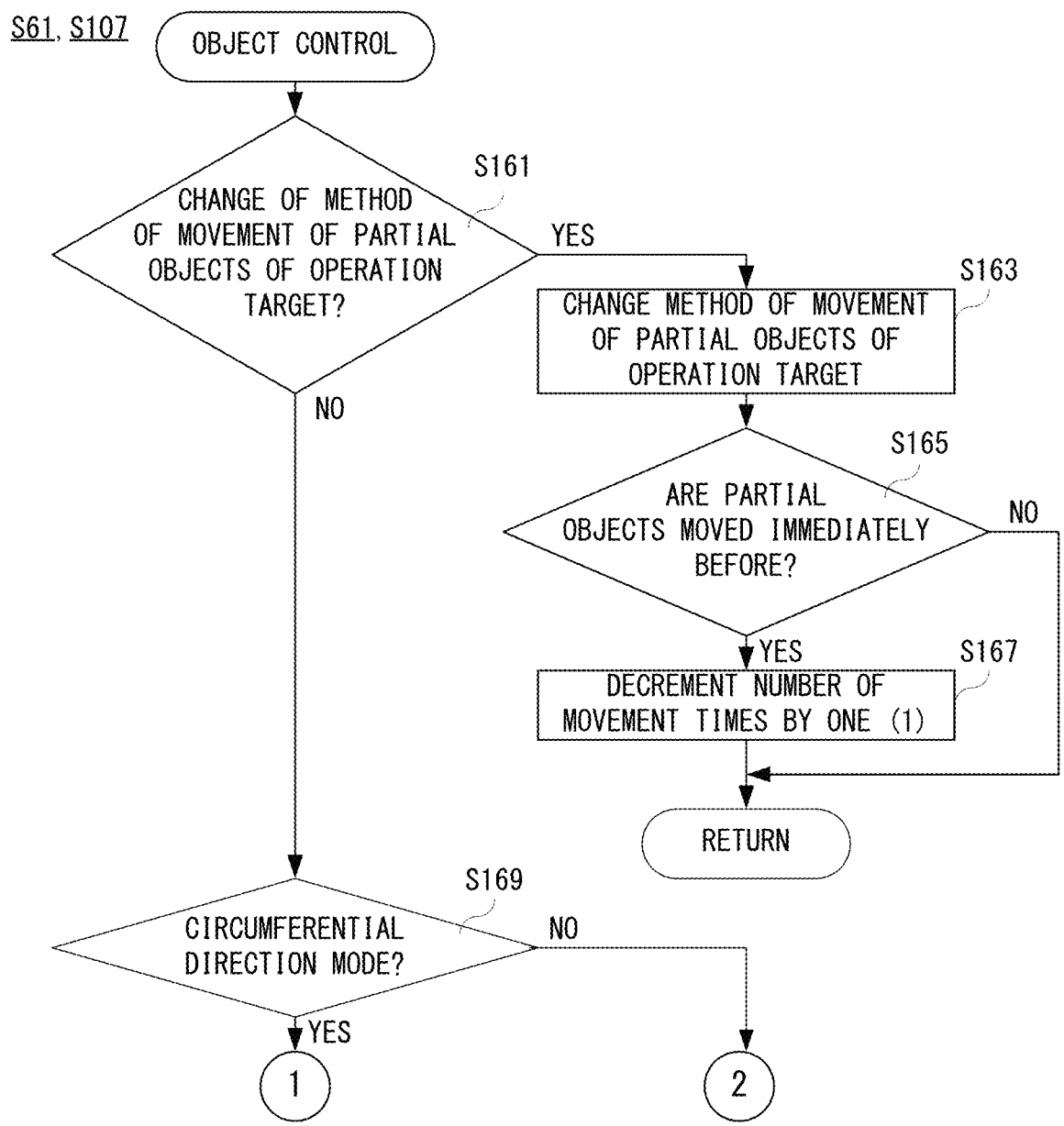
FIG. 29 is a flowchart showing a first part of non-limiting example object control processing by the processor(s) of the main body apparatus shown in FIG. 6.
Figure 30:
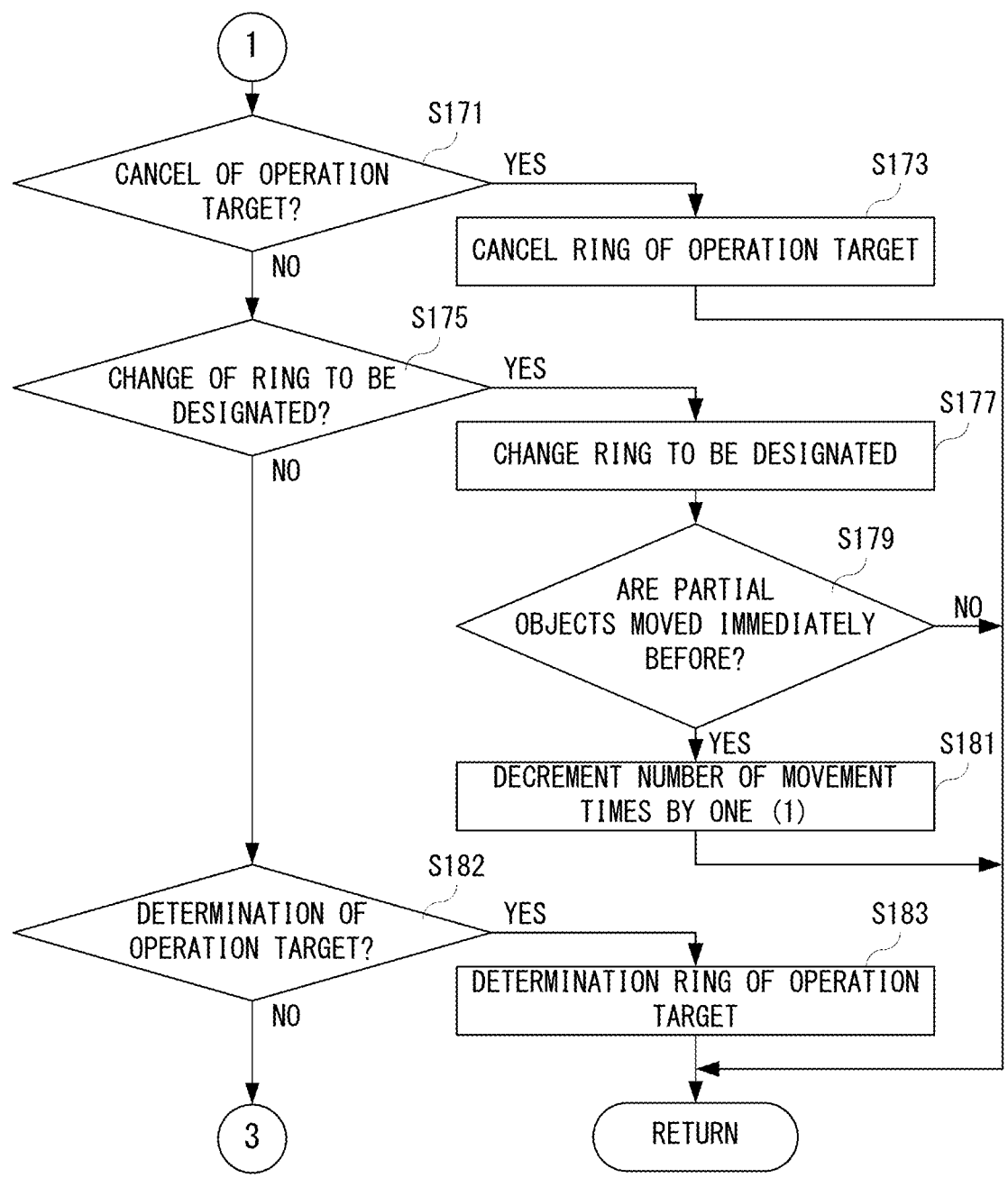
FIG. 30 is a flowchart showing a second part of the non-limiting example object control processing by the processor(s) of the main body apparatus shown in FIG. 6, following FIG. 29.
Figure 31:
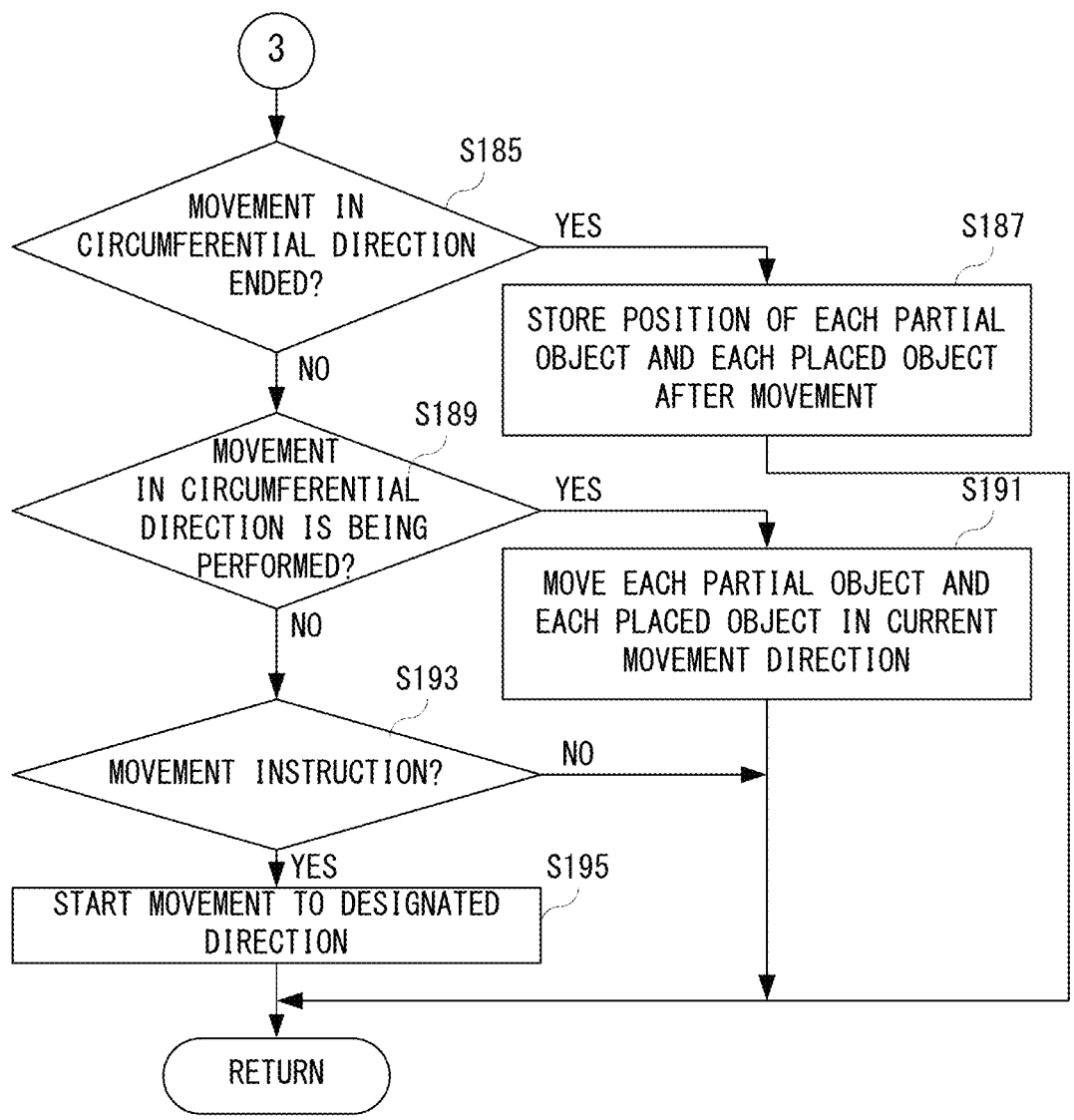
FIG. 31 is a flowchart showing a third part of the non-limiting example object control processing by the processor(s) of the main body apparatus shown in FIG. 6, following FIG. 30.

FIG. 29-FIG. 33 are flow charts showing a non-limiting example object control processing of the processor 81 shown in the steps S61 and S107 in the above-described game control processing. As shown in FIG. 29, if the object control processing is started, the processor 81 determines, in a step S161, whether it is a change of a movement method of the multiple partial objects 214*a* of the operation target. Here, the processor 81 determines whether the operation data detected in the step S3 indicates a depression of the L-button 38 or the R-button 60.

If "YES" is determined in the step S161, that is, if it is a change of a movement method of the multiple partial objects 214*a* of the operation target, the movement method of the multiple partial objects 214*a* of the operation target is changed in a step S163. Here, the processor 81 switches the movement method from the circumferential direction mode to the radial direction mode or from the radial direction mode to the circumferential direction mode. That is, the processor 81 updates the movement mode data 854*c*.

In a next step S165, it is determined whether the partial objects 214*a* are moved immediately before. If "NO" is determined in the step S165, that is, if the partial objects 214*a* are not moved immediately before, the object control processing is ended, and the process returns to the game control processing. If "YES" is determined in the step S165, that is, if the partial objects 214*a* are moved immediately before, the number of movement times is decremented by one (1) in a step S167, and the process returns to the game control processing. In the step S167, the processor 81 updates the number of movement times data 854*g*.

Moreover, if "NO" is determined in the step S161, that is, if it is not a change of the movement method of the multiple partial objects 214*a* of the operation target, it is determined, in a step S169, whether it is the circumferential direction mode. Here, the processor 81 determines whether the movement mode data 854*c* indicates the circumferential direction mode.

Figure 32:
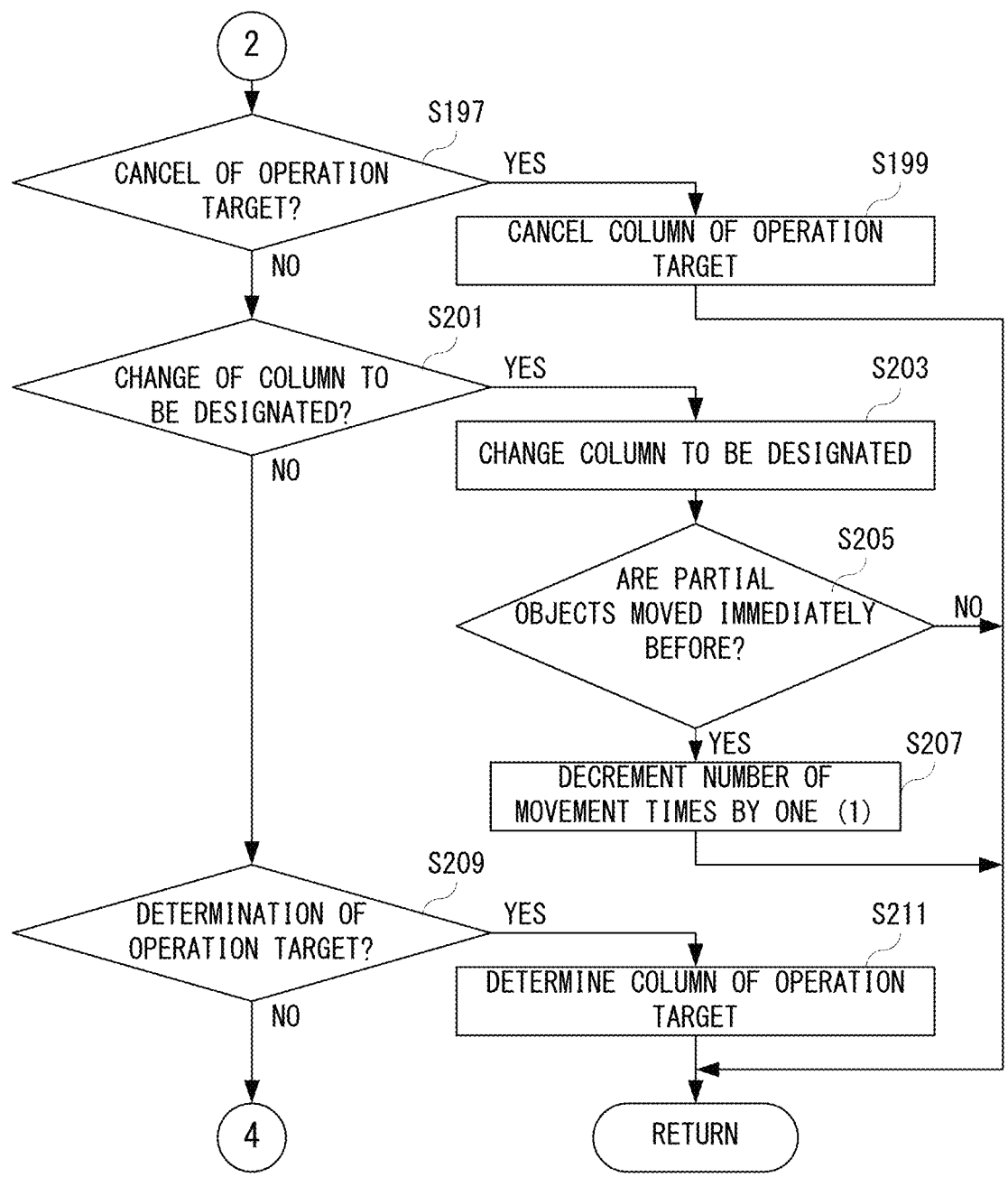
FIG. 32 is a flowchart showing a fourth part of the non-limiting example object control processing by the processor(s) of the main body apparatus shown in FIG. 6, following FIG. 29.
Figure 33:
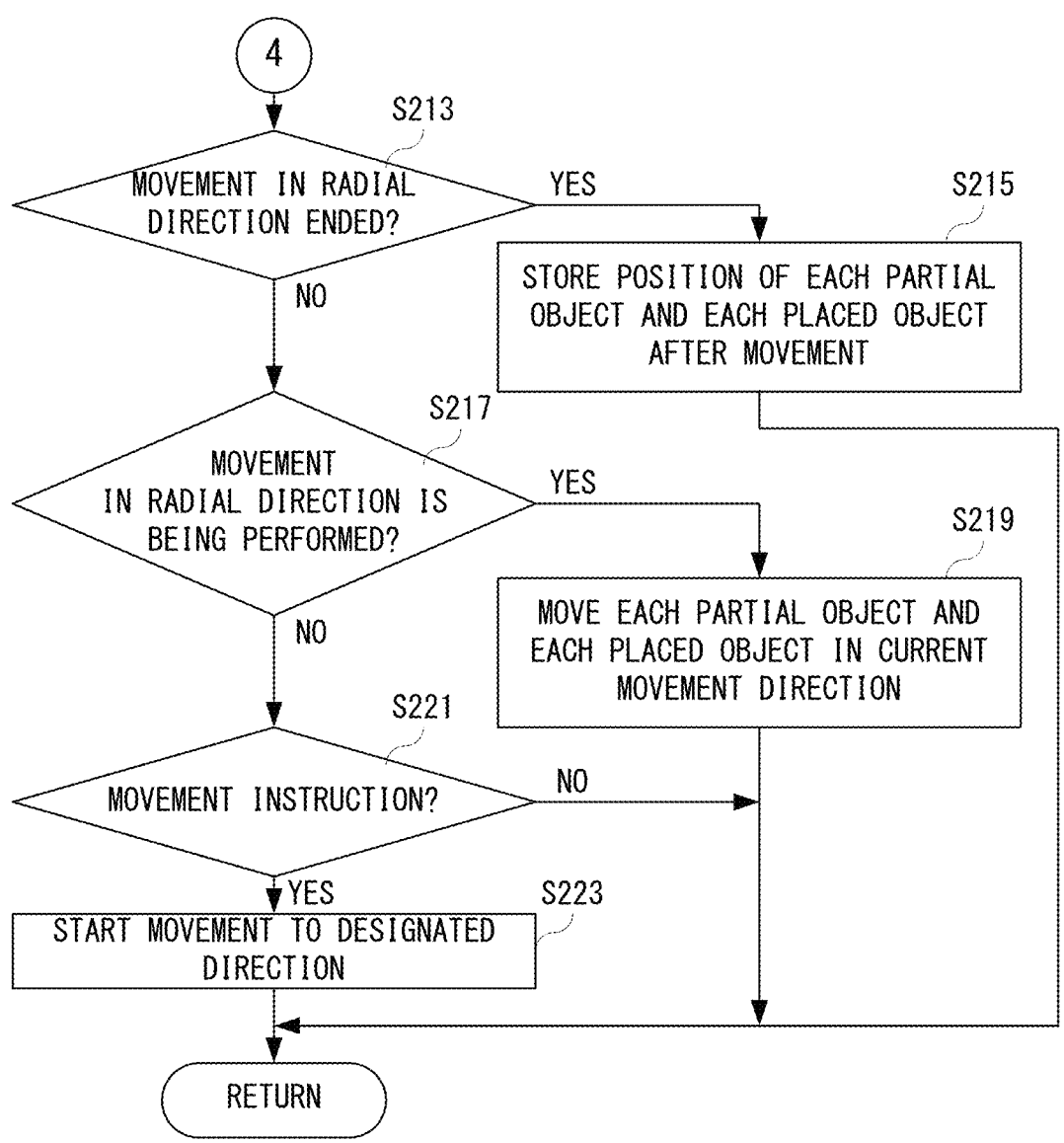
FIG. 33 is a flowchart showing a fifth part of the non-limiting example object control processing by the processor(s) of the main body apparatus shown in FIG. 6, following FIG. 32.

If "NO" is determined in the step S169, that is, if it is the radial direction mode, the process proceeds to a step S197 shown in FIG. 32. On the other hand, if "YES" is determined in the step S169, that is, if it is the circumferential mode, it is determined, in a step S171 shown in FIG. 30, whether the operation target is to be canceled. Here, the processor 81 determines whether the operation data detected in the step S3 indicates a depression of the B-button 54.

If "YES" is determined in the step S171, that is, if it is cancel of the operation target, the ring of the operation target is canceled in a step S173, and the process returns to the game control processing. On the other hand, if "NO" is determined in the step S171, that is, if it is not cancel of the operation target, it is determined, in a step S175, whether it is a change of the ring to be designated. Here, the processor 81 determines whether the operation data detected in the step S3 indicates a tilt of the analog stick 32.

If "YES" is determined in the step S175, that is, if it is a change of the ring to be designated, the ring to be designated is changed in a step S177. In this embodiment, the processor 81 determines a ring adjacent in an outside to the ring that is currently designated as the ring to be designated in the step S177. In a next step S179, it is determined whether the partial objects 214*a* are moved immediately before. If "NO" is determined in the step S179, the process returns to the game control processing. On the other hand, if "YES" is determined in the step S179, the number of movement times is decremented by one (1) in a step S181, and the process returns to the game control processing.

On the other hand, if "NO" is determined in the step S175, that is, if it is not a change of the ring to be designated, it is determined, in a step S182, whether it is determination of the operation target. Here, the processor 81 determines whether the operation data detected in the step S3 indicates depression of the A-button 53 in a state where the designation image 220 is displayed.

If "YES" is determined in the step S182, that is, if it is determination of the operation target, the ring that is currently designated is determined as the ring of the operation target in a step S183, and the process returns to the game control processing. On the other hand, if "NO" is determined in the step S182, that is, if it is not determination of the operation target, it is determined, in a step S185, whether movement of the multiple partial objects 214*a* constituting the ring of the operation target in the circumferential direction is ended. That is, the processor 81 determines whether each of the multiple partial objects 214*a* of the operation target is moved in the circumferential direction by one (1) cell.

If "YES" is determined in the step S185, that is, if the movement of the multiple partial objects 214*a* constituting the ring of the operation target in the circumferential direction is ended, in a step S187, positions after movement of each partial object 214*a* and each placed object are stored, and the process returns to the game control processing. That is, in the step S187, the processor 81 updates the current position data 854*d* of the positions of the multiple partial objects 214*a* constituting the ring of the operation target and the position(s) of the placed object(s) moved together with the multiple partial objects 214*a*. However, in this embodiment, the placed object is the normal character 204 in the battle processing with the normal character 204, and the direction designation object 252, the attack instruction object 254 and the effect object 256 in the battle processing with the boss character 204.

On the other hand, if "NO" is determined in the step S185, that is, if the movement of the multiple partial objects 214*a* constituting the ring of the operation target in the circumferential direction is not ended, it is determined, in a step S189, whether the movement of the multiple partial objects 214*a* constituting the ring of the operation target in the circumferential direction is being currently performed.

If "YES" is determined in the step S189, that is, if the movement of the multiple partial objects 214a constituting the ring of the operation target in the circumferential direction is currently performed, each partial object 214a and each placed object are moved in the current movement direction in a step S191, and the process returns to the game control processing. However, the current movement direction is a direction that the movement is started in the step S195, and is a clockwise or counterclockwise direction.

On the other hand, if "NO" is determined in the step S189, that is, if the movement of the multiple partial objects 214a constituting the ring of the operation target in the circumferential direction is not being currently performed, it is determined, in a step S193, whether it is a movement instruction. Here, the processor 81 determines whether the operation data detected in the step S3 indicates a tilt of the analog stick 32. If "NO" is determined in the step S193, that is, if it is not a movement instruction, the process returns to the game control processing. If "YES" is determined in the step S193, that is, if it is a movement instruction, in a step S195, movement of the multiple partial objects 214a constituting the ring of the operation target in the instructed direction (i.e., clockwise or counterclockwise) is started, and the process returns to the game control processing.

As described above, if "NO" is determined in the step S169, as shown in FIG. 32, it is determined, in the step S197, whether it is cancel of the operation target. If "YES" is determined in the step S197, the column of the operation target is canceled in a step S199, and the process returns to the game control processing. On the other hand, if "NO" is determined in the step S197, that is, if it is not cancel of the operation target, it is determined, in a step S201, whether it is a change of the column to be designated. Here, the processor 81 determines whether the operation data detected in the step S3 indicates rotation of the analog stick 32 in a state of being tilted.

If "YES" is determined in the step S201, that is, if it is a change of the column to be designated, the column to be designated is changed in a step S203. In this embodiment, the processor 81 determines a column adjacent in a direction of the rotation of the analog stick 32 among the two columns adjacent to the column that is currently designated in a step S203 as a column to be designated. In a next step S205, it is determined whether the partial objects 214a are moved immediately before. If "NO" is determined in the step S205, the process returns to the game control processing. If "YES" is determined in the step S205, the number of movement times is decremented by one (1) in a step S207, and the process returns to the game control processing.

On the other hand, if "NO" is determined in the step S201, that is, if it is not a change of the column to be designated, it is determined, in a step S209, whether it is determination of the operation target. If "YES" is determined in the step S209, the column currently designated is determined as the column of the operation target in a step S211, and the process returns to the game control processing. On the other hand, if "NO" is determined in the step S209, it is determined, in a step S213 shown in FIG. 33, whether movement of the multiple partial objects 214a constituting the column of the operation target in the radial direction is ended. That is, the processor 81 determines whether each of the multiple partial objects 214a of the operation target is moved in the radial direction by one (1) cell.

If "YES" is determined in the step S213, that is, if the movement of the multiple partial objects 214a constituting the column of the operation target in the radial direction is ended, in a step S215, positions after movement of each partial object 214a and each placed object are stored, and the process returns to the game control processing. That is, in the step S215, the processor 81 updates the current position data 854d of the positions of the multiple partial objects 214a constituting the column of the operation target and the position(s) of the placed object(s) moved together with the multiple partial objects 214a. However, in this embodiment, the placed object is the normal character 204 in the battle processing with the normal character 204, and the direction designation object 252, the attack instruction object 254 and the effect object 256 in the battle processing with the boss character 204.

On the other hand, if "NO" is determined in the step S213, that is, if the movement of the multiple partial objects 214a constituting the column of the operation target in the radial direction is not ended, it is determined, in a step S217, whether the movement of the multiple partial objects 214a constituting the column of the operation target in the radial direction is being currently performed.

If "YES" is determined in the step S217, that is, if the movement of the multiple partial objects 214a constituting the column of the operation target in the radial direction is being currently performed, each partial object 214a and each placed object are moved in the movement direction in a step S219, and the process returns to the game control processing. However, the movement direction is a direction that the movement is started in the step S223, and is any one of twelve (12) directions using the azimuth direction.

On the other hand, if "NO" is determined in the step S217, that is, if the movement of the multiple partial objects 214a constituting the column of the operation target in the radial direction is not being currently performed, it is determined, in a step S221, whether it is a movement instruction.

If "NO" is determined in the step S221, the process returns to the game control processing. On the other hand, if "YES" is determined in the step S221, in a step S223, movement of the multiple partial objects 214a constituting the column of the operation target in the designated direction (i.e., the designated direction among the twelve (12) directions using the azimuth direction) is started, and the process returns to the game control processing.

In addition, although it is illustrated in the drawings and described to cancel the ring or the column of the operation target by depressing the B-button 54 in the object control processing shown in FIG. 29-FIG. 33, it is possible to return by one (1) move at every time of depressing the B-button 54, and thus, to return finally to the start of an attack turn. Therefore, as described above, in the circumferential direction mode, it is possible to undo rotational movement (i.e., movement in the circumferential direction) if the B-button 54 is depressed, and further, to cancel the ring of the operation target. Moreover, in the radial direction mode, it is possible to undo movement in the radial direction if the B-button 54 is depressed, and further, to cancel the column of the operation target. However, when returning one (1) move, that is, when returning movement in the circumferential direction or movement in the radial direction by one (1) cell, the number of movement times is incremented by one (1).

According to this embodiment, it is possible to cause the player character to attack the enemy character by selecting multiple partial objects that are arranged in a ring-shape or a column-shape out of all the partial objects that are formed by sectioning a board face object by multiple concentric circles and multiple lines extended in a radial direction from a center shared by the multiple concentric circles, as an operation target; and by changing arrangement of one or more placed objects by moving the selected multiple partial objects in the circumferential direction or the radial direction, thereby making the player character attack the enemy character(s), and therefore, it is possible to provide a novel game that an operation of arrangement of game objects such as the placed objects incorporated into game play.

Moreover, according to this embodiment, since an upper limit is set to the number of times that the multiple partial objects of the operation target can be moved in the circumferential direction or/and the radial direction, it is possible to set the degree of difficulty on the change of the arrangement of the placed object.

Furthermore, according to this embodiment, it is possible to cause the player to think the arrangement of the enemy character for attacking the enemy character from the central portion of the board face object, or the arrangement of the direction designation object and the attack instruction object for attacking the enemy character placed at the central portion of the board face object. Therefore, it is possible to make the player experience a sense of accomplishment when attacking the enemy character object efficiently.

Furthermore, according to this embodiment, it is possible to cause the player to think the arrangement of the effect object so as to not only simply attack the enemy character object but also effectively perform the attack.

In addition, although the board face object on which the multiple placed objects are placed is made into a circular shape in this embodiment, it does not need to be limited to this. In another example, the board face object may be formed in an elliptical shape or long circle (track) shape. In also such a case, it is possible to change the arrangement of the multiple placed objects by moving the multiple partial objects in the circumferential direction or the radial (column) direction.

Moreover, in this embodiment, in the radial direction, the multiple partial objects constituting the column of the operation target are controlled to be movable in the length corresponding to the diameter of the board face object across the central object, but it does not need to be limited to this. The multiple partial objects may be controlled to be movable in the length corresponding to the radius. In such a case, four (4) partial objects lined from the innermost periphery to the outermost periphery are constituted as a column, and any one of twelve (12) columns is selected as an operation target. The multiple partial objects are moved within the column that is selected as an operation target in the radial direction (direction from the innermost periphery to the outermost periphery, or vice versa). In this case, when the multiple partial objects are moved in a direction from the innermost periphery to the outermost periphery, the partial object on the outermost periphery is moved to the innermost periphery, and when the multiple partial objects are moved in a direction from the outermost periphery to the innermost periphery, the partial object on the innermost periphery is moved to the outermost periphery.

Furthermore, in this embodiment, the board face object is sectioned into multiple partial objects, and the multiple partial objects of the operation target are moved in the circumferential direction or the radial direction, thereby to move the placed object(s), but it does not need to be limited to this.

In another embodiment, the board face object is sectioned into multiple areas by multiple concentric circles and multiple lines extended in a radial direction from a center shared by the multiple concentric circles, the placed object(s) may be moved within the multiple areas that are arranged in a ring-shape or a column-shape and selected as the operation target.

Moreover, although the game system 1 is shown as an example of an information processing system in the above-described embodiment, the structure thereof should not be limited, and it is possible to adopt other structure. For example, although the above-described "computer" is a single computer (specifically, processor 81) in the above-described embodiment, the "computer" may be multiple computers in another embodiment. The above-described "computer" may be (multiple) computers provided on multiple devices, and more specifically, the above-described "computer" may be constituted by the processor 81 of the main body apparatus 2 and communication control units (microprocessors) 101 and 111 provided on the controllers.

Furthermore, in another embodiment, a part or all of the overall game processing (S5-S9) may be executed by a server on a network such as the internet. That is, the server executes the game control processing (FIG. 21-FIG. 28), the object control processing (FIG. 29-FIG. 33) included in this game control processing, the game image generation processing and the game sound generation processing. In such a case, the processor 81 of the main body apparatus 2 transmits the operation data received from the left controller 3 and the right controller 4 to the above-described server via the network communication section 82 and the network, receives a result of execution of a part of the overall game processing by the server (i.e., game image data and the game sound data), thereby displaying the game image on the display 12 and outputting the game sound from the speaker 88. That is, it is possible to constitute an information processing system including the game system 1 shown in the above-described embodiment and the server on the network. Moreover, although a case where the game image is displayed on the display 12 is described in the above-described embodiment, it does not need to be limited to this.

The game image can also be displayed on a stationary monitor (for example, television monitor) by connecting the main body apparatus 2 to the stationary monitor via a cradle. In such a case, it is possible to constitute an information processing system including the game system 1 and the stationary monitor.

Furthermore, although the above-described embodiment is described on a case where the game system 1 having structure that the left controller 3 and the right controller 4 are attachable to or detachable from the main body apparatus 2 is used, it does not need to be limited to this. For example, it is possible to use an information processing apparatus such a game apparatus or further electronic equipment that an operation portion having operation buttons and analog sticks similar to those of the left controller 3 and the right controller 4, and are capable of executing a game program. The further electronic equipment corresponds to smartphones, tablet PCs or the like. In such a case, an operation portion may constitute with software keys.

Furthermore, specific numeral values and images shown in the above-described embodiment are mere examples and can be appropriately changed according to actual products.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A non-transitory computer-readable storage medium having stored therein a game program executable by a computer of an information processing apparatus, wherein the game program causes one or more processors of the computer to execute:
- arranging in a virtual space a board face object having a circular board face that is formed with multiple parts that are sectioned by multiple lines extended in a radial direction from a center and multiple concentric circles;
- placing a game object on at least one of the parts;
- moving multiple parts that are designated based on an operation input and surrounded by common concentric circles together with the game object that is placed on the part;
- game processing that causes, based on an operation input, a player character object to perform a predetermined action based on arrangement of the game object on the board face object; and
- generating, based on a virtual camera, an image of the virtual space to be displayed on a display.

2. The storage medium according to claim 1, wherein the game program causes the one or more processors further to execute: moving first multiple parts and second multiple parts designated based on an operation input, the first multiple parts being surrounded by common lines extended in the radial direction and the second multiple parts being point symmetry with respect to the first multiple parts with a reference of the center, together with the game objects placed on the first multiple parts and the second multiple parts, in a manner that the first multiple parts and the second multiple parts are moved to an outer side of one of the first multiple parts and the second multiple parts, and an outermost part of one of the first multiple parts and the second multiple parts is moved to an outermost part the other of the first multiple parts and the second multiple part.

3. The storage medium according to claim 1, wherein the game program causes the one or more processors further to execute: moving to an outside direction or an inside direction multiple parts that are designated based on an operation input and surrounded by common lines extended in the radial direction, together with one or more game objects placed on the parts, and moving an outermost part to an innermost part, or an innermost part to an outermost part.

4. The storage medium according to claim 1, wherein a predetermined number is set as an upper limit to a number of movement times, and the movement is performed until an end is instructed based on an operation input, or the number of movement times reaches the upper limit.

5. The storage medium according to claim 1, wherein the board face object has a central portion in a range including the center of circle, the central portion is placed with the player character object, and the game object is an enemy character object, and the game program causes the one or more processors to execute game processing in which the player character object performs an attack to the enemy character object arranged in the part included in a range of a predetermined shape with respect to a direction designated based on an operation input from the central portion.

6. The storage medium according to claim 1, wherein the board face object has a central portion within a range including the center of a circle, and the central portion is further placed with an enemy character object, and the game object includes a direction designation object that designates a movement direction on the board face object and an attack instruction that instructs an attack to the enemy character object, and the game program causes the one or more processors to execute game processing that makes the player character object perform movement from an outside of the board face object between the parts according to the direction designation object arranged on the parts, and attack the enemy character object when the player character object reaches the attack instruction object.

7. The storage medium according to claim 6, wherein the game object further includes an effect object showing a predetermined effect, and the game program causes the one or more processors to execute game processing in which the player character object obtains the predetermined effect that is added in attacking the enemy character object if the player character object passes during movement the part that is placed with the effect object.

8. A game system comprising a control circuit and an operation unit, wherein the control circuit is configured to execute:
- arranging in a virtual space a board face object having a circular board face that is formed with multiple parts that are sectioned by multiple lines extended in a radial direction from a center and multiple concentric circles;
- placing a game object on at least one of the parts;
- moving multiple parts that are designated based on an operation input and surrounded by common concentric circles together with the game object that is placed on the part;
- game processing that causes, based on an operation input, a player character object to perform a predetermined action based on arrangement of the game object on the board face object; and
- generating, based on a virtual camera, an image of the virtual space to be displayed on a display.

9. The game system according to claim 8, wherein the control circuit is configured further to execute: moving first multiple parts and second multiple parts designated based on an operation input, the first multiple parts being surrounded by common lines extended in the radial direction and the second multiple parts being point symmetry with respect to the first multiple parts with a reference of the center, together with the game objects placed on the first multiple parts and the second multiple parts, in a manner that the first multiple parts and the second multiple parts are move to an outer side of one of the multiple parts and the second multiple parts, and an outermost part of one of the first multiple parts and the second multiple parts is moved to an outermost part the other of the first multiple parts and the second multiple part.

10. The game system according to claim 8, wherein the control circuit is configured further to execute: moving to an outside direction or an inside direction multiple parts that are designated based on an operation input and surrounded by common lines extended in the radial direction, together with one or more game objects placed on the parts, and moving an outermost part to an innermost part, or an innermost part to an outermost part.

11. The game system according to claim 8, wherein a predetermined number is set as an upper limit to a number of movement times, and the movement is performed until an end is instructed based on an operation input, or the number of movement times reaches the upper limit.

12. The game system according to claim 8, wherein the board face object has a central portion in a range including the center of circle, the central portion is placed with the player character object, and the game object is an enemy character object, and the control circuit is configured to execute game processing in which the player character object performs an attack to the enemy character object arranged in the part included in a range of a predetermined shape with respect to a direction designated based on an operation input from the central portion.

13. The game system according to claim 8, wherein the board face object has a central portion within a range including the center of a circle, and the central portion is further placed with an enemy character object, and the game object includes a direction designation object that designates a movement direction on the board face object and an attack instruction that instructs an attack to the enemy character object, and the control circuit is configured to execute game processing that makes the player character object perform movement from an outside of the board face object between the parts according to the direction designation object arranged on the parts, and attack the enemy character object when the player character object reaches the attack instruction object.

14. The game system according to claim 13, wherein the game object further includes an effect object showing a predetermined effect, and the game program causes the one or more processors to execute game processing in which the player character object obtains the predetermined effect that is added in attacking the enemy character object if the player character passes during movement the part that is placed with the effect object.

15. A game apparatus comprising a control circuit and an operation unit, wherein the control circuit is configured to execute:

arranging in a virtual space a board face object having a circular board face that is formed with multiple parts that are sectioned by multiple lines extended in a radial direction from a center and multiple concentric circles;

placing a game object on at least one of the parts;

moving multiple parts that are designated based on an operation input and surrounded by common concentric circles together with the game object that is placed on the part;

game processing that causes, based on an operation input, a player character object to perform a predetermined action based on arrangement of the game object on the board face object; and generating, based on a virtual camera, an image of the virtual space to be displayed on a display.

16. The game apparatus according to claim 15, wherein the board face object has a central portion in a range including the center of circle, the central portion is placed with the player character object, and the game object is an enemy character object, and the control circuit is configured to execute game processing in which the player character object performs an attack to the enemy character object arranged in the part included in a range of a predetermined shape with respect to a direction designated based on an operation input from the central portion.

17. The game system according to claim 15, wherein the board face object has a central portion within a range including the center of a circle, and the central portion is further placed with an enemy character object, and the game object includes a direction designation object that designates a movement direction on the board face object and an attack instruction that instructs an attack to the enemy character object, and the control circuit is configured to execute game processing that makes the player character object perform movement from an outside of the board face object between the parts according to the direction designation object arranged on the parts, and attack the enemy character object when the player character object reaches the attack instruction object.

18. A game controlling method, comprising:

arranging in a virtual space a board face object having a circular board face that is formed with multiple parts that are sectioned by multiple lines extended in a radial direction from a center and multiple concentric circles;

placing a game object on at least one of the parts;

moving multiple parts that are designated based on an operation input and surrounded by common concentric circles together with the game object that is placed on the part;

game processing that causes, based on an operation input, a player character object to perform a predetermined action based on arrangement of the game object on the board face object; and generating, based on a virtual camera, an image of the virtual space to be displayed on a display.

19. The game controlling method according to claim 18, wherein the board face object has a central portion in a range including the center of circle, the central portion is placed with the player character object, and the game object is an enemy character object, and further comprising:

causing the player character object to perform an attack to the enemy character object arranged in the part included in a range of a predetermined shape with respect to a direction designated based on an operation input from the central portion.

20. The game controlling method according to claim 19, wherein the board face object has a central portion within a range including the center of a circle, and the central portion is further placed with an enemy character object, and the game object includes a direction designation object that designates a movement direction on the board face object and an attack instruction that instructs an attack to the enemy character object, and further comprising:

causing the player character object to perform movement from an outside of the board face object between the parts according to the direction designation object arranged on the parts, and attack the enemy character object when the player character object reaches the attack instruction object.

* * * * *